(12) United States Patent
Oshima et al.

(10) Patent No.: US 11,198,379 B2
(45) Date of Patent: Dec. 14, 2021

(54) SEAT UNIT, VEHICLE, AND CONVEYANCE SEAT

(71) Applicant: TS TECH CO., LTD., Saitama (JP)

(72) Inventors: Yuki Oshima, Tochigi (JP); Atsushi Kusano, Tochigi (JP); Yuki Yoshioka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/608,079

(22) PCT Filed: Apr. 26, 2018

(86) PCT No.: PCT/JP2018/017045
§ 371 (c)(1),
(2) Date: Jan. 17, 2020

(87) PCT Pub. No.: WO2018/199255
PCT Pub. Date: Nov. 1, 2018

(65) Prior Publication Data
US 2020/0139851 A1    May 7, 2020

(30) Foreign Application Priority Data

Apr. 28, 2017  (JP) .............................. JP2017-090297
Apr. 28, 2017  (JP) .............................. JP2017-090298
Apr. 25, 2018  (JP) .............................. JP2018-084216

(51) Int. Cl.
*B60N 2/02*    (2006.01)
*A47C 7/50*    (2006.01)
(Continued)

(52) U.S. Cl.
CPC .............. *B60N 2/0248* (2013.01); *A47C 7/38* (2013.01); *A47C 7/506* (2013.01); *A47C 7/72* (2013.01);
(Continued)

(58) Field of Classification Search
CPC ...... B60N 2/0248; B60N 2/879; B60N 2/976; B60N 2/20; B60N 2002/0272; B60N 3/063; A47C 7/38; A47C 7/506; A47C 7/72
(Continued)

(56) References Cited

U.S. PATENT DOCUMENTS 6,663,184 B2 * 12/2003 Hagiike ............... B60N 2/0292
                                                           297/423.3
2009/0267392 A1 * 10/2009 Himmelhuber ........ B60N 2/525
                                                           297/217.2

FOREIGN PATENT DOCUMENTS

CN    104972931 A    10/2015
JP    H04-086536 U    7/1992
(Continued)

OTHER PUBLICATIONS

International Search report dated Jul. 10, 2018 for the corresponding PCT Application No. PCT/JP2018/017045, with partial English translation.
(Continued)

*Primary Examiner* — Mark R Wendell
(74) *Attorney, Agent, or Firm* — Michael Best & Friedrich LLP

(57) ABSTRACT

The time required to complete current-to-target state transitions of a plurality of movable portions constituting a seat is shortened. A seat unit 1 includes an occupant support portion S1, a plurality of movable mechanisms respectively moving a plurality of parts constituting the occupant support portion S1, and an ECU 40 controlling respective operations of the plurality of movable mechanisms. The ECU 40 causes each of the plurality of movable mechanisms to undergo a transition from a current state to a target state and the plurality of movable mechanisms have a first movable mechanism requiring a longest time for the transition. The
(Continued)

ECU 40 causes the transitions of the plurality of movable mechanisms other than the first movable mechanism to be completed by completion of the transition of the first movable mechanism from the current state to the target state.

13 Claims, 49 Drawing Sheets

(51) Int. Cl.
  *B60N 2/879* (2018.01)
  *B60N 2/90* (2018.01)
  *A47C 7/38* (2006.01)
  *A47C 7/72* (2006.01)
  *B60N 3/06* (2006.01)
  *B60N 2/20* (2006.01)
(52) U.S. Cl.
  CPC .............. *B60N 2/20* (2013.01); *B60N 2/879* (2018.02); *B60N 2/976* (2018.02); *B60N 3/063* (2013.01); *B60N 2002/0272* (2013.01)
(58) Field of Classification Search
  USPC ...................................................... 297/217.3
  See application file for complete search history.

(56) References Cited

FOREIGN PATENT DOCUMENTS

| JP | H07-030786 U | 6/1995 |
|---|---|---|
| JP | H08-047434 A | 2/1996 |
| JP | 2002-240616 A | 8/2002 |
| JP | 3095765 U | 8/2003 |
| JP | 2005-305127 A | 11/2005 |
| JP | 2006-143122 A | 6/2006 |
| JP | 2010-018152 A | 1/2010 |
| JP | 2010-173372 A | 8/2010 |
| JP | 2011-000219 A | 1/2011 |
| JP | 2013-189029 A | 9/2013 |
| JP | 2015-020558 A | 2/2015 |
| JP | 2015-058811 A | 3/2015 |
| JP | 2015-077832 A | 4/2015 |

OTHER PUBLICATIONS

Japanese Office Action dated Jun. 15, 2021 for the corresponding Japanese Patent Application No. 2017-090298, with machine English translation.

Chinese Office Action dated Jul. 26, 2021 for the corresponding Chinese Patent Application No. 201880042419.X, with partial machine English translation.

* cited by examiner

FIG. 21A
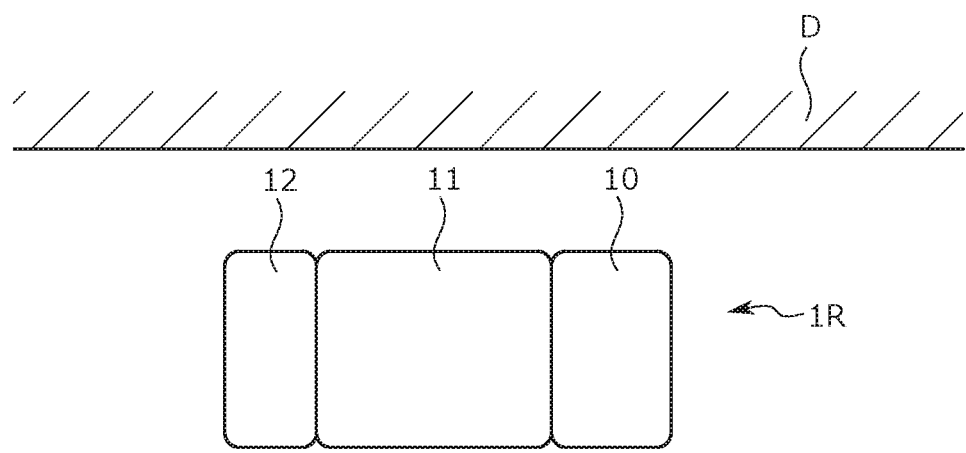
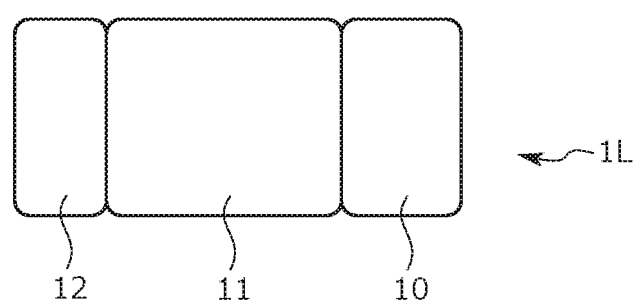

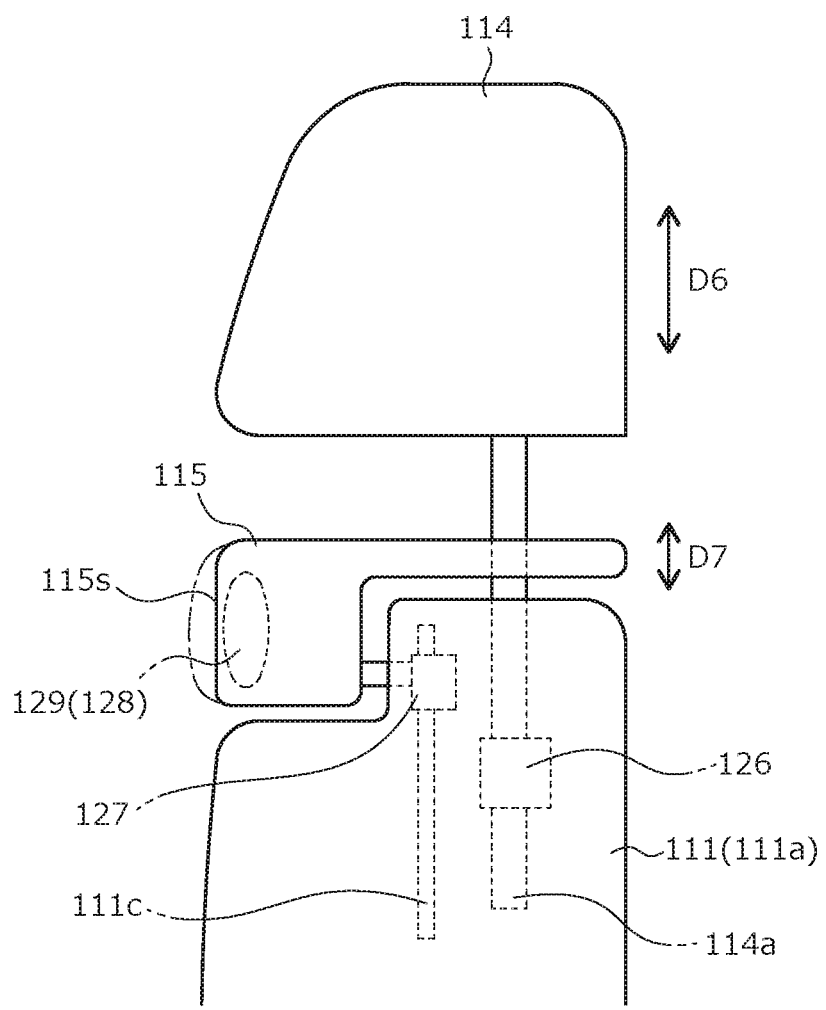

SEAT UNIT, VEHICLE, AND CONVEYANCE SEAT

CROSS-REFERENCE TO RELATED APPLICATIONS

This application is entering the National Phase of PCT/JP2018/017045, filed on Apr. 26, 2018. Further, this application claims priority from Japanese patent applications JP 2017-090297 filed Apr. 28, 2017, JP 2017-090298 filed Apr. 28, 2017, and JP 2018-084216 filed Apr. 25, 2018, the entire contents of which are hereby incorporated by reference into this application.

TECHNICAL FIELD

The present invention relates to a seat unit provided with a plurality of movable mechanisms respectively moving a plurality of parts constituting a seat, a vehicle, and a conveyance seat.

BACKGROUND ART

A vehicle seat provided with a seat back, a seat cushion, and an ottoman is known (see PATENT LITERATURE 1). In the vehicle seat, the postures (positions and directions) of the seat back, the seat cushion, and the ottoman are adjustable.

In addition, in the invention described in PATENT LITERATURE 1, forward tilting of the seat back is in conjunction with storage of a side support portion provided in the side portion of the seat cushion or a tilt unit moving a front portion upward and downward so that a person can enter or leave a vehicle with ease.

In addition, a conveyance seat is provided with a seat back and the posture of the conveyance seat can be switched between a standing posture in which the seat back stands and a tilt posture in which the seat back is tilted backward. In addition, a posture-switchable conveyance seat is provided with a headrest and a neck rest (see, for example, PATENT LITERATURE 2).

In the vehicle seat described in PATENT LITERATURE 2, a neck rest ("neck support portion" in PATENT LITERATURE 2) is pivotable about a horizontal axis along the width direction of the seat and the position of the neck support by the neck rest is adjustable in the front to back direction of the seat.

CITATION LIST

Patent Literature

PATENT LITERATURE 1: JP 2015-58811 A
PATENT LITERATURE 2: JP 2005-305127 A

SUMMARY OF INVENTION

Technical Problem

By the way, in some cases, the seat is deformed such that a seated occupant relaxes by the seat back of the conveyance seat being tilted backward with the seated occupant in the conveyance seat. In the invention described in PATENT LITERATURE 1, in contrast, each seat portion is moved (pivoted) such that a seat back movement is completed after the storage of the side support portion or the tilt unit is completed, and then it takes a long time to complete the seat deformation.

The present invention has been made in view of the above problems, and an object of the present invention is to provide a seat unit capable of shortening the time required to complete current-to-target state transitions of a plurality of movable portions constituting a seat.

In addition, in the vehicle seat described in PATENT LITERATURE 2, the neck rest is pivoted around the horizontal axis when the position of the neck support by the neck rest is adjusted in the front to back direction. In this configuration, the position of the neck support by the neck rest is adjusted in the pivot range of the neck rest. In other words, in the vehicle seat described in PATENT LITERATURE 1, the range in which the position of the neck support by the neck rest is adjusted is limited to the pivot range of the neck rest.

In this regard, another object of the present invention is to provide a conveyance seat achieving improvement in terms of the degree of freedom regarding adjustment of the position of a neck support by a neck rest.

Solution to Problem

One of the objects described above is solved by means of a seat unit according to the present invention including an occupant support portion supporting an occupant, a plurality of movable mechanisms respectively moving a plurality of parts constituting the occupant support portion, and a control unit controlling respective operations of the plurality of movable mechanisms, in which the control unit causes each of the plurality of movable mechanisms to undergo a transition from a current state to a target state, the plurality of movable mechanisms have a first movable mechanism requiring a longest time for the transition, and the control unit causes the transitions of the plurality of movable mechanisms other than the first movable mechanism to be completed by completion of the transition of the first movable mechanism from the current state to the target state.

In the seat unit described above, the transitions of the other movable mechanisms can be completed by the completion of the state transition by the first movable mechanism, which has the longest required time for the transition among the plurality of movable mechanisms. As a result, it is possible to shorten the time required for the completion of the current-to-target state transitions of the plurality of movable portions that constitute the seat.

In the seat unit described above, the control unit may cause timings of the completion of the respective current-to-target state transitions of the plurality of movable mechanisms to be substantially the same.

In this manner, a seated occupant can be informed of the completion of seat deformation in an easy-to-understand manner.

In the seat unit described above, the control unit may determine a transition initiation timing of each of the plurality of movable mechanisms based on a time required for the current-to-target state transition of each of the plurality of movable mechanisms.

In this manner, it is possible to accurately set the transition initiation timings of the plurality of movable mechanisms.

In the seat unit described above, the plurality of movable mechanisms may have a slide mechanism causing a slide movement of the occupant support portion.

In this manner, it is possible to appropriately control the completion timing of the state transition by the slide mechanism causing a slide movement of the occupant support portion.

In the seat unit described above, the occupant support portion may further include a seat back and an ottoman, and the plurality of movable mechanisms may have a back movable mechanism moving the seat back and an ottoman movable mechanism moving the ottoman.

In this manner, it is possible to appropriately control the completion timings of seat back and ottoman state transitions.

The seat unit described above may further include a distance sensor detecting a distance between the ottoman and another member, and the control unit may control the ottoman movable mechanism based on a result of the detection by the distance sensor such that the ottoman does not interfere with another member.

In this manner, control can be performed such that the ottoman does not hit another member.

In the seat unit described above, the occupant support portion may further include a seat cushion capable of performing a rotational movement, and the control unit may control the ottoman movable mechanism based on a result of the detection by the distance sensor and such that the ottoman does not interfere with another member during the rotational movement of the seat cushion.

In this manner, control can be performed such that the ottoman does not hit another member when the seat cushion pivots.

In the seat unit described above, the control unit may control a tilt angle of the seat cushion, such that a front end of the seat cushion becomes higher than a rear end of the seat cushion, during the rotational movement of the seat cushion.

In this manner, it is possible to support an occupant such that the occupant can easily move from the seat cushion when the seat cushion pivots.

In the seat unit described above, the occupant support portion may further include a side support, and the side support may protrude so as to support an occupant's body during a pivot operation of the seat back.

In this manner, the occupant's body can be supported with stability when the seat back pivots.

The seat unit described above may further include a voice input unit receiving voice input from an occupant, and the control unit may operate the movable mechanism in response to the voice input received by the voice input unit.

In this manner, the occupant's labor for movable mechanism operation can be reduced.

In the seat unit described above, the control unit may control the movable mechanism in accordance with a road situation.

In this manner, occupants can be supported in accordance with road situations.

In addition, a vehicle according to the present invention includes the seat unit described above.

In addition, one of the objects described above is solved by means of a conveyance seat of the present invention in which a conveyance occupant can sit. The conveyance seat includes a seat back, a posture switching mechanism for switching a posture of the conveyance seat between a standing posture in which the seat back stands and a tilt posture in which the seat back is tilted backward, a headrest positioned above the seat back when the posture is the standing posture, a neck rest having a support surface supporting the occupant's neck and positioned below the headrest when the posture is the standing posture, and a displacement mechanism provided in the neck rest and displacing a portion of the support surface toward the occupant's neck, in which the neck rest is movable along a direction of extension of the seat back, and the displacement mechanism displaces the portion of the support surface such that the portion of the support surface comes into contact with the occupant's neck when the neck rest moves.

In the conveyance seat of the present invention configured as described above, the neck rest is movable along the direction of extension of the seat back. In addition, when the neck rest moves, the displacement mechanism provided in the neck rest displaces the portion of the neck support surface in the neck rest toward the neck. In other words, in the conveyance seat of the present invention, the position of the neck support by the neck rest can be adjusted in each of the direction of extension of the seat back and the direction from the support surface of the neck rest to an occupant's neck. As a result, improvement in terms of the degree of freedom is achieved regarding the adjustment of the position of the neck support by the neck rest.

Advantageous Effects of Invention

With the present invention, it is possible to shorten the time required for the completion of the current-to-target state transitions of the plurality of movable portions that constitute the seat.

With the present invention, a seated occupant can be informed of the completion of seat deformation in an easy-to-understand manner.

With the present invention, it is possible to accurately set the transition initiation timings of the plurality of movable mechanisms.

With the present invention, the transitions of the other movable mechanisms can be completed by the completion of the state transition by the slide mechanism causing a slide movement of the seat.

With the present invention, it is possible to appropriately control the completion timings of seat back and ottoman state transitions.

With the present invention, control can be performed such that the ottoman does not hit another member.

With the present invention, control can be performed such that the ottoman does not hit another member when the seat cushion pivots.

With the present invention, it is possible to support an occupant such that the occupant can easily move from the seat cushion when the seat cushion pivots.

With the present invention, the occupant's body can be supported with stability when the seat back pivots.

With the present invention, the occupant's labor for movable mechanism operation can be reduced.

With the present invention, occupants can be supported in accordance with road situations.

With the present invention, improvement in terms of the degree of freedom is achieved regarding the adjustment of the position of the neck support by the neck rest.

BRIEF DESCRIPTION OF DRAWINGS

FIG. 21A is a diagram schematically illustrating the upper surface of the seat unit before rotation.

FIG. 33 is an explanatory diagram of a headrest-moving drive mechanism and a neck rest-moving drive mechanism.

DESCRIPTION OF EMBODIMENTS

First Embodiment

Hereinafter, a seat unit 1 according to an embodiment of the present invention (hereinafter, the present embodiment) will be described with reference to FIGS. 1 to 26. Although the seat unit 1 is obtained by the seat unit of the present invention being applied to a vehicle seat, the seat unit is applicable to seats for other conveyances as well as vehicles.

It should be noted that the embodiment described below is merely an example for facilitating the understanding of the present invention and does not limit the present invention. In other words, it is a matter of course that the shapes, the dimensions, the disposition, and the like of the members described below can be changed and improved within the spirit of the present invention and the present invention includes equivalents thereof.

In the following description, "front to back direction" means the front to back direction as viewed from a seated occupant in the seat unit 1 and is the direction that coincides with the traveling direction of the vehicle.

"Seat width direction" means the breadth direction of the seat unit 1 and coincides with the right to left direction as viewed from the seated occupant in the seat unit 1.

In addition, "up to down direction" means the height direction of the seat unit 1 and coincides with the up to down direction at a time when the seat unit 1 is viewed from the front.

<<Configuration of Seat Unit 1>>

First, the configuration of the seat unit 1 will be described with reference to FIGS. 1 to 3.

The seat unit 1 is a seat that is mounted in an automobile and an occupant can sit in the seat. It should be noted that an example in which the seat unit according to the present invention is applied to the first row seat (front seat) or the second row seat (middle seat) in the third row seat of a car will be described in the present embodiment.

Further, the seat unit 1 according to the present embodiment can be deformed to at least two states, one being a standing posture in which a seat back 10 stands and the other being a tilt posture in which the seat back 10 is tilted backward. It should be noted that the occupant takes a normal standing posture (such as a driving posture) with respect to the seat unit 1 in a state where the seat unit 1 is in the standing posture. On the other hand, the occupant takes a neutral posture with respect to the seat unit 1 in a state where the seat unit 1 is in the tilt posture.

Figure 1:
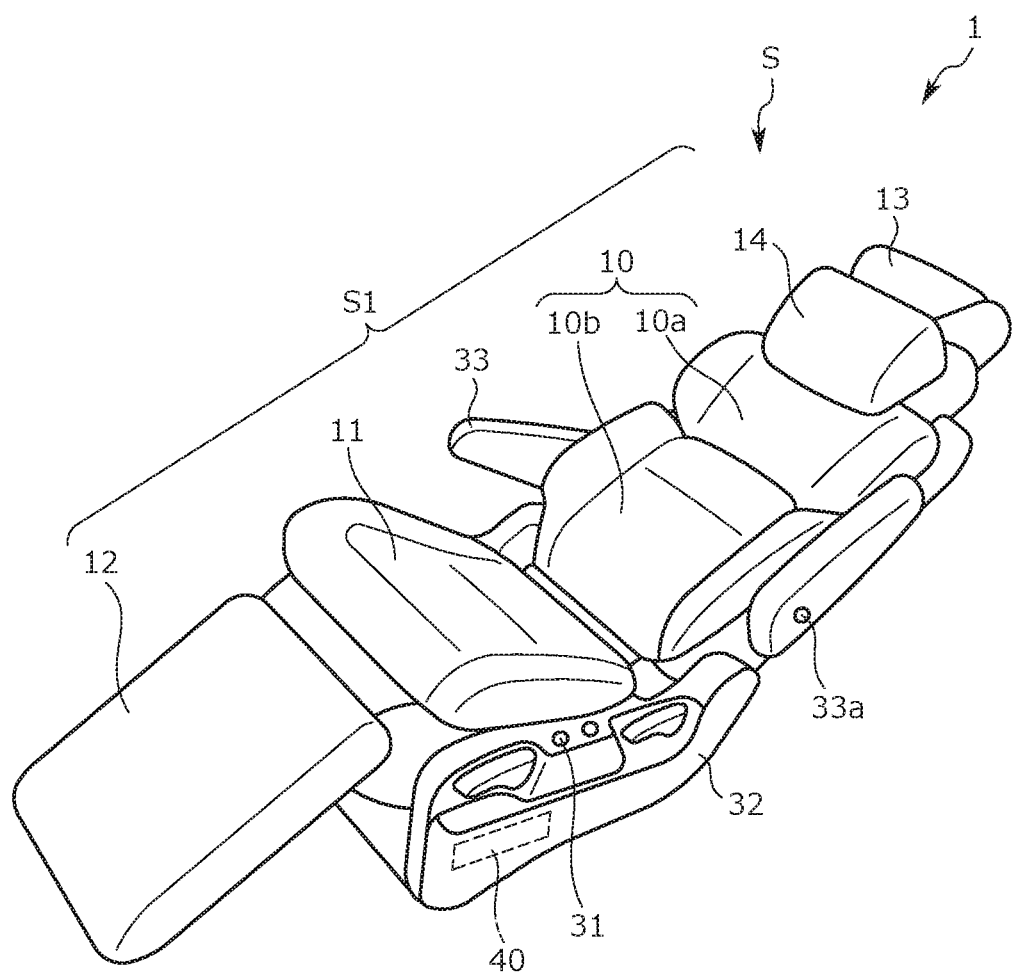
FIG. 1 is a perspective view of a seat unit according to the present embodiment.
Figure 2:
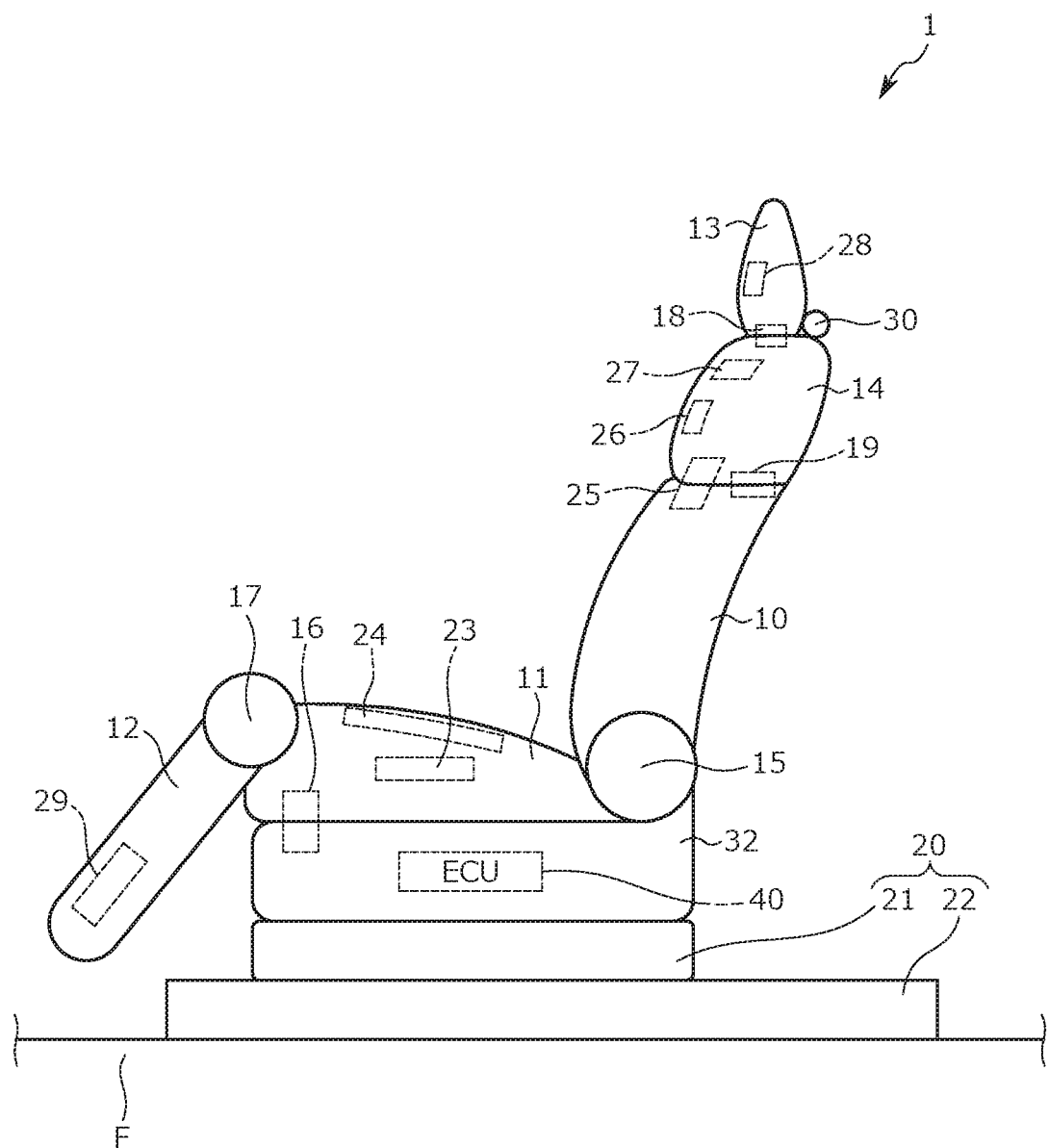
FIG. 2 is a side view schematically illustrating the configuration of the seat unit.
Figure 3:
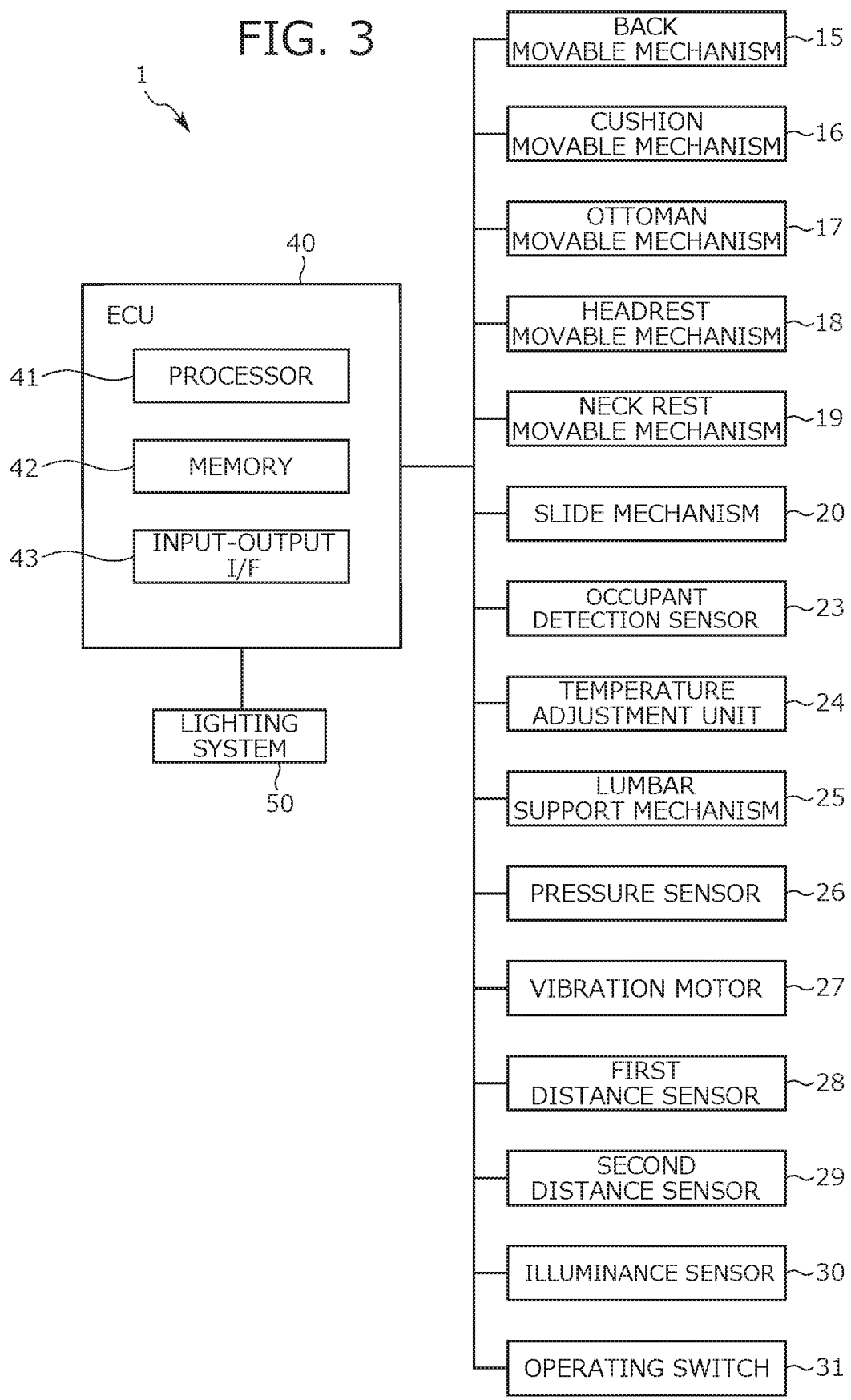
FIG. 3 is a diagram illustrating a control target of an ECU.

As illustrated in FIGS. 1 to 3, the seat unit 1 is provided with a seat main body S as a vehicle seat in which the occupant sits, an electronic control unit (ECU) 40 as a control unit controlling the operation of each portion of the seat main body S, and various sensors.

It should be noted that FIG. 1 illustrates a perspective view of a state where the seat unit 1 is in the tilt posture and FIG. 2 schematically illustrates a side view of a state where the seat unit 1 is in the standing posture.

The seat main body S is provided with an occupant support portion S1 and a plurality of movable mechanisms. Specifically, the occupant support portion S1 is provided with the seat back 10, a seat cushion 11, an ottoman 12, a headrest 13, a neck rest 14, a support member 32, and an armrest 33.

In addition, the plurality of movable mechanisms are mechanisms moving a plurality of parts constituting the occupant support portion S1 and, specifically, the mechanisms are provided with a back movable mechanism 15, a cushion movable mechanism 16, an ottoman movable mechanism 17, a headrest movable mechanism 18, a neck rest movable mechanism 19, and a slide mechanism 20.

The seat back 10 supports the occupant's back from behind and is configured by a cushion material being supported on a frame (not illustrated) and the cushion material being covered with a skin.

It should be noted that the seat back 10 according to the present embodiment is divided into one upper portion and one lower portion and has a seat back upper portion 10a and a seat back lower portion 10b. The seat back upper portion 10a supports the part of the occupant's back that is positioned at the same height as the occupant's chest. The seat back lower portion 10b supports the part of the occupant's back that is from the occupant's abdomen to the occupant's lumbar region.

In addition, the seat back 10 can be moved (strictly speaking, pivoted) by the back movable mechanism 15 so as to tilt backward with respect to the seat cushion 11.

The back movable mechanism 15 is a mechanism that moves (pivots) the seat back 10 such that the tilt angle of the seat back 10 changes and, for example, a motor-driven electric reclining mechanism constitutes the back movable mechanism 15. The seat back 10 pivots about the shaft member that interconnects the seat back 10 and the seat cushion 11 by the back movable mechanism 15 operating.

The seat cushion 11 supports the occupant's buttocks from below and is configured by a cushion material being placed on a frame (not illustrated) and the cushion material being covered with a skin. The rear end portion of the seat cushion 11 is connected to the lower end portion of the seat back 10 (strictly speaking, the lower end portion of the seat back lower portion 10b) via a shaft extending along the seat width direction.

In addition, the seat cushion 11 according to the present embodiment can be pivoted by the cushion movable mechanism 16 such that the front end portion of the seat cushion 11 ascends and descends in the up to down direction.

The cushion movable mechanism 16 is a mechanism that moves (pivots) the ottoman 12 such that the front end portion of the seat cushion 11 ascends and descends and, for example, a jack-type electric lift mechanism constitutes the cushion movable mechanism 16. The front end of the seat cushion 11 pivots with respect to the rear end of the seat cushion 11 by the cushion movable mechanism 16 operating.

The ottoman 12 supports the occupant's lower leg from below and is configured by a cushion material being placed on a frame board (not illustrated) and the cushion material being covered with a skin. The ottoman 12 is supported by the front end portion of the seat cushion 11 via a pivot shaft extending along the seat width direction. In other words, the ottoman 12 is capable of pivoting around the pivot shaft.

Further, the ottoman 12 moves between a deployment position and a storage position by pivoting. The storage position is a position at a time when the ottoman 12 is not used and is a position at a time when the ottoman 12 hangs down and the distal end portion (free end portion) of the ottoman 12 is closest to the seat cushion 11. The deployment position is a position where the ottoman 12 is used (for easier understanding, a position where the occupant's lower leg can be supported) and is a position at a time when the ottoman 12 protrudes ahead of the front end of the seat cushion 11.

It should be noted that the length of the ottoman 12 from the proximal end portion of the ottoman 12 supported by the seat cushion 11 to the distal end portion of the ottoman 12 as a free end portion (hereinafter, the full length) may be extendable. In other words, the ottoman 12 may be configured such that the full length is shortest when the ottoman 12 is at the storage position and the full length gradually increases as the ottoman 12 approaches the deployment position.

Further, the ottoman movable mechanism 17 is a mechanism that moves (pivots) the ottoman 12 such that the ottoman 12 moves from the storage position to the deployment position or from the deployment position to the storage position and, for example, a swing arm-type electric actuator constitutes the ottoman movable mechanism 17. The front end of the ottoman 12 pivots with respect to the rear end of the ottoman 12 by the ottoman movable mechanism 17 operating.

The headrest 13 supports the occupant's head from behind and is configured by a foaming material or a cushion material being disposed around a frame (not illustrated) and the periphery of the material being covered with a skin material. In addition, a pillar as a prop extends downward from the lower end of the neck rest 14. This pillar is inserted in the upper end portion of the seat back 10. Accordingly, the headrest 13 is positioned above the seat back 10 when the posture of the seat unit 1 is the standing posture.

In addition, in the present embodiment, the headrest 13 can be moved upward and downward with respect to the seat back 10 by the headrest movable mechanism 18. In other words, in the present embodiment, it is possible to change the position where the occupant's head is supported in accordance with the movement of the headrest 13 by the headrest movable mechanism 18.

The headrest movable mechanism 18 is a mechanism that moves (moves upward and downward) the headrest 13 with respect to the seat back 10 along the direction of extension of the seat back 10. The headrest movable mechanism 18 is fixed to a seat back frame (not illustrated) in the seat back 10 and is engaged with the pillar of the headrest 13.

Specifically, the headrest movable mechanism 18 is provided with a pinion (not illustrated) connected to a motor. This pinion is engaged with the rack (not illustrated) that is formed on the pillar of the headrest 13. Once the headrest movable mechanism 18 configured as described above operates, the position of engagement between the pinion and the rack moves and the headrest 13 including the pillar moves in the direction of extension of the seat back 10 as a result.

The neck rest 14 supports the occupant's neck from behind and is configured by a cushion material (not illustrated) being molded into a predetermined shape and the periphery of the cushion material being covered with a skin material.

In addition, the neck rest 14 is provided with a through hole (not illustrated). The neck rest 14 is supported by the pillar by the pillar of the headrest 13 being inserted through the through hole. It should be noted that the part of the pillar that protrudes from the through hole of the neck rest 14 is inserted in the upper end portion of the seat back 10. Accordingly, the neck rest 14 is positioned below the headrest 13 and above the seat back 10 when the seat unit 1 is in the standing posture.

In addition, in the present embodiment, the neck rest movable mechanism 19 is capable of moving the neck rest 14 with respect to the headrest 13 along the direction of extension of the seat back 10. Specifically, the neck rest 14 is capable of sliding (performing a slide movement) along each of the pillar of the headrest 13 and the stay in the seat back 10. In other words, in the present embodiment, the position where the occupant's neck is supported can be changed in the direction of extension by the movement of the neck rest 14 being changed. For example, in a case where the head support position has been changed by the headrest 13 being moved, the neck support position is changed by the neck rest 14 being moved so as to correspond to the change.

It should be noted that the neck rest 14 moves alone when the neck rest 14 moves along the direction of extension of the seat back 10. In other words, the neck rest 14 according to the present embodiment is capable of moving in a state where the neck rest 14 is separated from the headrest 13. In other words, in the present embodiment, each of the headrest 13 and the neck rest 14 can be moved independently.

The support member 32 is a member that supports the seat main body S from below and is attached to the lower portion of the seat cushion 11. Specifically, the support member 32 is configured by the frame member that interconnects the seat main body S and the slide mechanism 20 being covered with a cover member. It should be noted that the ECU 40 as a control unit controlling each portion of the seat unit 1 is accommodated in the support member 32. It is a matter of course that the ECU 40 may be accommodated in the seat back 10, the seat cushion 11, or the like as well as the support member 32 or may be externally attached to the seat main body S.

The slide mechanism 20 is a mechanism for sliding the seat main body S in the front to back direction with respect to a vehicle body floor F. The slide mechanism 20 is provided with an upper rail 21, a lower rail 22, and a slide motor for sliding the upper rail 21 with respect to the lower rail 22.

The upper rail 21 is fixed to the seat main body S via the support member 32 and the lower rail 22 is fixed to the vehicle body floor F. Here, it is possible to move the seat main body S, that is, the seat back 10, the seat cushion 11, and the ottoman 12 forward and backward as a unit with respect to the vehicle body floor F by operating the slide motor and sliding the upper rail 21 forward and backward with respect to the lower rail 22.

The armrest 33 is an arm rest portion provided on both sides of the seat back 10. The armrest 33 is attached to the seat back 10 so as to be capable of pivoting about a shaft portion 33a. It should be noted that the armrest 33 may be electrically pivoted by a pivot motor (not illustrated).

In addition, the seat unit 1 is provided with various sensors and various devices in addition to the configuration described above. For example, in the present embodiment, the seat unit 1 is provided with an occupant detection sensor 23, a temperature adjustment unit 24, a lumbar support mechanism 25, a pressure sensor 26, a vibration motor 27, a first distance sensor 28, a second distance sensor 29, an illuminance sensor 30, and an operating switch 31 as illustrated in FIGS. 2 and 3.

The occupant detection sensor 23 is a sensor provided in the seat cushion 11 and detecting that an occupant is seated on the seat back 10 and, for example, a sensor (pressure sensor) for a seat belt reminder constitutes the occupant detection sensor 23.

The temperature adjustment unit 24 is a device that is provided between the skin and the cushion material of the seat cushion 11 and adjusts the temperature of the seating surface portion of the seat cushion 11. For example, the temperature adjustment unit 24 is provided with a temperature sensor (such as a thermistor), a heating element (such as a heater) for warming the seating surface, and a cooling element (such as a Peltier element) for cooling the seating surface. Further, the temperature adjustment unit 24 operates such that the temperature of the seating surface of the seat cushion 11 approaches a preset target value by switching the ON/OFF of the heating element and the cooling element in accordance with the temperature detected by the temperature sensor and a preset target temperature.

An inflatable and deflatable bag body (so-called air lumbar) disposed directly behind a backrest surface in the seat cushion 11 constitutes the lumbar support mechanism 25. Further, the seat back upper portion 10a is displaced so as to approach the occupant once the lumbar support mechanism 25 inflates and the seat back upper portion 10a is displaced so as to be separated from the occupant once the lumbar support mechanism 25 deflates.

The pressure sensor 26 is a sensor detecting that the occupant's neck is in contact with the support surface of the neck rest 14. For example, the neck rest 14 may be slid upward and downward by the neck rest movable mechanism 19 until the pressure sensor 26 detects a predetermined pressure.

The vibration motor 27 is a device that is provided in the neck rest 14 and applies a vibration stimulus to the back of an occupant sitting in the seat unit 1. For example, the vibration motor 27 may be used for the occupant sitting in the seat unit 1 to be given a massage or may be used so that a vibration stimulus is applied to the occupant and the occupant returns to a state of wakefulness in a case where it is detected that the occupant is in a state of low wakefulness.

The first distance sensor 28 is a sensor that is provided in the headrest 13 and detects the distance between a predetermined position of the headrest 13 and an occupant's head.

For example, the headrest movable mechanism 18 may slide the headrest 13 in the up to down direction based on the distance data detected by the first distance sensor 28.

Specifically, the neck rest 14 is moved by the neck rest movable mechanism 19 such that the pressure detected by the pressure sensor 26 becomes a predetermined value after the headrest 13 is moved by the headrest movable mechanism 18 such that the distance detected by the first distance sensor 28 becomes a predetermined value.

The second distance sensor 29 is a sensor that is provided in the headrest 13 and detects the distance between the headrest 13 and an object in front of the headrest 13. For example, the pivoting and extension by the ottoman movable mechanism 17 may be stopped in a case where the distance detected by the second distance sensor 29 has become equal to or less than a predetermined value while the ottoman 12 is pivoted upward by the ottoman movable mechanism 17 and deployed.

The illuminance sensor 30 is a sensor for detecting the brightness around the seat unit 1, that is, the brightness of the inner portion of a vehicle V in which the seat unit 1 is mounted and is provided on, for example, the neck rest 14. For example, the illuminance of a lighting system 50 provided in the vehicle V may be controlled in accordance with the brightness detected by the illuminance sensor 30.

The operating switch 31 is provided in the side portion of the seat cushion 11 of the seat unit 1 and is an operating unit for instructing the posture deformation of the seat unit 1. For example, the operating switch 31 may include a first switch for deforming the seat unit 1 from the standing posture to the tilt posture and a second switch for deforming the seat unit 1 from the tilt posture to the standing posture.

The ECU 40 is a control unit receiving an output signal from each of the sensors described above and controlling each drive mechanism based on the received signal.

As illustrated in FIG. 3, the ECU 40 is provided with a processor 41, a memory 42, and an input-output interface 43.

The processor 41 is a central processing unit that executes various types of arithmetic processing based on a program or data stored in the memory 42 and controls each portion of the seat unit 1.

The memory 42 is, for example, a semiconductor memory and functions as a work memory for the processor 41 as well as a memory storing various programs and data.

The input-output interface 43 is connected to the back movable mechanism 15, the cushion movable mechanism 16, the ottoman movable mechanism 17, the headrest movable mechanism 18, the neck rest movable mechanism 19, the slide mechanism 20, the occupant detection sensor 23, the temperature adjustment unit 24, the lumbar support mechanism 25, the pressure sensor 26, the vibration motor 27, the first distance sensor 28, the second distance sensor 29, the illuminance sensor 30, the operating switch 31, and the lighting system 50 and communicates with each device.

Further, the processor 41 executes various types of arithmetic processing and controls each device based on a signal received from each device connected via the input-output interface 43.

Specifically, the ECU 40 aligns the headrest 13 and the neck rest 14 based on an output signal from the occupant detection sensor 23. In other words, the ECU 40 operates the headrest movable mechanism 18 and the neck rest movable mechanism 19 based on an output signal from the first distance sensor 28 of the headrest 13. As a result, the headrest 13 and the neck rest 14 are moved along the direction of extension of the seat back 10.

At this time, the ECU 40 controls the amounts of displacement of the headrest movable mechanism 18 and the neck rest movable mechanism 19 based on output signals from the first distance sensor 28 of the headrest 13 and the pressure sensor 26 of the neck rest 14.

In addition, the seat unit 1 is provided with the operating switch 31 for posture switching as described above. The operating switch 31 is a push button-type switch provided on a vehicle door or an armrest and is operated when an occupant seated in the seat unit 1 switches the posture of the seat back 10.

Once the operating switch 31 is operated, a signal corresponding to the content of the operation is output from the operating switch 31 and the illuminance sensor 30 controls each drive mechanism based on the output signal from the operating switch 31. Specifically, the ECU 40 controls the slide mechanism 20, the back movable mechanism 15, the cushion movable mechanism 16, and the ottoman movable mechanism 17 such that the front and back positions of the seat unit 1 and each of the seat back 10, the seat cushion 11, and the ottoman 12 move to the position at a time of the tilt posture once the operating switch 31 is operated so as to switch the posture of the seat back 10 in the standing posture to the tilt posture.

<<Regarding Operation During Deformation of Seat Unit 1>>

Hereinafter, the operation during the deformation of the seat unit 1 from the standing posture to the tilt posture will be described in detail with reference to FIGS. 4 to 11.

It should be noted that the position of the seat back 10 at a time when the seat unit 1 is in the standing posture is "first standing position" and the position of the seat back 10 at a time when the seat unit 1 is in the tilt posture is "tilt position" (corresponding to a first state) in the following description.

In addition, the position of the seat cushion 11 at a time when the seat unit 1 is in the standing posture is "second standing position" and the position of the seat cushion 11 at a time when the seat unit 1 is in the tilt posture is "rise position" (corresponding to a second state).

In addition, the position of the ottoman 12 at a time when the seat unit 1 is in the standing posture is "third standing position" and the position of the ottoman 12 at a time when the seat unit 1 is in the tilt posture is "deployment position" (corresponding to a third state).

In the example described below, the vehicle V has three rows of seats and the seat unit 1 according to the present embodiment is used for the front seat (a seat unit 1A) and the middle seat (a seat unit 1B). Further, the operation of the seat unit 1B, which is the middle seat, is deformed from the standing posture illustrated in FIG. 4 to the tilt posture illustrated in FIG. 6 in the example described below.

It should be noted that "tilt posture" is a posture at a time when the seat back 10 tilts backward, the front end of the seat cushion 11 slightly rises, and the ottoman 12 is at the deployment position. Further, an occupant's posture is a so-called neutral posture when the occupant is seated in the seat unit 1 that is in the tilt posture. The neutral posture is a posture that is least burdensome for the seated occupant in the seat and the occupant is unlikely to become tired in the neutral posture.

Figure 6:
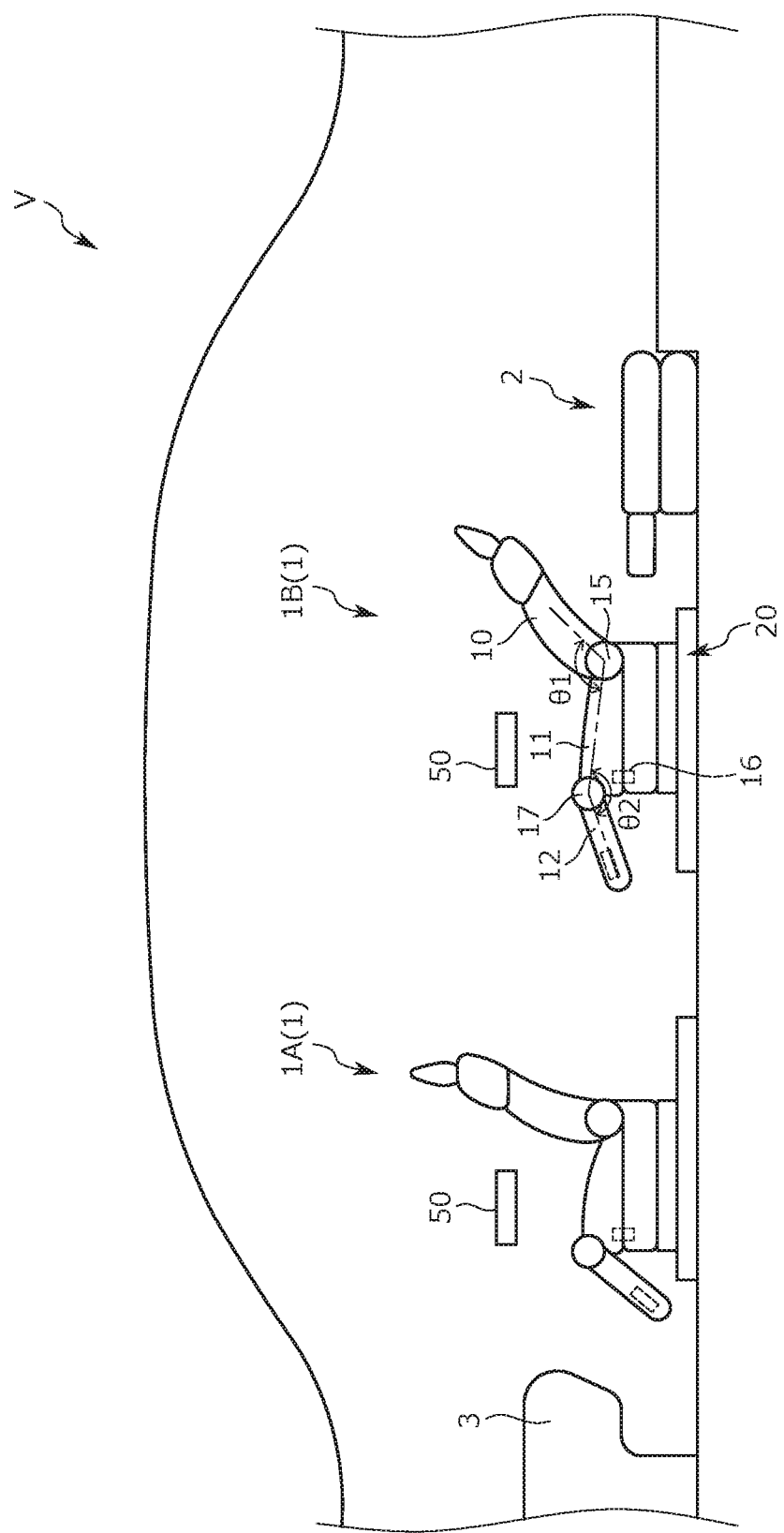
FIG. 6 is a diagram illustrating a state where the seat unit in a second row has been deformed into a tilt posture.

Specifically, as illustrated in FIG. 6, 128 degrees is an example of $\theta 1$ and 133 degrees is an example of $\theta 2$ in a case where the angle formed by the seat back 10 and the seat cushion 11 is $\theta 1$, the angle formed by the seat cushion 11 and the ottoman 12 is $\theta 2$, and the seat unit 1 is in the tilt posture.

It is a matter of course that the numerical values of θ1 and θ2 are not limited to the above examples. As an example, θ1 may be 121 degrees to 135 degrees and θ2 may be 125 degrees to 141 degrees.

Figure 4:
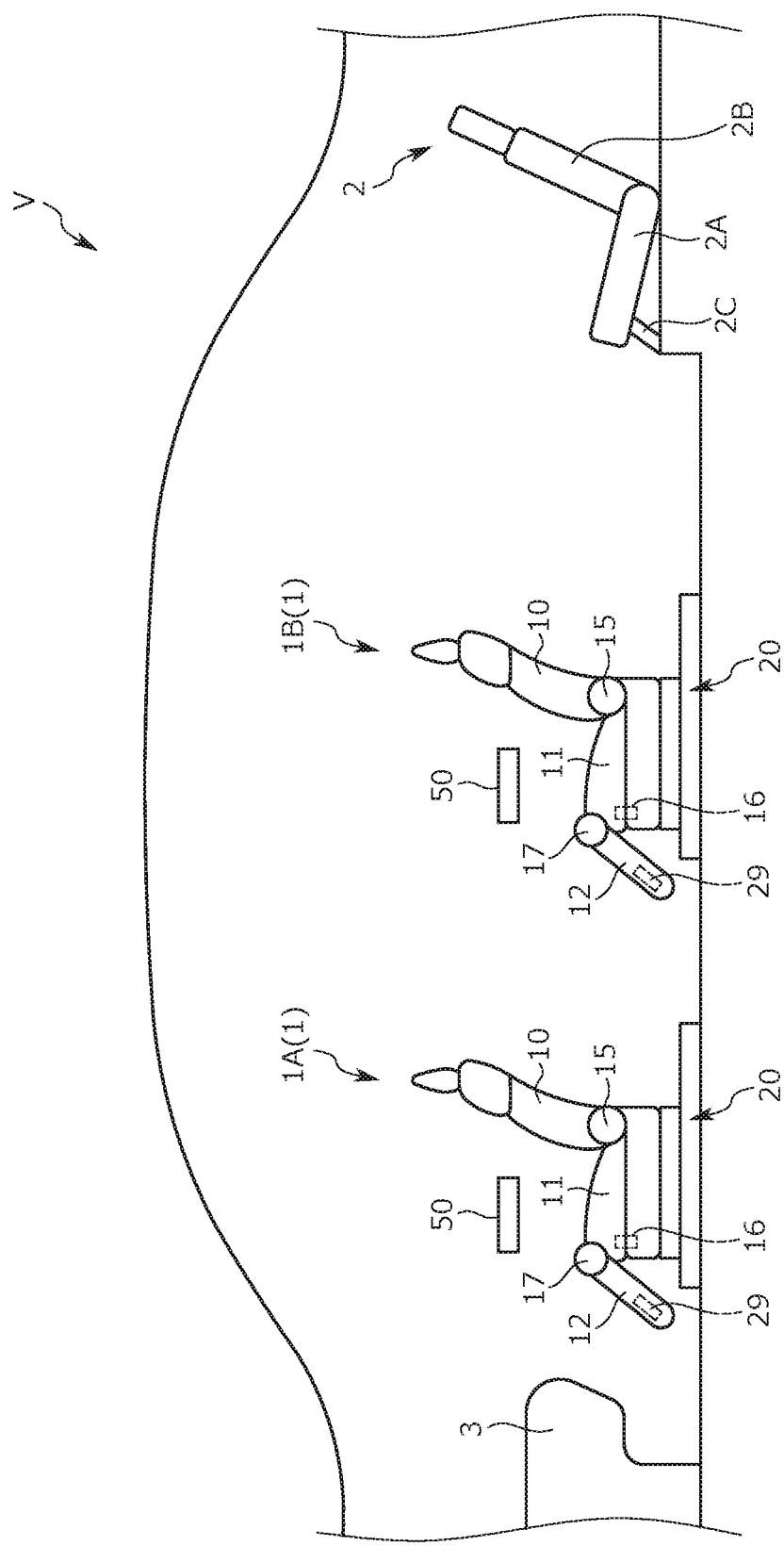
FIG. 4 is a diagram schematically illustrating the interior space of a vehicle in which the seat unit is mounted.

A state where the seat unit 1B is in the standing posture is illustrated in FIG. 4. In this state, the ECU 40 initiates processing for a transition to the standing posture once an occupant inputs an operation for switching to the standing posture by means of the operating switch 31.

In other words, once an occupant performs an operation for switching the seat unit 1 to the tilt posture, the operating switch 31 outputs a signal corresponding to the content of the operation in response to the operation. Once the ECU 40 receives the output signal from the operating switch 31, the ECU 40 executes the processing of a tilt posture transition flow by using the received output signal as a trigger.

Figure 5:
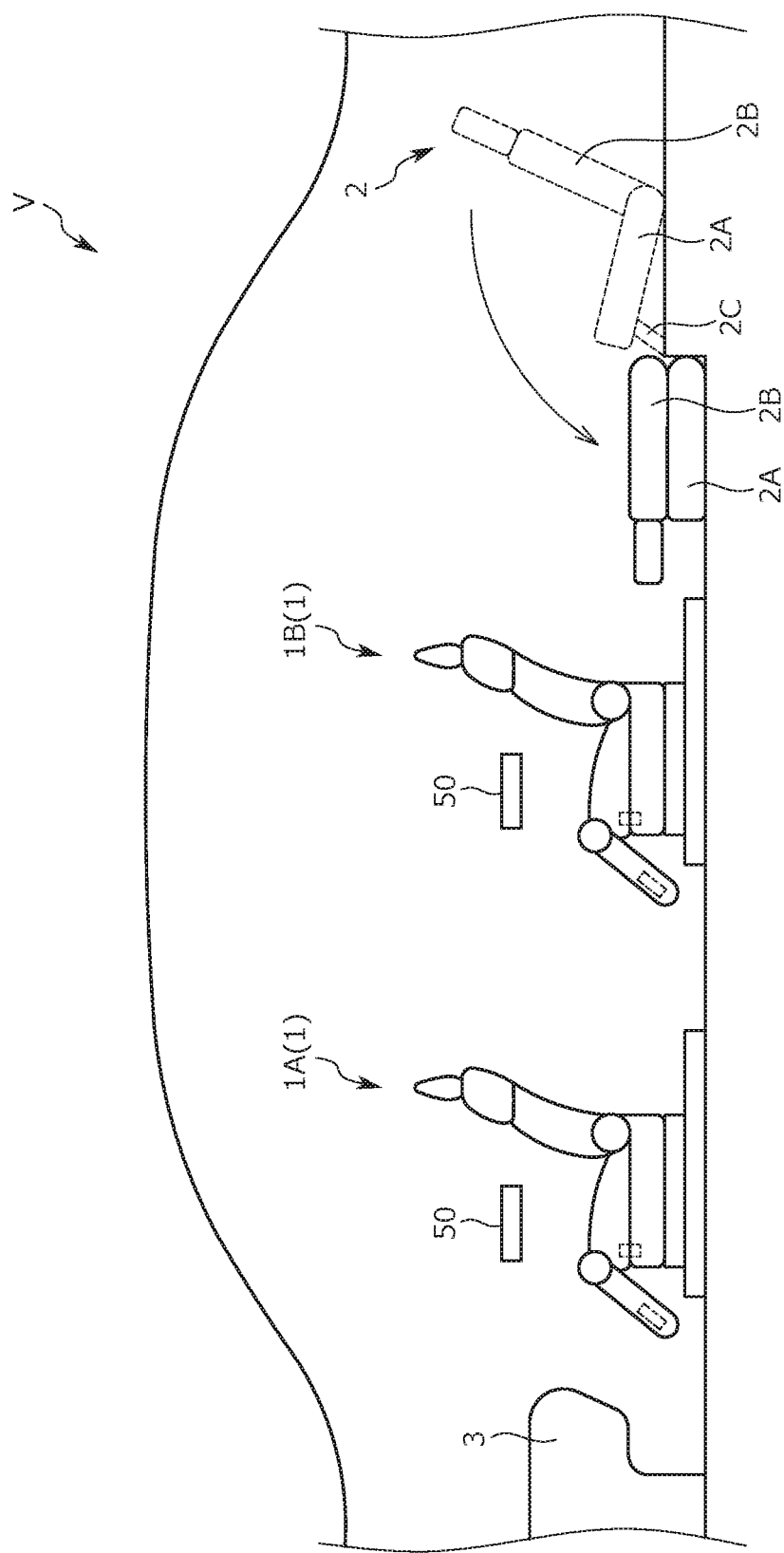
FIG. 5 is a diagram illustrating a state where the third row seat of the vehicle is folded.

Specifically, once the ECU 40 receives the output signal from the operating switch 31, the ECU 40 executes processing for folding a third row seat 2 as illustrated in FIG. 5.

For example, the third row seat 2 is provided with a seat cushion 2A, a seat back 2B, and a link mechanism 2C and the seat cushion 2A and the seat back 2B of the third row seat 2 are overlapped and folded by the link mechanism 2C being pivoted forward.

Next, the ECU 40 calculates the amounts of movement of the seat back 10, the seat cushion 11, the ottoman 12, and the upper rail 21 necessary for the transition to the tilt posture.

Specifically, the ECU 40 first specifies the current position of each of the seat back 10, the seat cushion 11, the ottoman 12, and the upper rail 21 from the Hall IC of the actuator that constitutes the back movable mechanism 15, the cushion movable mechanism 16, the ottoman movable mechanism 17, and the slide mechanism 20.

Next, the ECU 40 calculates the amount of movement from the specified current position (current state) to a target position (target state) in the tilt posture with regard to each of the seat back 10, the seat cushion 11, the ottoman 12, and the upper rail 21. Here, the target position in the tilt posture corresponds to "tilt position" for the seat back 10, "rise position" for the seat cushion 11, and "deployment position" for the ottoman 12. In addition, the target position of the upper rail 21 is a predetermined position in the front to back direction (such as the maximum rear position to which the upper rail 21 is movable).

Next, the ECU 40 calculates the amount of movement of each of the seat back 10, the seat cushion 11, the ottoman 12, and the upper rail 21 and then calculates the required time for the amounts of movement to be realized by the back movable mechanism 15, the cushion movable mechanism 16, the ottoman movable mechanism 17, and the slide mechanism 20. Here, the required time of the back movable mechanism 15 is a first operation time, the required time of the cushion movable mechanism 16 is a second operation time, the required time of the ottoman movable mechanism 17 is a third operation time, and the required time of the slide mechanism 20 is a fourth operation time.

Specifically, as for the first operation time to the third operation time, the first operation time is the longest, the third operation time is the second-longest, and the second operation time is the shortest. This reflects that the amount of movement of the seat back 10 is the largest, the amount of movement of the ottoman 12 is the second-largest, and the amount of movement of the seat cushion 11 is the smallest when the seat unit 1 is switched from the standing posture to the tilt posture.

Next, the ECU 40 sets (determines) time points at which the movement of the seat back 10 by the back movable mechanism 15, the movement of the seat cushion 11 by the cushion movable mechanism 16, and the movement of the ottoman 12 by the ottoman movable mechanism 17 are to be initiated (transition initiation timings) based on the first operation time to the third operation time. Specifically, the ECU 40 sets the respective movement initiation time points such that the timings at which the seat back 10 finishes moving, the seat cushion 11 finishes moving, and the ottoman 12 finishes moving are aligned.

A procedure for setting the movement initiation time point will be described with reference to FIG. 11.

Figure 11:
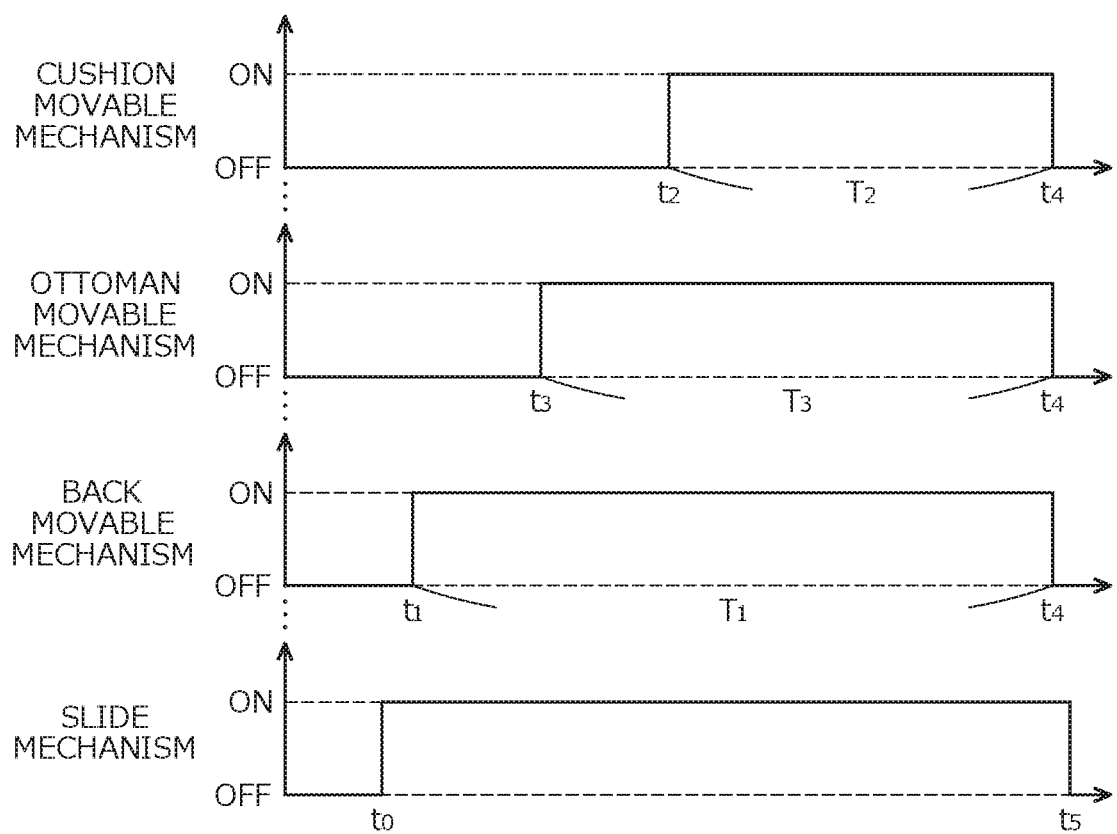
FIG. 11 is a timing chart of the operations of a slide mechanism, a back movable mechanism, a cushion movable mechanism, and an ottoman movable mechanism during seat posture deformation.

In the timing chart illustrated in FIG. 11, the operation time of the slide mechanism 20 is the longest and the ECU 40 operates the slide mechanism 20 at t0, which is a predetermined time after the point in time at which the operating input of the operating switch 31 is received. Further, the ECU 40 sets a movement termination time point (t4) common to the seat back 10, the seat cushion 11, and the ottoman 12 before the end of an operation termination time point (t5) of the slide mechanism 20. It is a matter of course that the timing of t4 and the timing of t5 may be simultaneous or t5 may precede t4.

Next, T1, T2, and T3 have a relationship of T1>T2>T3 assuming that the first operation time is T1, the second operation time is T2, and the third operation time is T3.

Further, the ECU 40 sets a first initiation timing (t1), which is the operation initiation timing of the back movable mechanism 15, to the point in time that precedes the movement termination time point (t4) by T1.

In addition, the ECU 40 sets a second initiation timing (t2), which is the operation initiation timing of the cushion movable mechanism 16, to the point in time that precedes the movement termination time point (t4) by T2.

In addition, the ECU 40 sets a third initiation timing (t3), which is the operation initiation timing of the ottoman movable mechanism 17, to the point in time that precedes the movement termination time point (t4) by T3.

In this case, the first initiation timing (t1), the third initiation timing (t3), and the second initiation timing (t2) are in this order.

The ECU 40 initiates the operation of the back movable mechanism 15 at the first initiation timing set as a result of the above processing, initiates the operation of the cushion movable mechanism 16 at the second initiation timing set as a result of the above processing, and initiates the operation of the ottoman movable mechanism 17 at the third initiation timing set as a result of the above processing.

The timing of the initiation of the operation of the back movable mechanism 15 by the ECU 40, the timing of the initiation of the operation of the cushion movable mechanism 16 by the ECU 40, and the timing of the initiation of the operation of the ottoman movable mechanism 17 by the ECU 40 will be described in more detail with reference to FIGS. 7 to 10.

Figure 7:
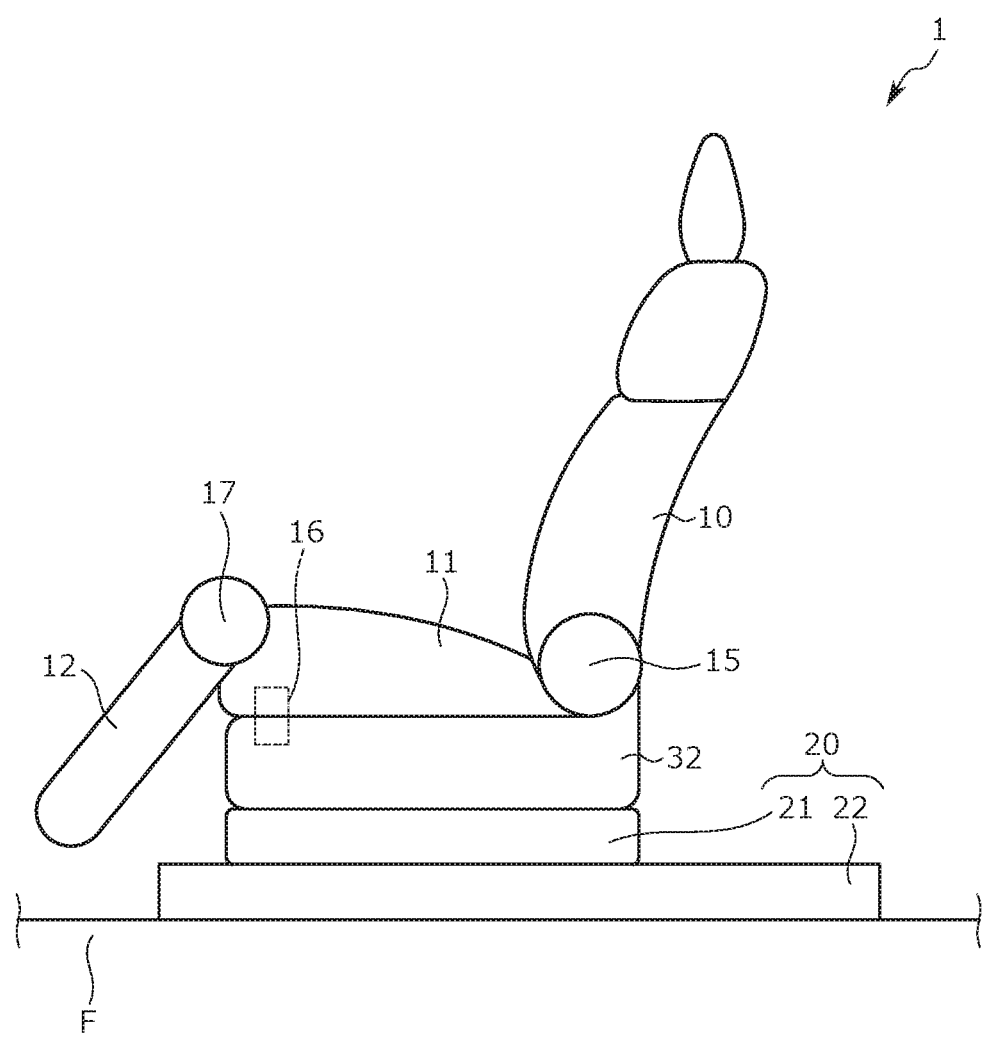
FIG. 7 is a diagram illustrating the standing posture of the seat unit.
Figure 8:
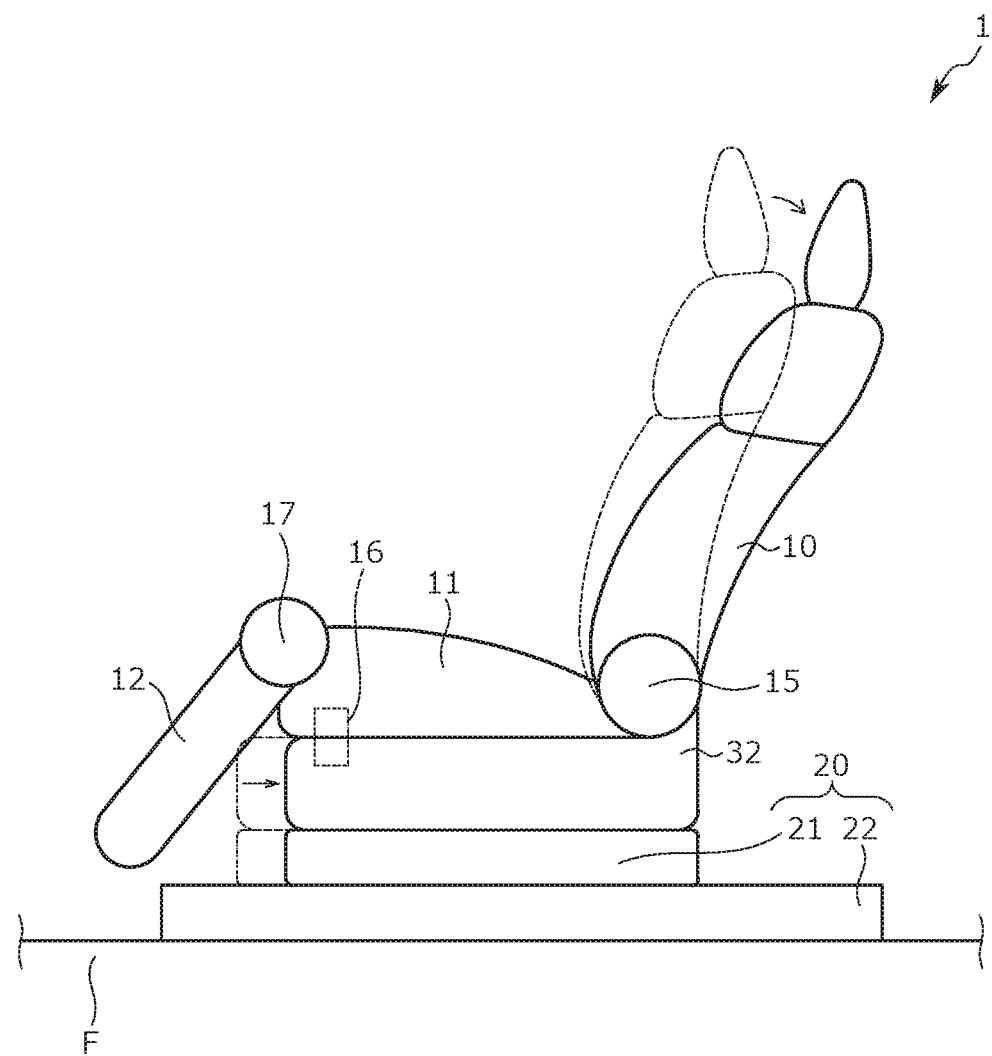
FIG. 8 is a diagram illustrating a state during seat unit deformation.
Figure 9:
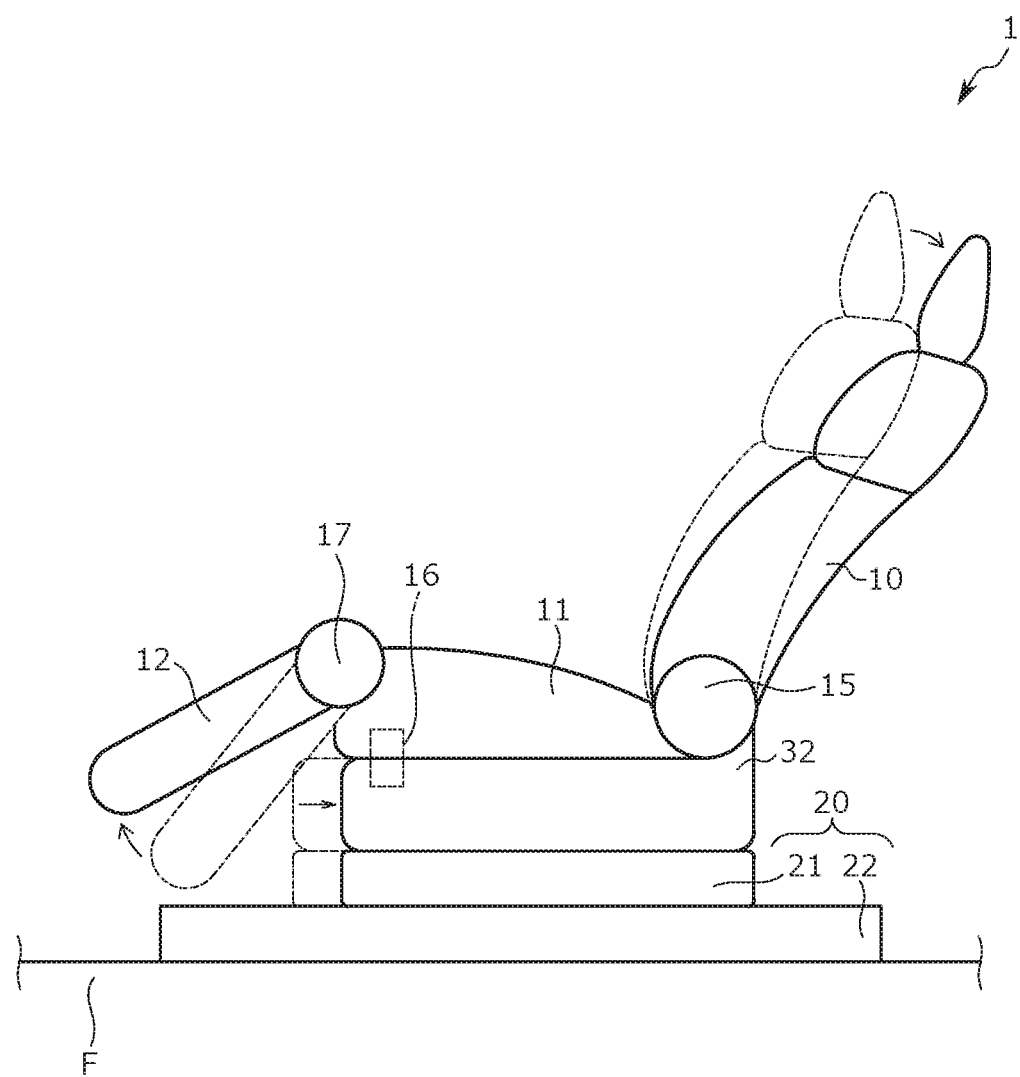
FIG. 9 is a diagram illustrating a state during seat unit deformation.

FIG. 7 corresponds to the state at the movement initiation time point (standing posture). FIG. 8 corresponds to the state between the first initiation timing and the third initiation timing. FIG. 9 corresponds to the state between the third initiation timing and the second initiation timing. Further, FIG. 10 corresponds to the state between the third initiation timing and the movement termination time point (tilt posture).

First, the ECU 40 initiates the operation of the slide mechanism 20 and initiates a backward movement of the seat main body S after the elapse of a predetermined time from the operation time point of the operating switch 31.

Next, as illustrated in FIG. 8, the ECU 40 initiates the operation of the back movable mechanism 15 and starts to tilt the seat back 10 backward at the first initiation timing.

Subsequently, as illustrated in FIG. 9, the ECU 40 initiates the operation of the ottoman movable mechanism 17 and starts to deploy the ottoman 12 at the third initiation timing.

Figure 10:
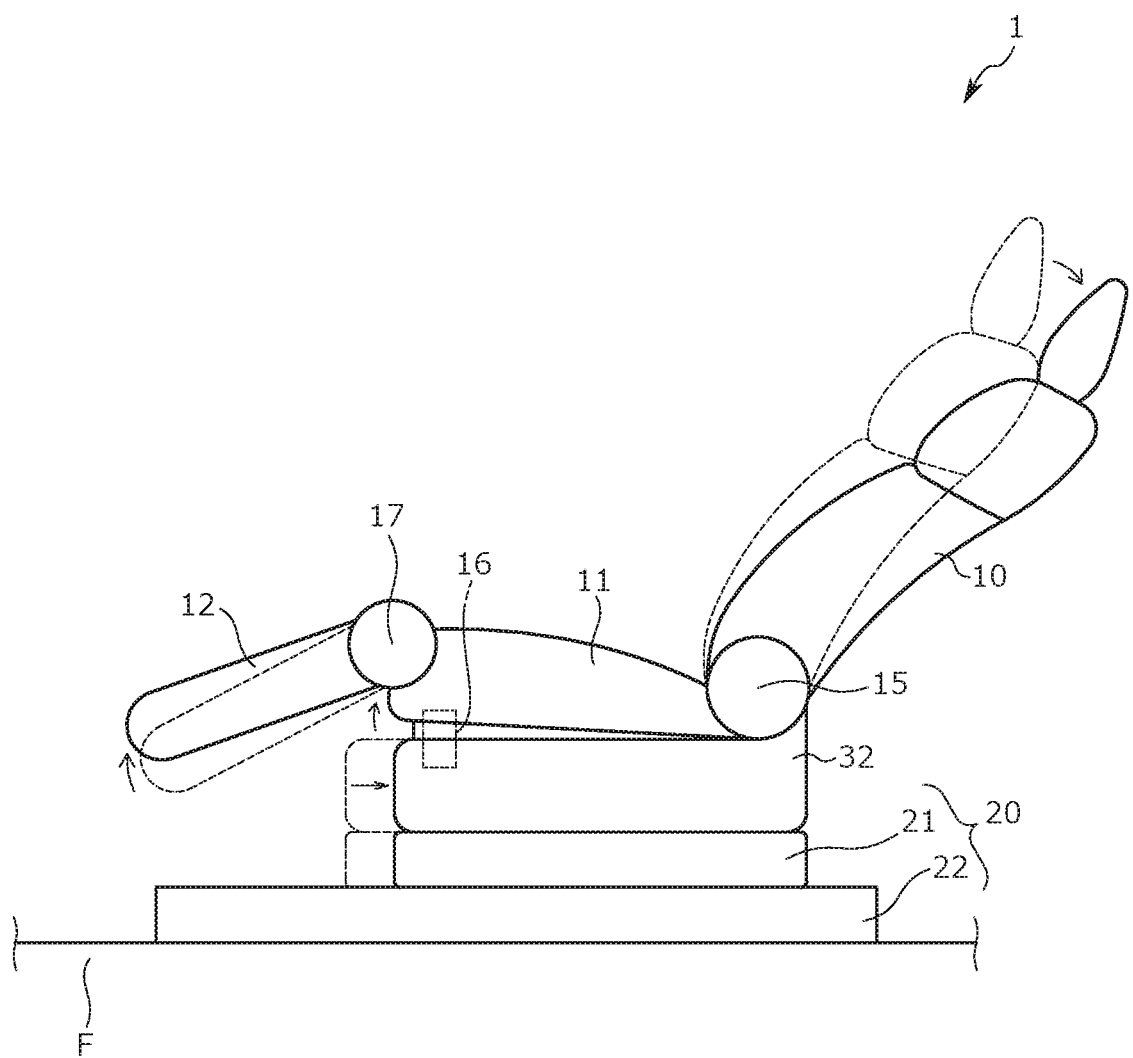
FIG. 10 is a diagram illustrating a state during seat unit deformation.

Next, as illustrated in FIG. 10, the ECU 40 initiates the operation of the cushion movable mechanism 16 and starts to pivot the front end portion of the seat cushion 11 at the second initiation timing.

Then, the ECU 40 stops operating the back movable mechanism 15, the cushion movable mechanism 16, and the ottoman movable mechanism 17 at the movement termination time point (t4) of the seat back 10, the seat cushion 11, and the ottoman 12.

Lastly, the ECU 40 stops the operation of the slide mechanism 20 and completes the transition of the seat unit 1 to the tilt posture at the operation termination time point (t5) of the slide mechanism 20.

It should be noted that the respective movement termination time points of the seat back 10, the seat cushion 11, and the ottoman 12 coincide with each other in the present embodiment. In other words, in the present embodiment, the seat back 10 reaches the tilt position, the seat cushion 11 reaches the rise position, and the ottoman 12 reaches the deployment position at substantially the same timing. By the movement of each portion of the seat ending at the same timing in this manner, an occupant seated in the seat unit 1 can recognize a point in time at which seat posture deformation ends with his or her senses. In addition, since the occupant is seated in the seat unit 1 even during posture switching, the occupant feels more comfortable in a case where the movement of each portion of the seat ends at the same time than in a case where the operations of the respective portions of the seat end in order.

In addition, in the seat unit 1, the seat back 10, the seat cushion 11, and the ottoman 12 are moved while the seat unit 1 is slid backward by the slide mechanism 20 when the transition from the standing posture to the tilt posture is performed, and thus it is possible to shorten the time that is required to complete the transition from the standing posture to the tilt posture as compared with a case where the seat back 10, the seat cushion 11, and the ottoman 12 are moved before and after sliding.

Another Embodiment

The present invention is not limited to the embodiment described above.

For example, the seat unit according to the present invention is not limited to application to vehicle seats and the seat unit according to the present invention is applicable to the seats of other occupant-entering conveyances (for example, non-automobile vehicles such as railway vehicles, aircraft, and ships) and seats for medical examination at hospitals, dental clinics, and the like.

In addition, the control of the back movable mechanism 15, the cushion movable mechanism 16, the ottoman movable mechanism 17, and the slide mechanism 20 of the seat unit 1 is applicable not only to the case of standing-to-tilt posture deformation but also to cases of tilt-to-standing posture deformation and any other general processing for deformation from a first posture to a second posture.

In addition, in the seat unit 1, the seat back 10, the seat cushion 11, the ottoman 12, the headrest 13, and the neck rest 14 of the seat unit 1 and the front and back positions of the seat unit 1 may be appropriately changed in accordance with a target posture by the headrest movable mechanism 18 and the neck rest movable mechanism 19 being operated in addition to the back movable mechanism 15, the cushion movable mechanism 16, the ottoman movable mechanism 17, and the slide mechanism 20.

In addition, in the seat unit 1A disposed at the position of the front seat, the pivot angle and the amount of extension of the ottoman 12 may be regulated in accordance with the distance between the ottoman 12 and an instrument panel 3 (a detection result) detected by the second distance sensor 29 provided in the ottoman 12.

In addition, in a case where the seat unit 1A is disposed in a driver's seat and a case where the seat unit 1A is disposed in a passenger seat, the target positions of the seat back 10, the seat cushion 11, and the ottoman 12 or the like may be set different between the standing and tilt postures.

In addition, in the seat unit 1, an occupant's lumbar region may be pressed by, for example, the lumbar support mechanism 25 being operated at predetermined time intervals.

In addition, in the seat unit 1, an occupant's cardiac rhythm may be detected by means of the occupant detection sensor 23, the pressure sensor 26, or another heart rate sensor and the lighting of the lighting system 50 may be controlled in accordance with the detected cardiac rhythm.

In addition, a first movable mechanism is not limited to the slide mechanism 20, the first movable mechanism may be any of the back movable mechanism 15, the cushion movable mechanism 16, the ottoman movable mechanism 17, the headrest movable mechanism 18, and the neck rest movable mechanism 19, and the first movable mechanism may be another movable mechanism.

In addition, the seat unit 1 may further include a side support mechanism that supports a seated occupant in the seat main body S from the side portion.

Figure 12:
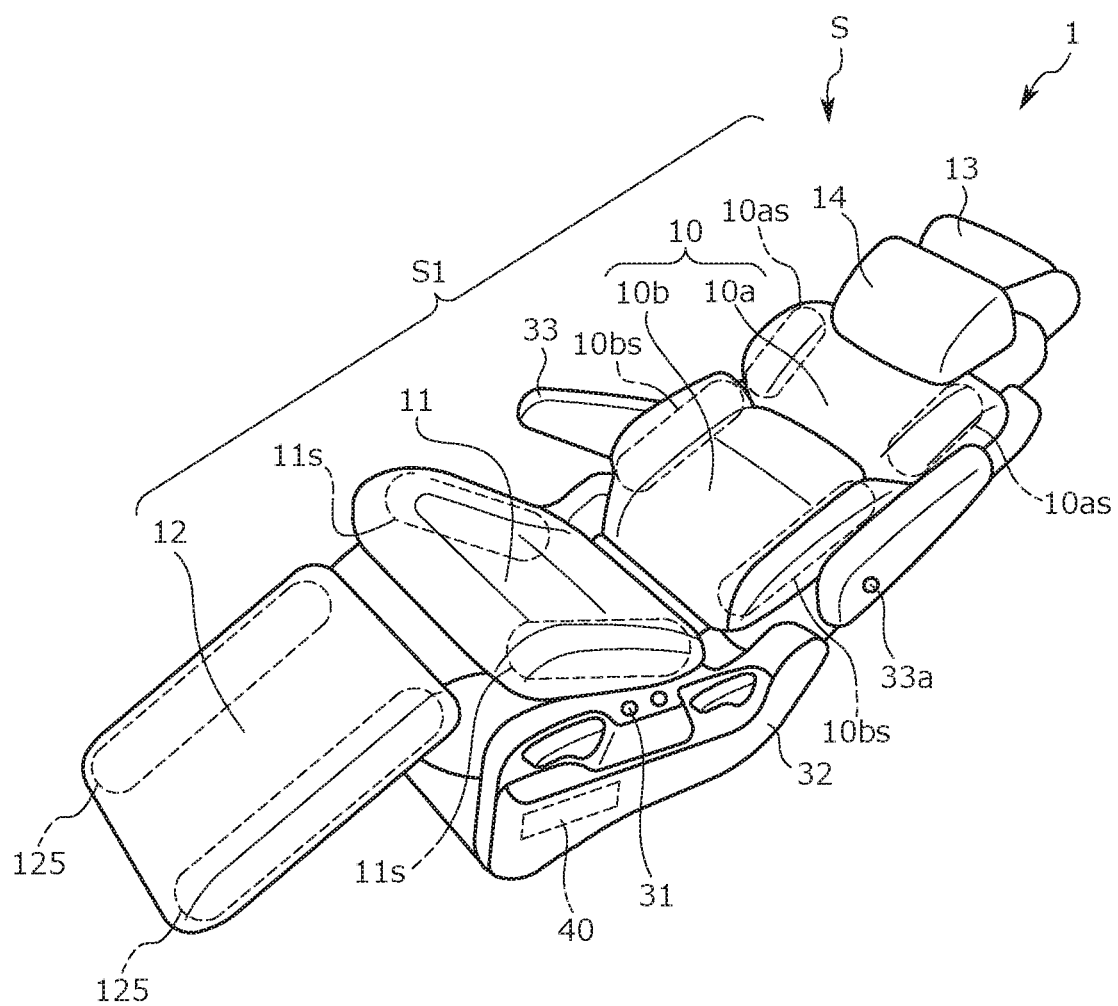
FIG. 12 is a diagram illustrating a seat unit according to a modification example.

Specifically, as illustrated in FIG. 12, a side support portion 10*as* switchable between a protrusion state and a storage state may be provided in the side portion of the seat back upper portion 10*a* and a side support portion 10*bs* switchable between a protrusion state and a storage state may be provided in the side portion of the seat back lower portion 10*b*. In addition, a side support portion 11S switchable between a protrusion state and a storage state may be provided in the side portion of the seat cushion 11 and a side support portion 12S switchable between a protrusion state and a storage state may be provided in the side portion of the ottoman 12.

In this case, an occupant may be firmly supported by the side support being closed during the transition of the seat unit 1 from the standing posture to the tilt posture and the side support may be opened after the transition to the tilt posture is completed. In this manner, the seated occupant can be supported by the side support and his or her feeling of instability in terms of seating can be suppressed when the ottoman 12 has been moved upward.

In addition, the side support may be opened when the seat unit 1 moves from the standing posture to the tilt posture. In this manner, the seated occupant can correct his or her posture with ease.

In addition, the ECU 40 may allow the side support to be movable in accordance with the states of the vehicle such as the speed of the vehicle and a curve. For example, when the occupant's body is tilted to either the right or the left due to a curve or the like, the occupant's body can be supported with more firmness by the side support on the side of the tilting being closed.

The place where the side support portion is provided may be at least one of the seat back 10, the seat cushion 11, and the ottoman 12. In a case where each of the seat back 10, the seat cushion 11, and the ottoman 12 is provided with the side support portion, an occupant's lower as well as upper body can be firmly supported.

In addition, in the seat unit 1, the bag body of the lumbar support mechanism 25 may be deflated during a transition to the tilt posture. In this manner, it is possible to suppress the seated occupant's posture becoming unstable during the posture transition.

In addition, in the seat unit 1, a seated occupant's lumbar region may be massaged by the bag body of the lumbar support mechanism 25 being repeatedly inflated and deflated after the completion of a transition from the standing posture to the tilt posture.

In addition, in the seat unit 1, the inflation of the bag body of the lumbar support mechanism 25 may be initiated simultaneously with the initiation of a transition from the standing posture to the tilt posture and the termination of the inflation may be synchronized with the timing of the completion of the transition to the tilt posture. In this manner, it is possible to easily inform the seated occupant of the timing of the completion of the transition to the tilt posture.

In addition, the bag body may be deflated after the inflation of the bag body of the lumbar support mechanism 25 is initiated simultaneously with the initiation of the transition to the tilt posture. At this time, the termination of the bag body deflation may be synchronized with the timing of the completion of the transition to the tilt posture. In this manner, the seated occupant can be informed of the timing of the completion of the transition to the tilt posture in an easy-to-understand manner.

In addition, in the seat unit 1 described above, the lighting system 50 may include a light provided on the shoulder of the seat main body S, the headrest 13, or the neck rest 14.

Figure 13:
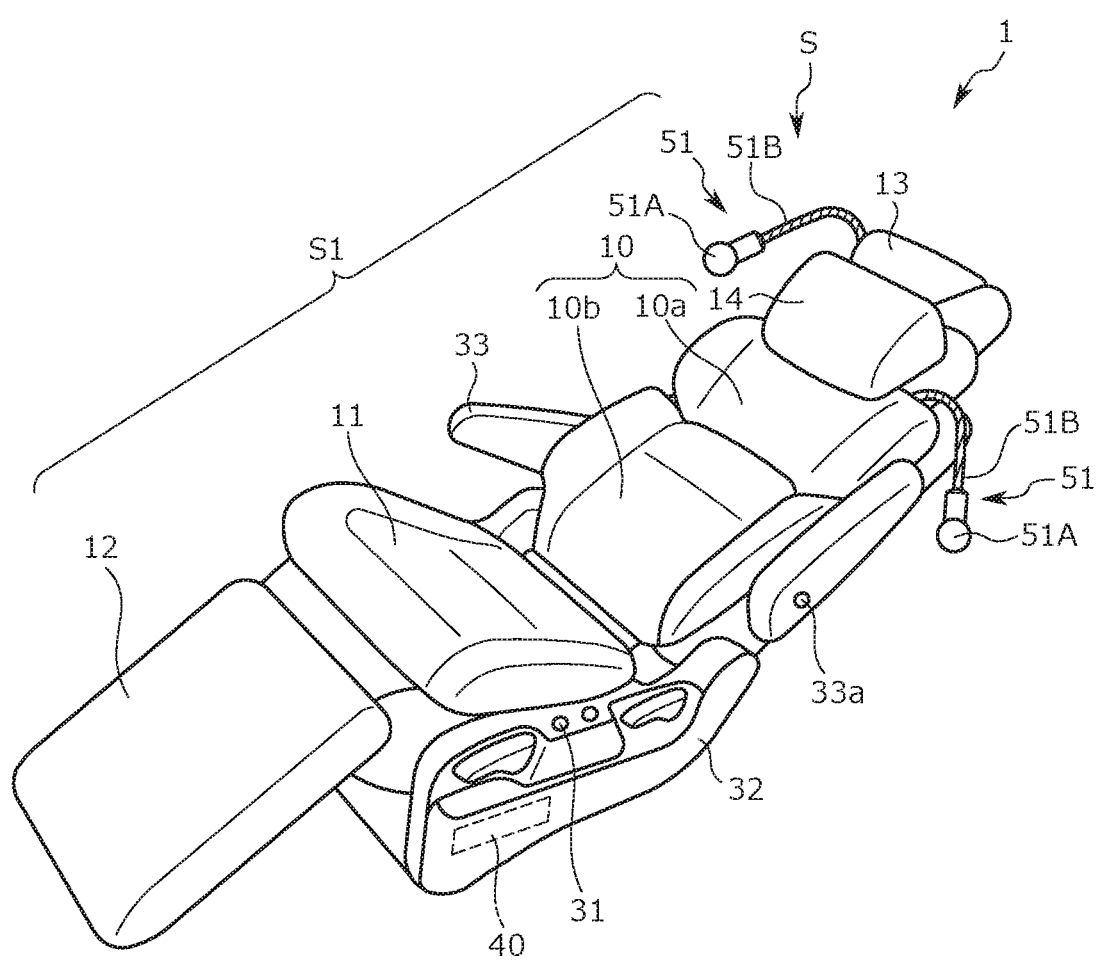
FIG. 13 is a diagram illustrating a seat unit according to a modification example.

Specifically, as illustrated in FIG. 13, the seat unit 1 may have a movable lighting unit 51 provided in the vicinity of the headrest 13 and the neck rest 14.

The movable lighting unit 51 is provided with a lighting unit 51A and a movable portion 51B. The lighting unit 51A is provided with a light emitting device such as an LED. Further, the movable portion 51B is a deformable member interconnecting the lighting unit 51A and the seat unit 1 and the lighting unit 51A can be moved to a position desired by an occupant by the movable portion 51B being deformed.

Further, the angle of the light may be changed when the inclination of the seat back 10 is changed by the back movable mechanism 15. Specifically and non-limitatively conceivable are, for example, a manual change in direction by means of a bellows structure or the like and an angle-changing structure provided with a movable mechanism, and ECU, and so on and capable of rotating in the up to down and right to left directions automatically and in conjunction with the inclination of the seat back 10.

Figure 14:
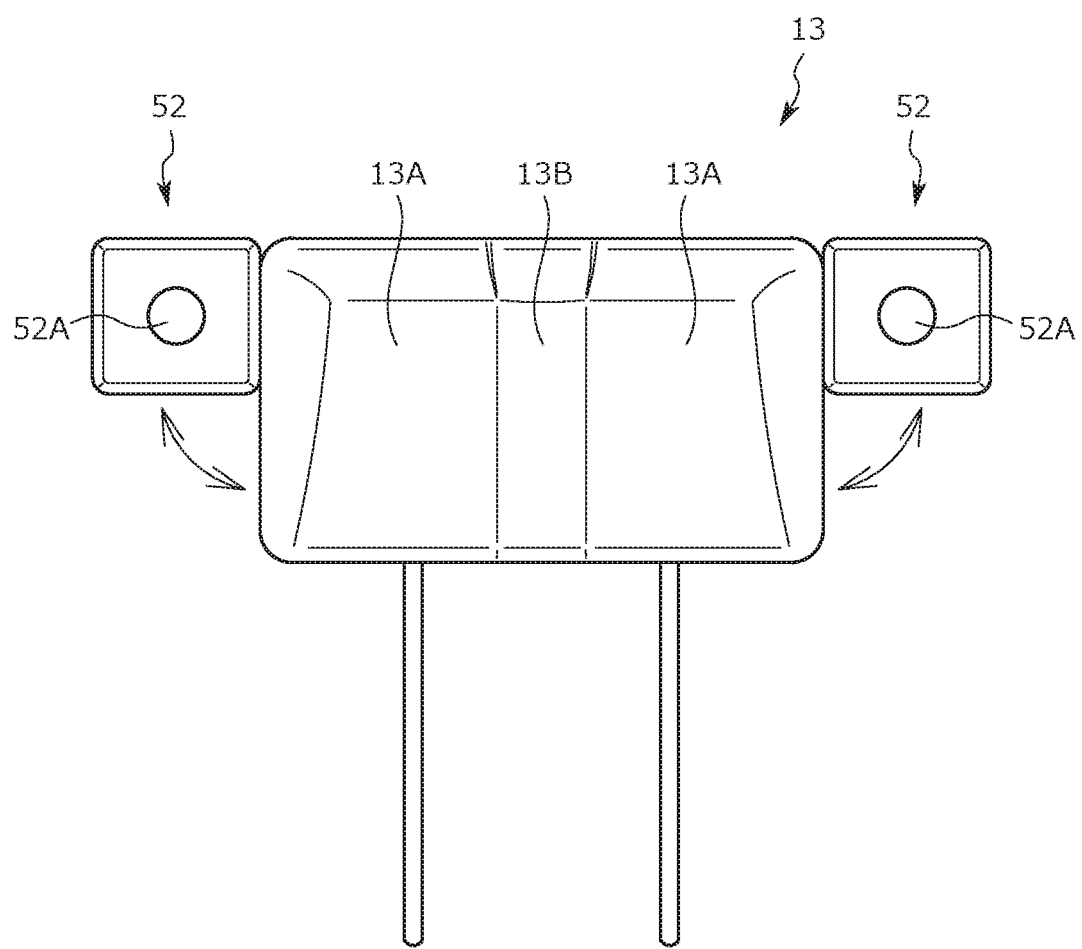
FIG. 14 is a diagram illustrating a headrest according to a modification example.

In addition, for example, the headrest 13 may be provided with a movable rotary lighting unit 52 as illustrated in FIG. 14. As for the headrest 13 that is illustrated in FIG. 14, a movable portion 13A that is movable in the front to back direction is provided in the side portion of a middle portion 13B and the movable rotary lighting unit 52 is provided behind the movable portion 13A.

The movable rotary lighting unit 52 may have a lighting unit 52A and the lighting unit 52A may be turned on with the movable rotary lighting unit 52 rotated and pulled out of the headrest 13. In addition, the lighting unit 52A may be turned off with the movable rotary lighting unit 52 stored inside the headrest 13.

In addition, in the seat unit 1, the angle of the armrest 33 may be controlled such that, for example, the armrest 33 is kept horizontal when the inclination of the seat back 10 has been changed by the back movable mechanism 15.

In addition, the positions of the headrest 13 and the neck rest 14 may be changed by the headrest movable mechanism 18 and the neck rest movable mechanism 19 in accordance with the inclination of the seat back 10.

For example, in a case where the headrest 13 is provided with right and left movable portions, the right and left movable portions may be closed so as to wrap a seated occupant's head at a time of the tilt posture.

In addition, the seat main body S may be provided with a speaker in the seat unit 1.

Figure 15:
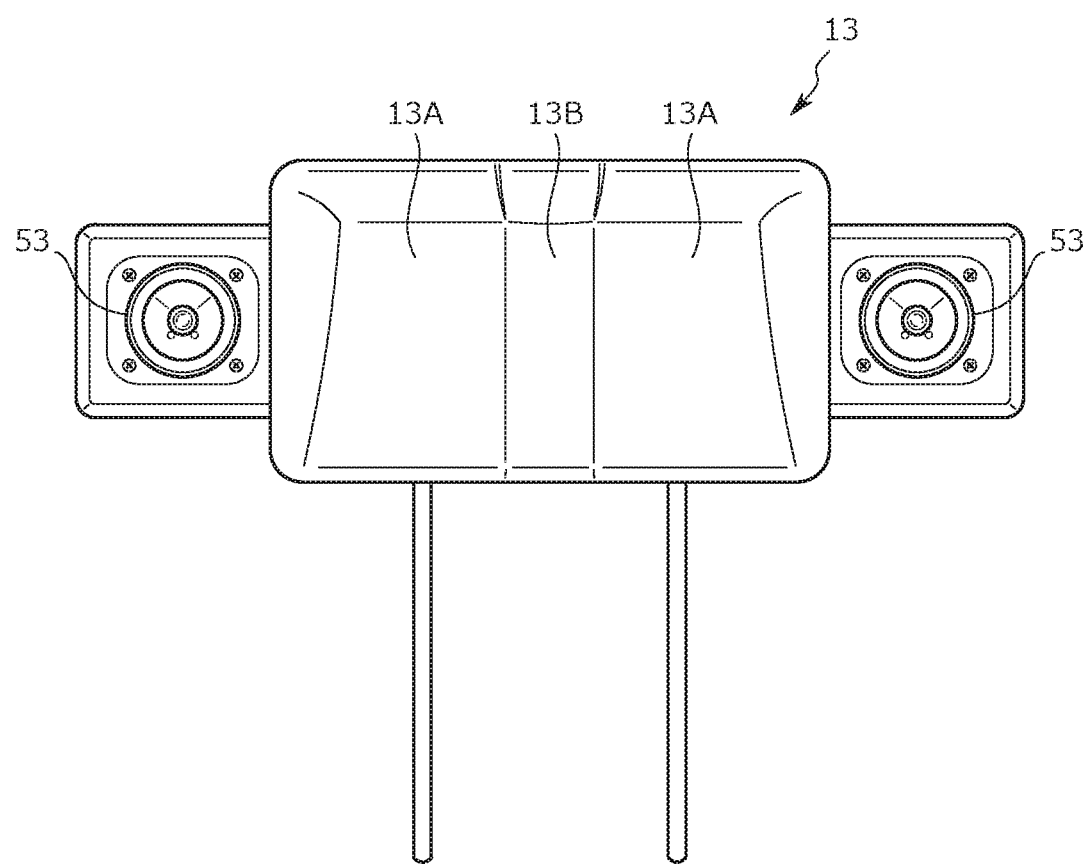
FIG. 15 is a diagram illustrating a headrest according to a modification example.

Specifically, a speaker 53 may be provided so as to protrude from the outside of the right and left movable portions 13A of the headrest 13 as illustrated in FIG. 15. Interference with an occupant's head can be avoided insofar as the speaker is disposed outside the headrest 13.

Figure 16:
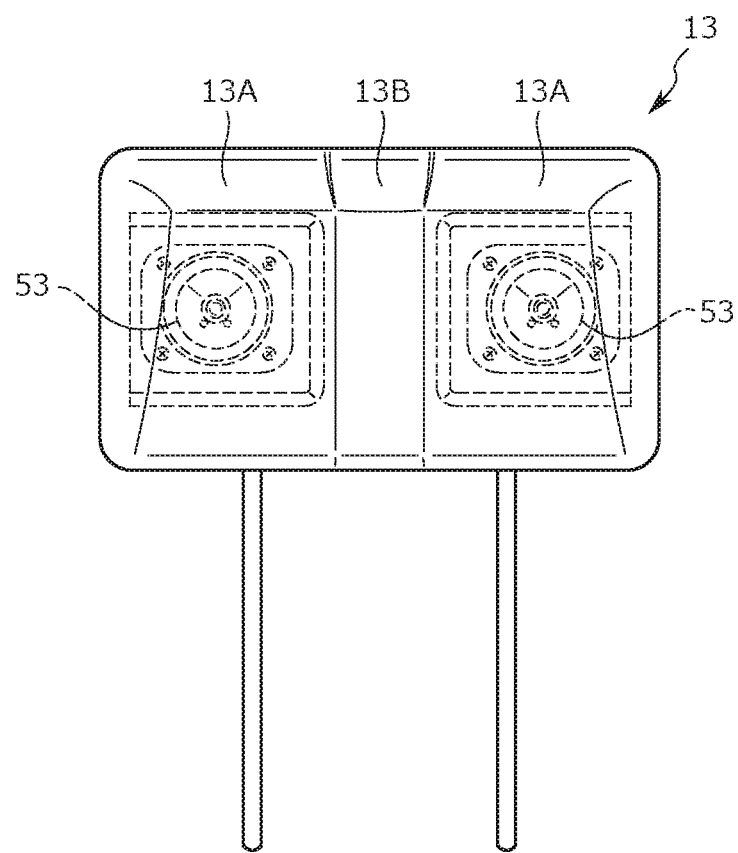
FIG. 16 is a diagram illustrating a headrest according to a modification example.

In addition, it is possible to avoid an increase in the size of the headrest 13 with a configuration in which the speaker 53 is disposed inside the headrest 13 as illustrated in FIG. 16.

Further, the volume of the speaker may be set to a volume audible only to the seated occupant.

In addition, the seat unit 1 may be provided with a rotation mechanism that rotates the seat main body S. Here, the tilt angle of the seat cushion 11 may be increased by the cushion movable mechanism 16 when the seat unit 1 is rotated as illustrated in FIGS. 17A, 17B, 18A, and 18B.

Figure 17A:
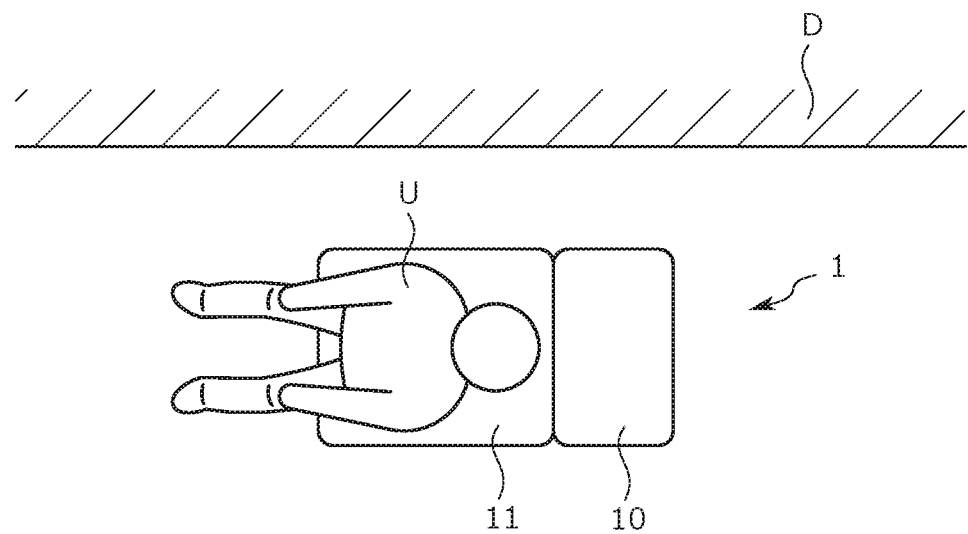
FIG. 17A is a diagram schematically illustrating the upper surface of the seat unit before rotation.
Figure 17B:
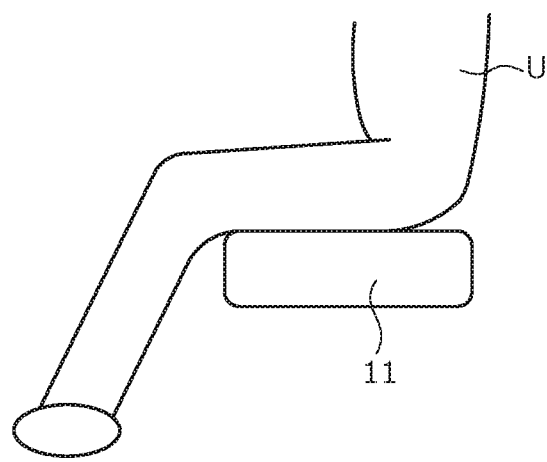
FIG. 17B is a diagram schematically illustrating the side surface of the seat unit before rotation.
Figure 18A:
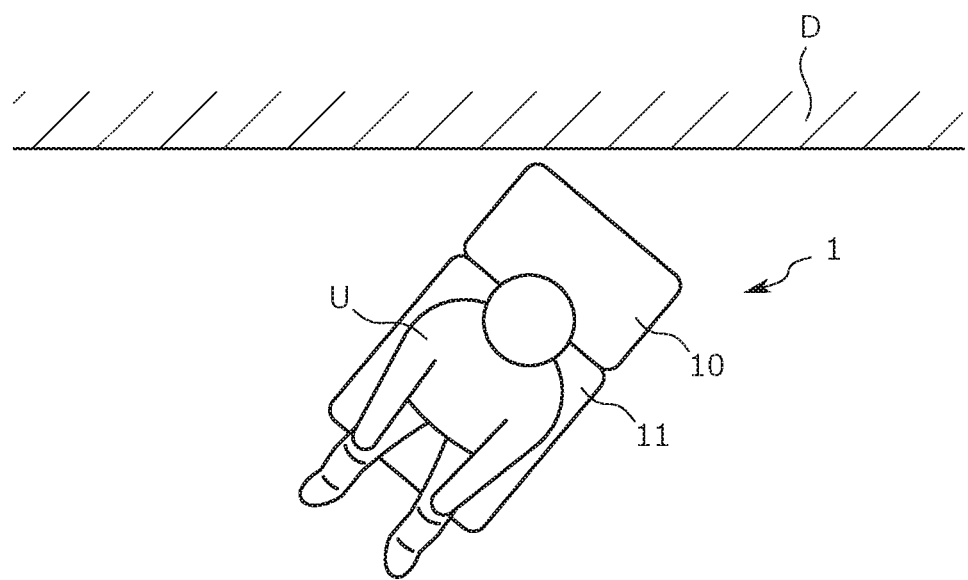
FIG. 18A is a diagram schematically illustrating the upper surface of the seat unit after rotation.
Figure 18B:
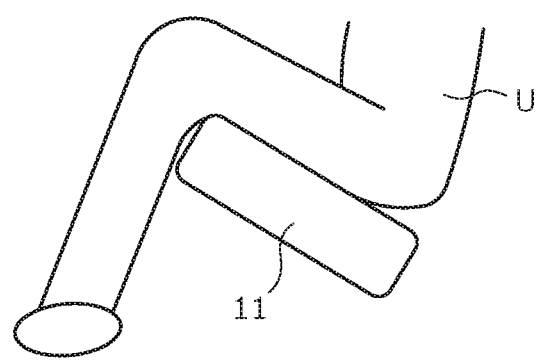
FIG. 18B is a diagram schematically illustrating the side surface of the seat unit after rotation.

It should be noted that FIGS. 17A and 17B correspond to the pre-rotation state of the seat unit 1 disposed in proximity to a vehicle door D. Further, FIGS. 18A and 18B correspond to the post-rotation state of the seat unit 1.

As illustrated in FIGS. 17A, 17B, 18A, and 18B, the tilt angle of the seat cushion 11 is controlled such that the front of the seat cushion 11 is raised in a state where the seat unit 1 is rotated inward with respect to the vehicle door D.

An occupant's feet can be easily brought close to the seat cushion side by the tilt angle being increased as described above. In a case where the seat rotates with the occupant seated, in particular, it becomes difficult to interfere with an adjacent seat, the seated occupant in the adjacent seat, or the other members in the passenger compartment (non-limitatively conceivable examples including a console box and a door lining).

In addition, the seat back 10 may be allowed to temporarily stand when the seat unit 1 is rotated by the rotation mechanism. As a result, interference between the seat back 10 and the vehicle door can be suppressed.

In addition, in a case where the seat back 10 has a middle folding mechanism as illustrated in FIGS. 19A, 19B, 20A, and 20B, the middle folding mechanism of the seat back 10 may be tilted forward when the seat unit 1 is rotated with respect to the vehicle door D by the rotation mechanism. In this manner, interference between the vehicle door D and the seat back 10 can be suppressed.

Figure 19A:
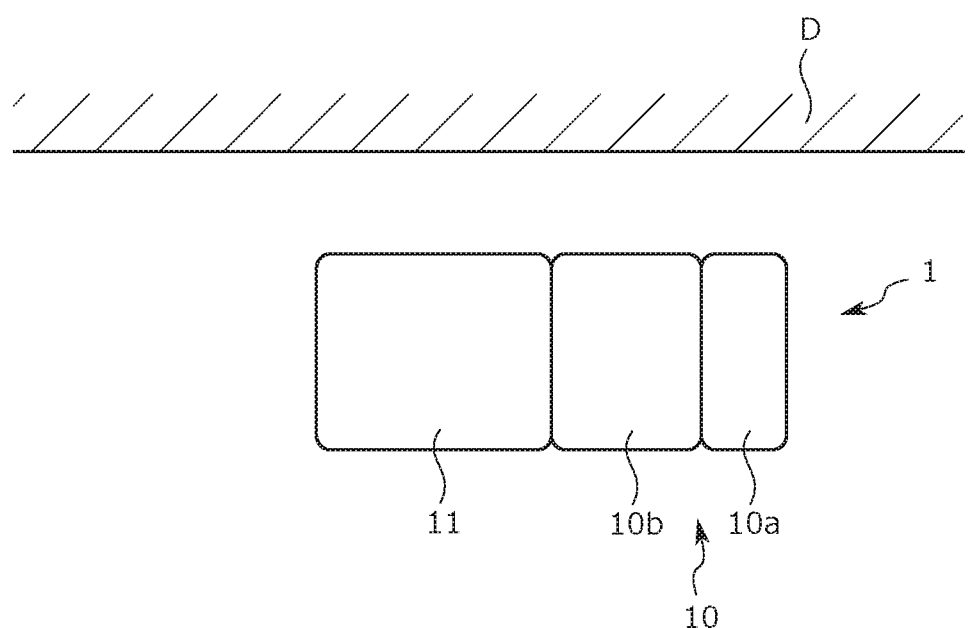
FIG. 19A is a diagram schematically illustrating the upper surface of the seat unit before rotation.
Figure 19B:
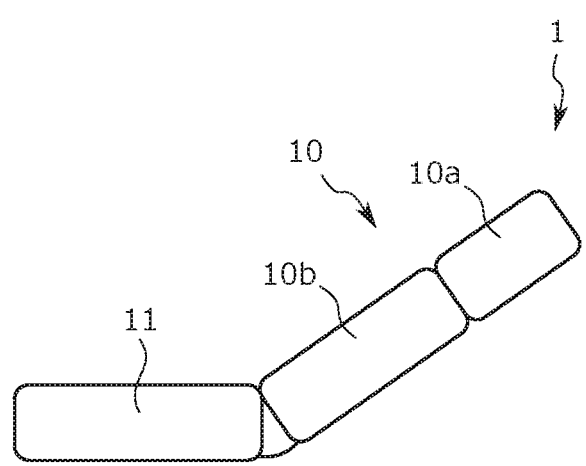
FIG. 19B is a diagram schematically illustrating the side surface of the seat unit before rotation.
Figure 20A:
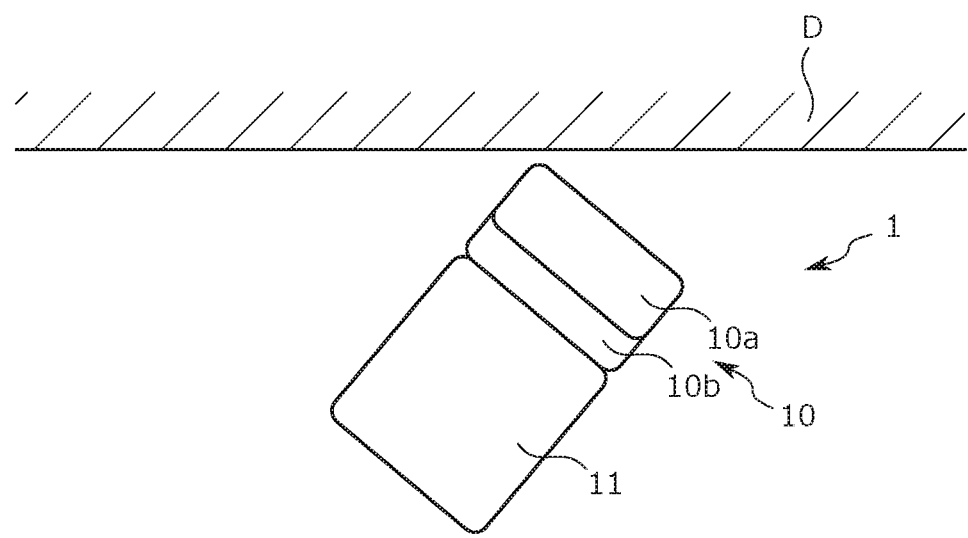
FIG. 20A is a diagram schematically illustrating the upper surface of the seat unit after rotation.
Figure 20B:
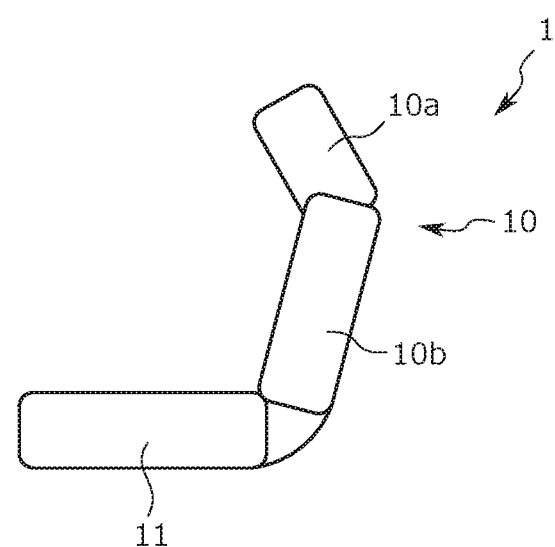
FIG. 20B is a diagram schematically illustrating the side surface of the seat unit after rotation.

It should be noted that FIGS. 19A and 19B correspond to the pre-rotation state of the seat unit 1 disposed in proximity to the vehicle door D. Further, FIGS. 20A and 20B correspond to the post-rotation state of the seat unit 1.

In addition, the posture of the middle folding mechanism of the seat back 10 may be changed to a relax posture after a rotational movement of the seat unit 1. In other words, a transition may be possible from the state illustrated in FIGS. 20A and 20B to the state illustrated in FIGS. 19A and 19B.

Figure 21B:
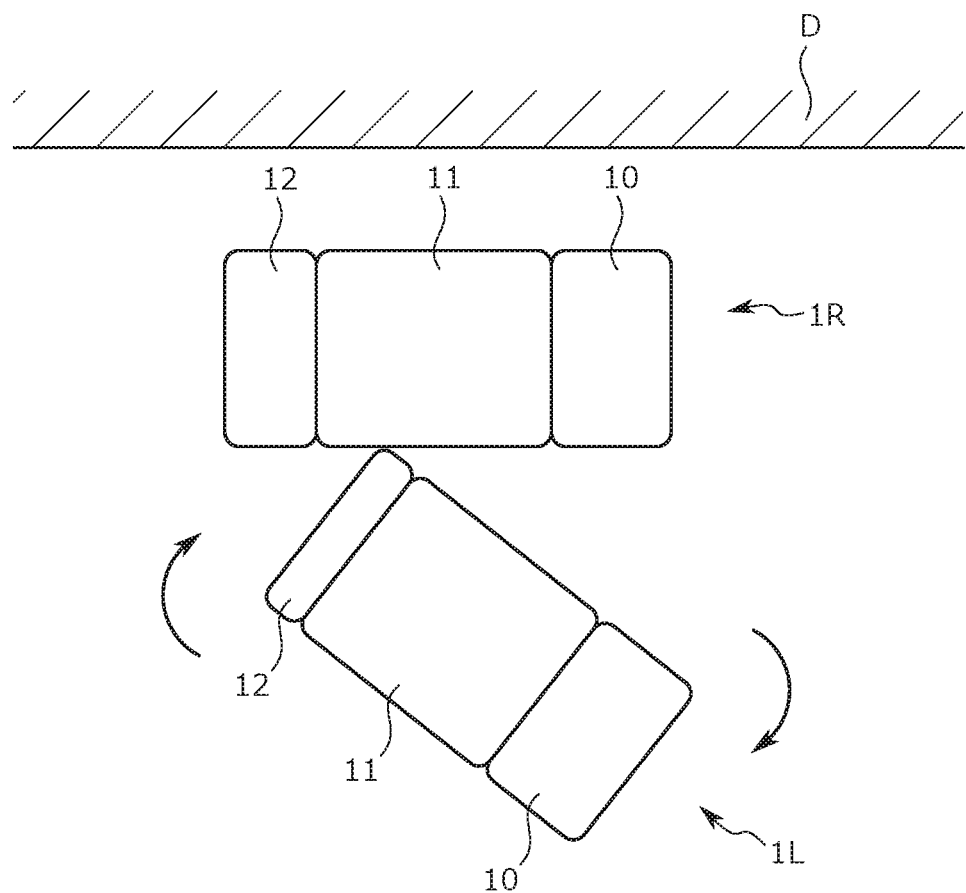
FIG. 21B is a diagram schematically illustrating the upper surface of the seat unit after rotation.

In addition, the ottoman 12 may be stored when the seat unit 1 is rotated as illustrated in FIGS. 21A and 21B. It should be noted that FIGS. 21A and 21B schematically illustrate the upper surface of the seat unit 1. Specifically, as illustrated in FIGS. 21A and 21B, the ottoman 12 of a seat unit 1L may be folded downward and stored when the seat unit 1L, which is disposed on a side far from the vehicle door D, is rotated toward a seat unit 1R, which is disposed on a side close to the vehicle door D. In this manner, it is possible to suppress interference between the ottoman 12 of the seat unit 1L and the seat unit 1R or another member. The ottoman 12 may be provided with a telescopic function. A decrease in length allows interference with the seat unit 1R or another member to be suppressed when the seat unit 1 is rotated.

In addition, the armrest 33 may be lowered when the seat main body S is rotated. In this manner, interference between the armrest 33 and the front seat and the vehicle door can be suppressed.

In addition, in a case where the seat unit 1 is the mid seat of a three-row seat, the distance from the front seat may be detected, a drive device may be provided, and a movement of the ottoman 12 may be controlled such that the ottoman 12 and another member do not interfere with each other.

In addition, the mid seat may be slid and moved backward during a front seat transition to the tilt posture. Interference with the front seat is more easily avoided with this configuration.

In addition, the seat back 10 of the rear seat may be tilted forward first during a mid seat transition to the tilt posture. With this configuration, interference with the rear seat can be easily avoided during the transition to the tilt posture.

In addition, the seat back 10 of the rear seat may not be returned to the standing state from the forward tilt state during a mid seat transition to the tilt posture. With this configuration, unexpected interference with the rear seat can be easily avoided.

In addition, when the mid seat returns from the tilt posture, the state transitions of the part that takes the longest time to return and the ottoman 12 may be initiated at the same time. As a result, interference between the front and mid seats can be avoided.

Figure 22:
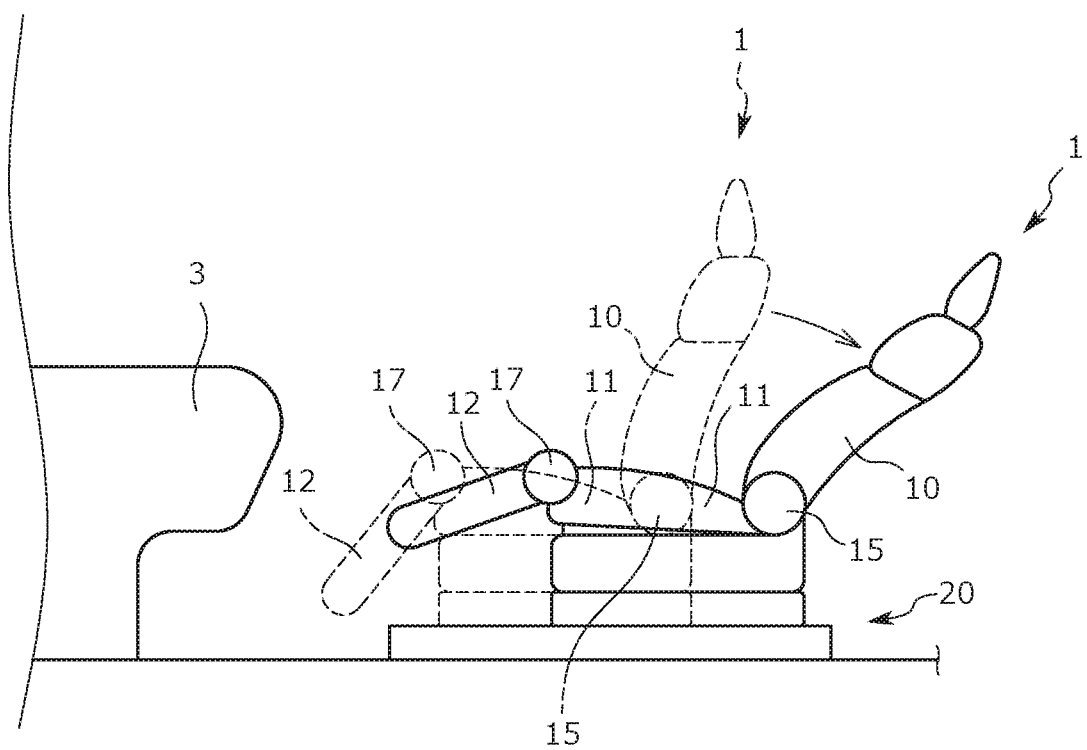
FIG. 22 is a diagram illustrating an operation for preventing interference between an instrument panel and an ottoman of the seat unit.

In addition, as illustrated in FIG. 22, the ottoman 12 and the slide mechanism 20 may be controlled so as to suppress interference between the ottoman 12 and the instrument panel 3 during the transition to the tilt posture of the seat unit 1 provided as the front seat. In the configuration at this time, interference between the instrument panel 3 and the mid seat may be avoided by the seat unit 1 being provided with a drive device and the front and back positions of the seat unit 1 provided as the front seat being automatically adjusted. Specifically, the ottoman 12 is pivoted upward after the seat unit 1 is slid backward by the slide mechanism 20 to a position where the ottoman 12 does not interfere with the instrument panel 3.

In addition, the seat unit 1 can be mounted in a self-driving vehicle. In this case, a transition of the seat unit 1 from the standing posture to the tilt posture may be conducted during switching to self-driving.

In addition, a transition from the tilt posture to the standing posture may be conducted during switching from self-driving to manual driving. At this time, the length of a first required time until the transition from the standing posture to the tilt posture and the length of a second required time until the transition from the tilt posture to the standing posture may be changed.

For example, the second required time may be shorter than the first required time. In this manner, it is possible to quickly perform the driving operation.

In addition, for example, the second required time may be longer than the first required time. In this manner, pre-driving preparations can be made slowly.

In addition, for example, the first required time and the second required time may be set substantially equal to each other. In this manner, it becomes possible to easily grasp the transition time between the standing posture and the tilt posture.

In addition, the tilt-to-standing posture transition time may be shorter in accordance with occupant operation than the tilt-to-standing posture transition time at a time when the vehicle descends from a highspeed after expressway traveling.

In addition, in the seat unit 1, a transition from the tilt posture to the standing posture may be conducted in accordance with the distances to cars in front of and behind the vehicle and cars in the right and left lanes. The transition time in this case may be shorter than, for example, the posture transition time in the case of descending from a high speed.

In addition, the vehicle may be provided with a navigation system, the situation of the road on which the vehicle travels may be grasped beforehand, and each movable portion may be moved in accordance with the grasped situation. For example, in a case where it is detected or predicted that the vehicle approaches a curve, an occupant's side may be supported by the side support protruding in accordance with the direction in which the occupant's body is inclined. In addition, the road situation may be detected by radar, an in-vehicle camera, or the like as well as the navigation system.

In addition, the seat unit 1 may be provided with a biological sensor that detects a seated occupant's biological information and the posture transition may be performed more slowly than usual in a case where the seated occupant relaxes in the standing posture. In this manner, it is possible to prevent the seated occupant's relax state from being disturbed.

In addition, the seat unit 1 may be provided with a seating sensor and the time required for a transition to the tilt posture and the time required for a transition to the standing posture may be shorter when seating in the seat main body S is not detected than when the seating is detected.

In addition, the seat unit 1 may be in the standing posture until seating in the seat main body S is detected and may undergo a transition to the tilt posture in a case where the seating is detected.

In addition, the seat unit 1 may undergo a transition from the tilt posture to the standing posture in a case where the seating sensor detects a rising occupant.

In addition, the seat unit 1 may be provided with a distance sensor that detects the distance to a surrounding member and a change in posture may be stopped in a case where the distance to the surrounding member has become a predetermined distance or less.

In addition, the seat unit 1 may be provided with a height mechanism that adjusts the height of the seat cushion 11. For example, the height of the seat cushion 11 may be lowered by the height mechanism during a standing-to-tilt posture transition in the seat unit 1. In this manner, light outside the vehicle becomes less likely to enter an occupant's eyes, and thus the occupant can relax more.

In addition, the seat unit 1 may be provided with a sunshade that is movable upward and downward and the sunshade may be automatically moved upward and downward by a movable mechanism as the seat unit 1 undergoes a transition from the standing posture to the tilt posture.

Figure 23A:
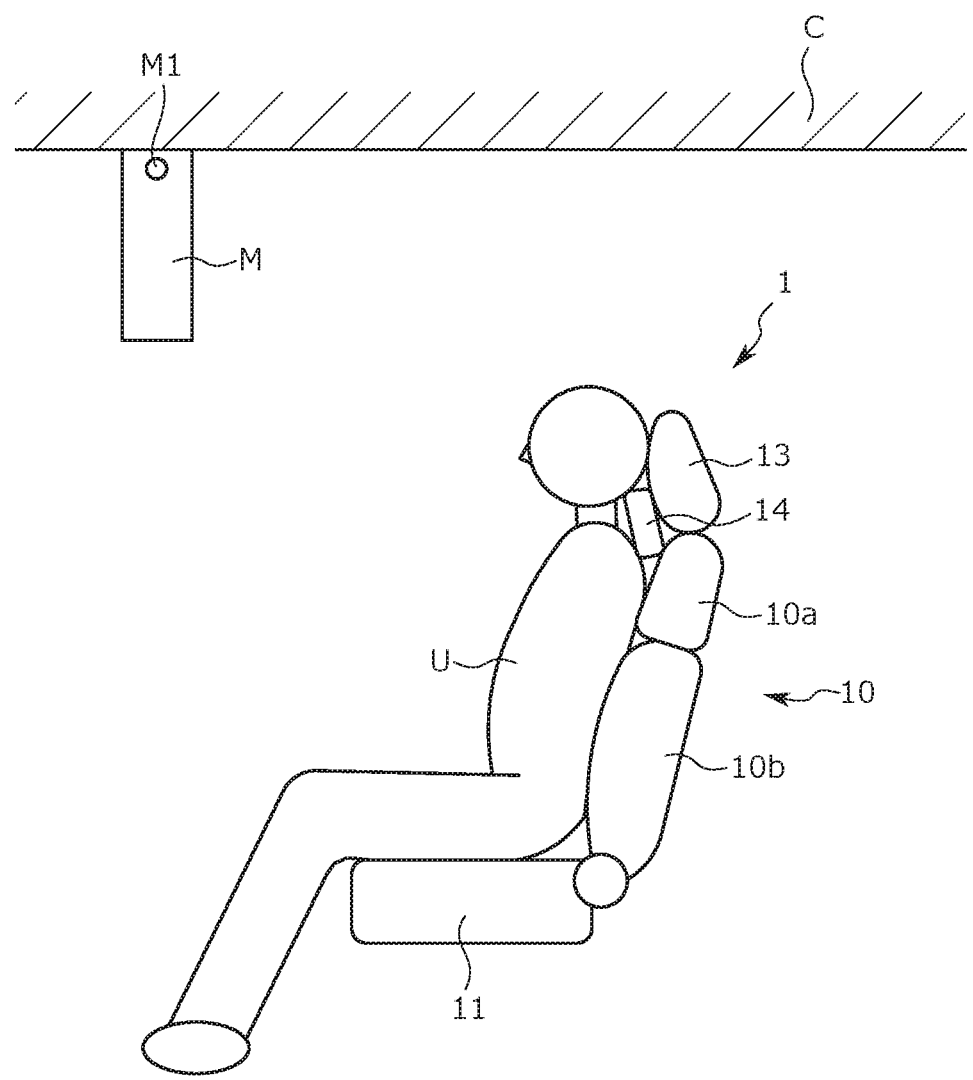
FIG. 23A is a diagram schematically illustrating the position of a monitor device with respect to the seat unit at a time of the standing posture.
Figure 23B:
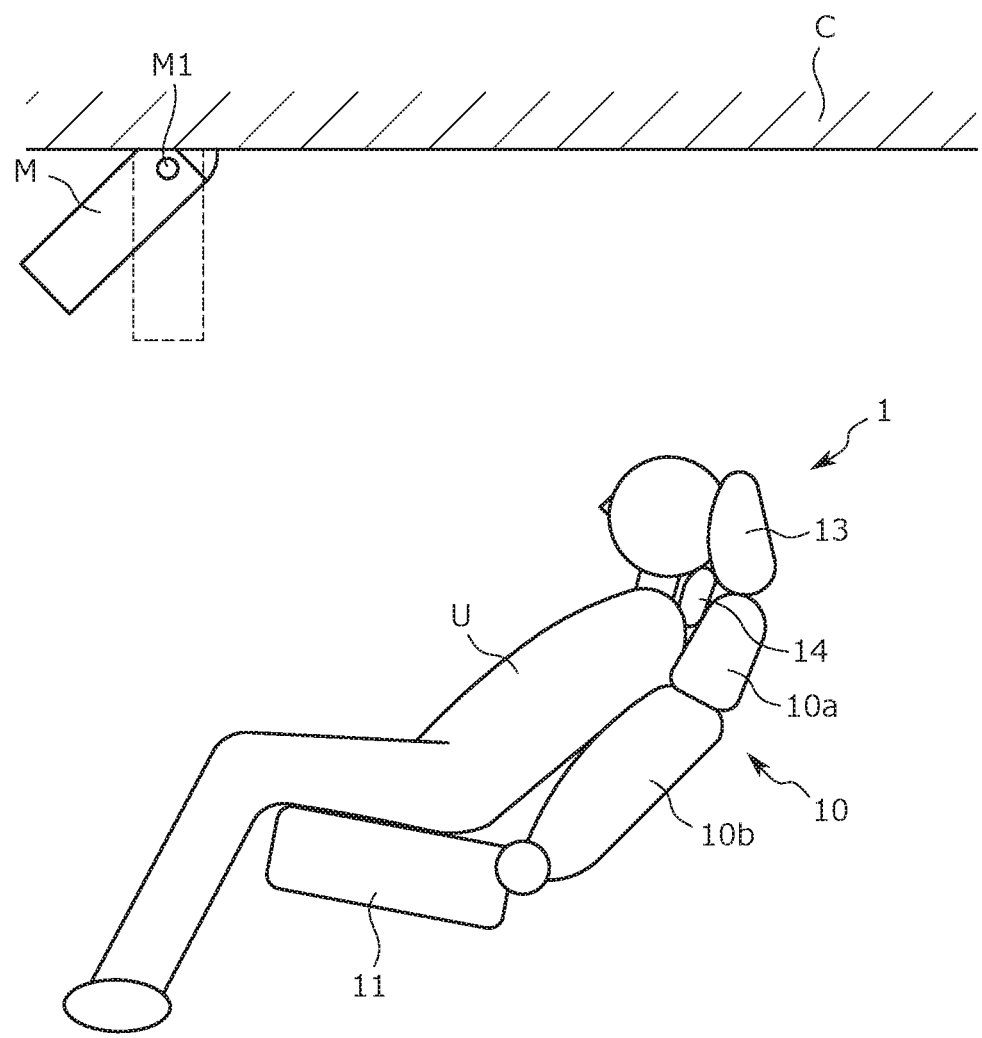
FIG. 23B is a diagram schematically illustrating the position of the monitor device with respect to the seat unit at a time of the tilt posture.

In addition, as illustrated in FIGS. 23A and 23B, a monitor device M may be disposed in front of the seat unit 1 by the monitor device M being lowered from a vehicle ceiling C in accordance with a change in the posture of the seat unit 1.

At this time, the monitor device M may be capable of pivoting about a rotary shaft portion M1 and the angle of the monitor device M may be adjusted in accordance with the angle of the seat back 10. In other words, an occupant U can watch the monitor device M with ease by the angle of the monitor device M being changed in accordance with the angle of the seat back 10 as illustrated in FIGS. 23A and 23B.

Figure 24A:
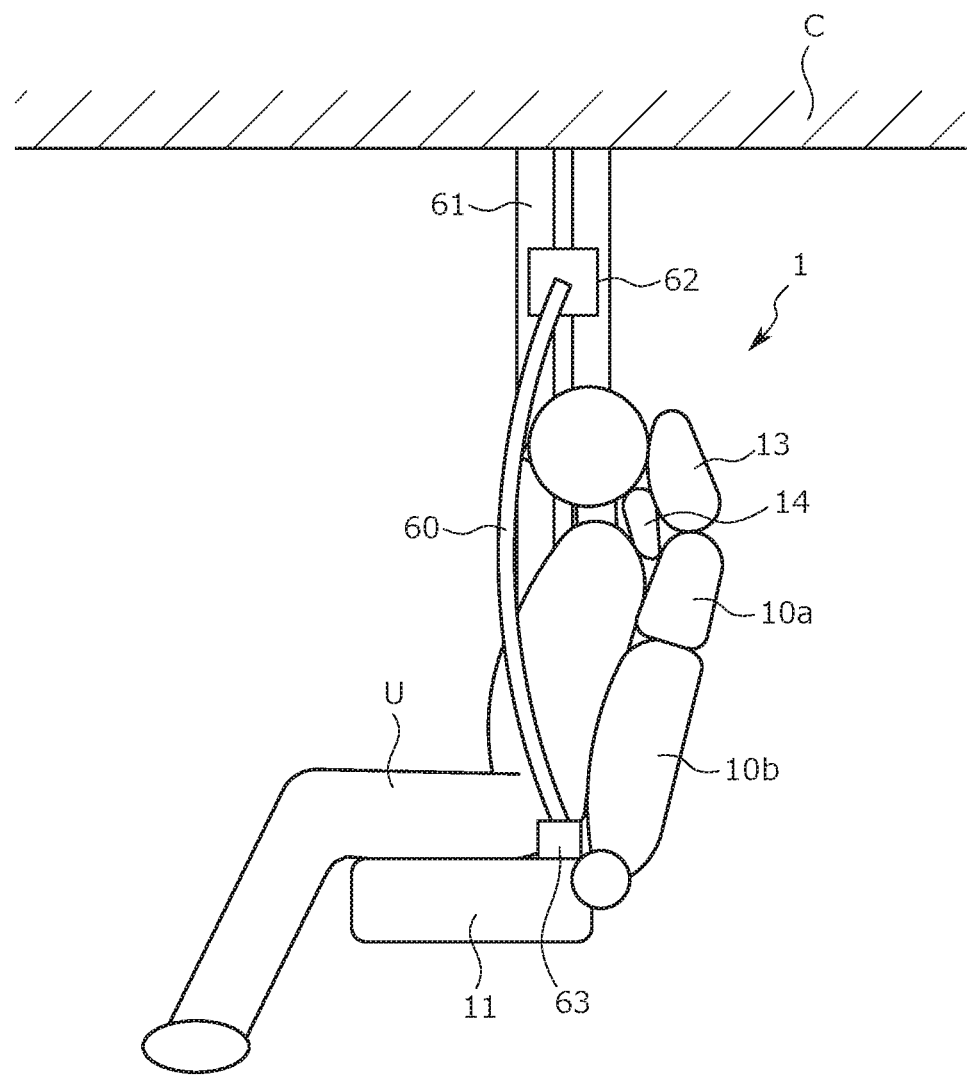
FIG. 24A is a diagram schematically illustrating the position of an anchor of a seat belt with respect to the seat unit at a time of the standing posture.
Figure 24B:
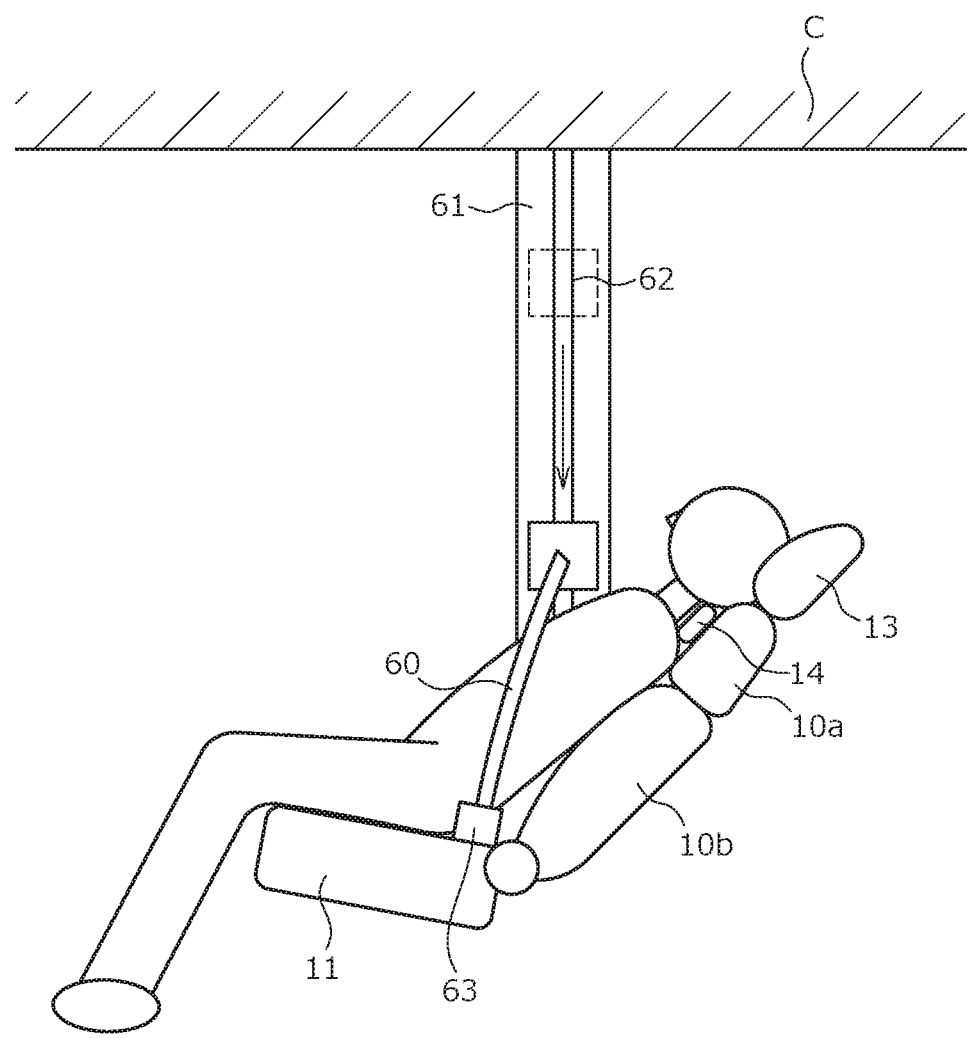
FIG. 24B is a diagram schematically illustrating the position of the anchor of the seat belt with respect to the seat unit at a time of the tilt posture.

In addition, as illustrated in FIGS. 24A and 24B, an anchor 62 of a seat belt 60 of the seat unit 1 may be lowered during a standing-to-tilt posture transition of the seat unit 1. Specifically, the anchor 62 is slidable along a rail 61 provided in the body of the vehicle and extending in the up to down direction. Further, the seat belt 60 is fixed to the anchor 62 and a buckle 63 provided on the seat cushion 11.

Further, as illustrated in FIG. 24B, during a standing-to-tilt posture transition of the seat unit 1, it is possible to suppress an increase in the distance between the anchor 62 and the occupant U and suppress the seat belt 60 being caught on the neck of the occupant U by lowering the position of the anchor 62. It should be noted that the anchor 62 may be automatically moved upward and downward as the seat unit 1 changes or the anchor 62 may be manually moved upward and downward.

Figure 25A:
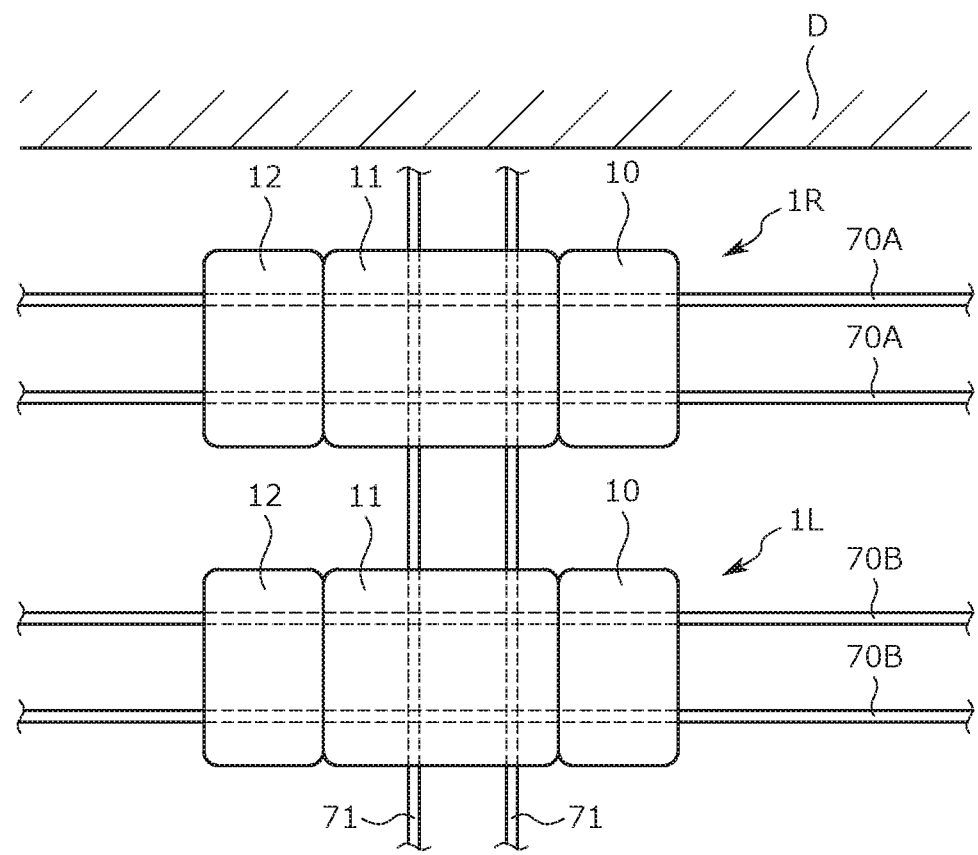
FIG. 25A is a diagram schematically illustrating the upper surfaces of the seat units arranged on the right and left.
Figure 25B:
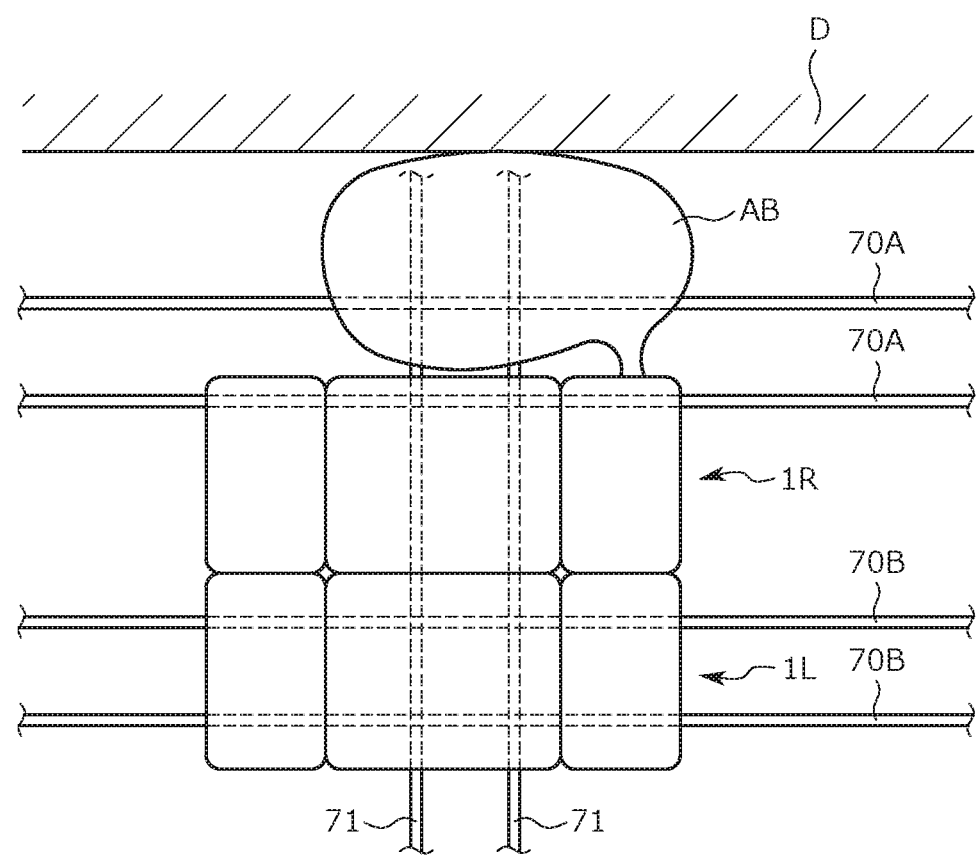
FIG. 25B is a diagram schematically illustrating the upper surfaces of the seat units arranged on the right and left at the time of a side collision.

In addition, as illustrated in FIGS. 25A and 25B, a front to back slide rail 70A and a front to back slide rail 70B that respectively allow the seat unit 1R and the seat unit 1L to slide in the front to back direction and a right to left slide rail 71 that allows the seat unit 1R and the seat unit 1L to slide in the seat width direction may be provided. Further, the seat unit 1R on the side that is close to the vehicle door D may be slid away from the vehicle door D by the right to left slide rail 71 as illustrated in FIG. 25B in the case of a side collision with the vehicle. At this time, the seat unit 1R may have an airbag AB in the side portion and the airbag AB may be deployed in the gap between the vehicle door D and the seat unit 1R generated as a result of a lateral slide movement.

Figure 26:
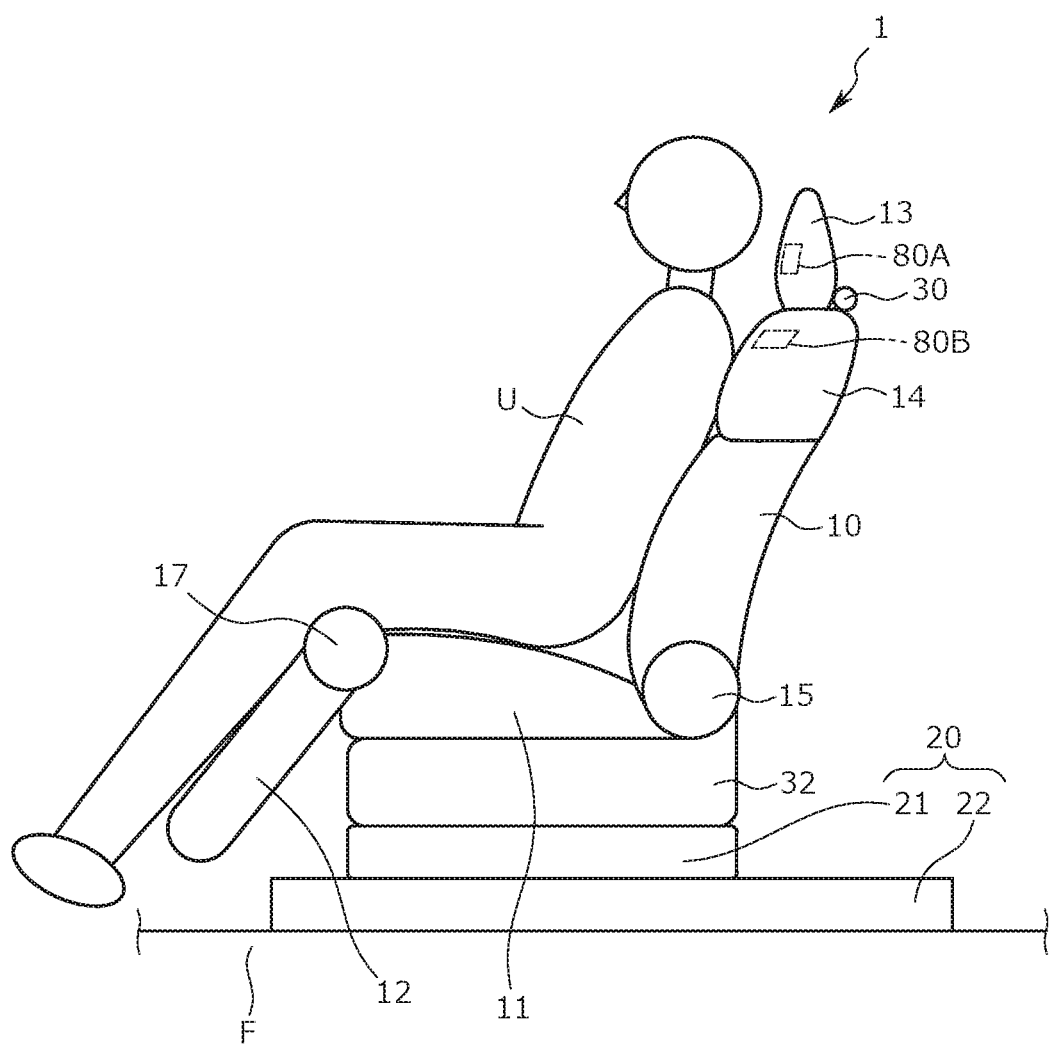
FIG. 26 is a diagram illustrating a seat unit according to a modification example.

In addition, as illustrated in FIG. 26, the seat unit 1 may be provided with a microphone 80A and a microphone 80B as voice input units in the upper portion of the seat back 10 and the headrest 13, respectively. Further, the seat unit 1 may have the voice recognition function of recognizing the voice of the occupant U collected through the microphone 80A and the microphone 80B and the seat unit 1 may be operable in accordance with voice input. Specifically, the seat unit 1 is capable of switching between the standing posture and the tilt posture in accordance with the voice input, and thus it is easy to instruct the transition to the standing posture even in a case where it is difficult to reach the operating switch 31 in the tilt posture. In addition, it is possible to easily pick up the voice even in a case where an occupant's posture has changed to, for example, the tilt posture with a structure in which a microphone for voice recognition is provided close to the occupant's head, examples of which include the headrest 13, the neck rest 14, and the shoulder of the seat.

Second Embodiment

Hereinafter, the configuration of the seat unit of the present invention will be described with reference to one embodiment (the present embodiment). It should be noted that the embodiment described below is an example for facilitating the understanding of the present invention and does not limit the present invention. In other words, the present invention can be changed and improved within the spirit of the present invention. In addition, it is a matter of course that the present invention may include equivalents thereof.

In addition, unless otherwise specified, the position, the direction, and the state of each member in the following description are a position, a direction, and a state at a time when a conveyance seat is in a standing posture.

In addition, in the following description, the direction of extension of a seat back will be simply referred to as "direction of extension" and the width direction of the conveyance seat will be referred to as "seat width direction". Here, the direction of extension is a direction along an occupant's back at a time when the occupant is seated in the conveyance seat. In addition, the seat width direction is the right to left direction as viewed from the occupant seated in the conveyance seat.

<<Schematic Configuration of Seat Unit>>

Figure 27:
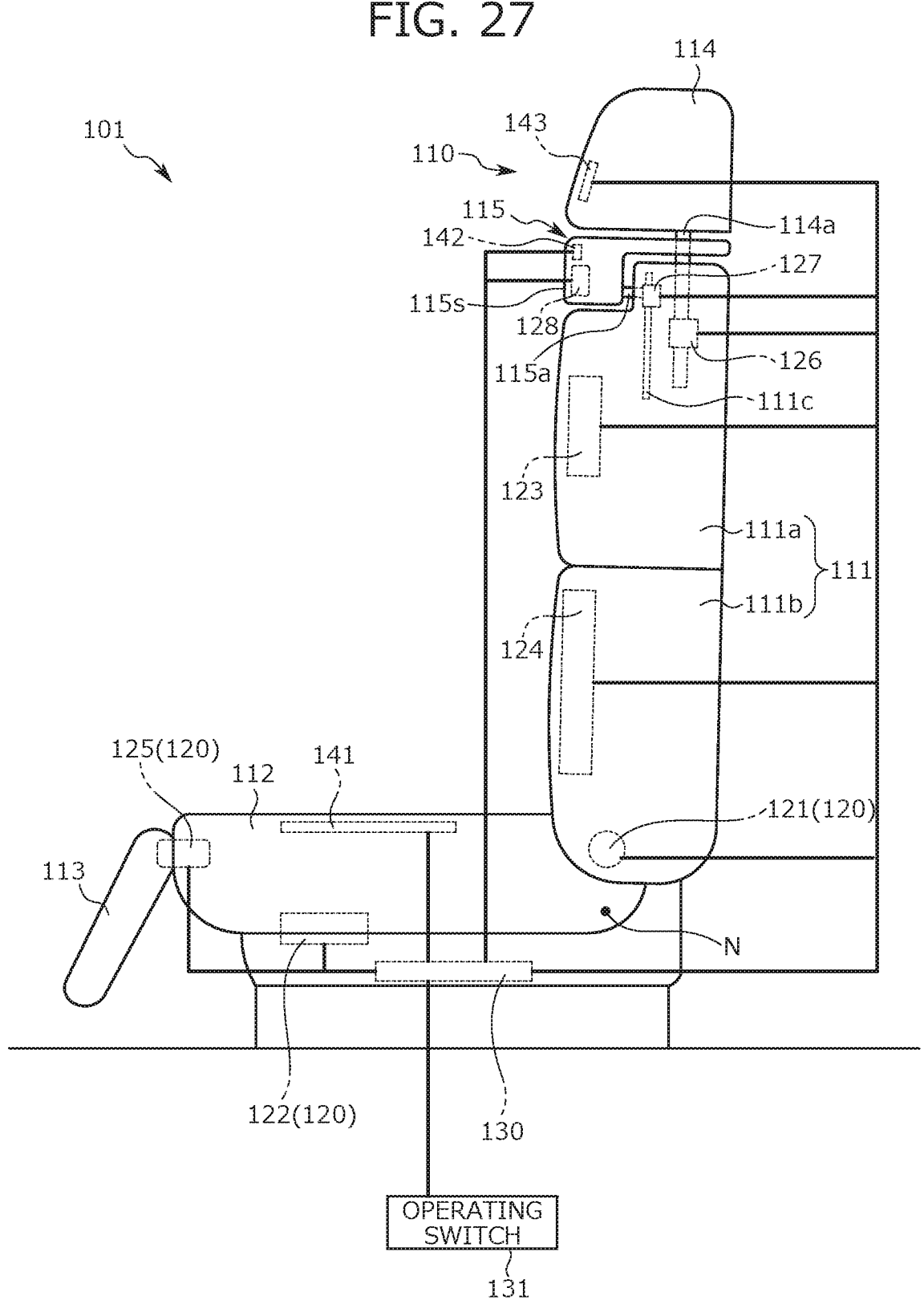
FIG. 27 is a diagram illustrating the configuration of a seat unit according to an embodiment of the present invention.
Figure 28:
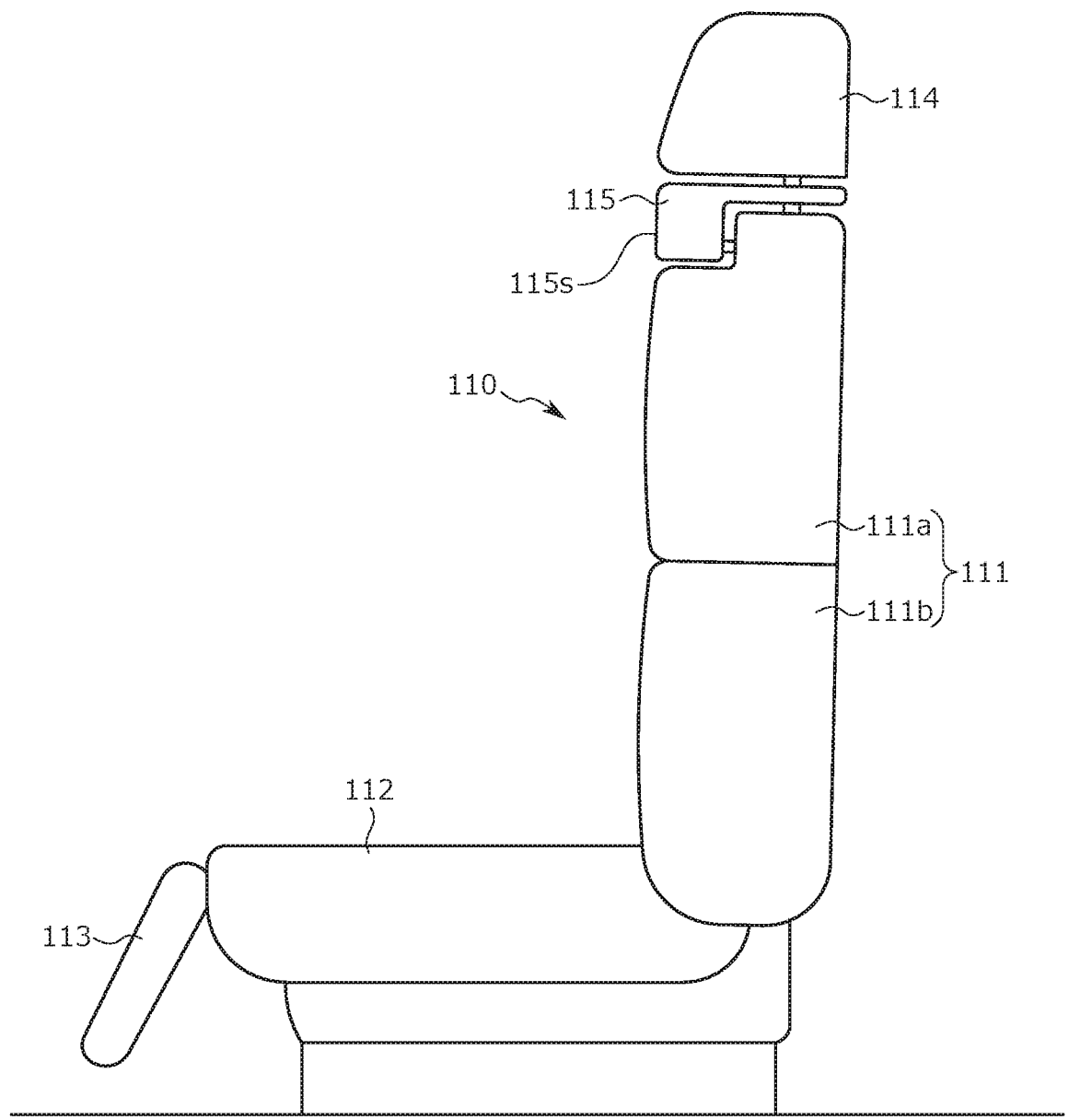
FIG. 28 is a schematic side view of a conveyance seat in a standing posture.
Figure 29:
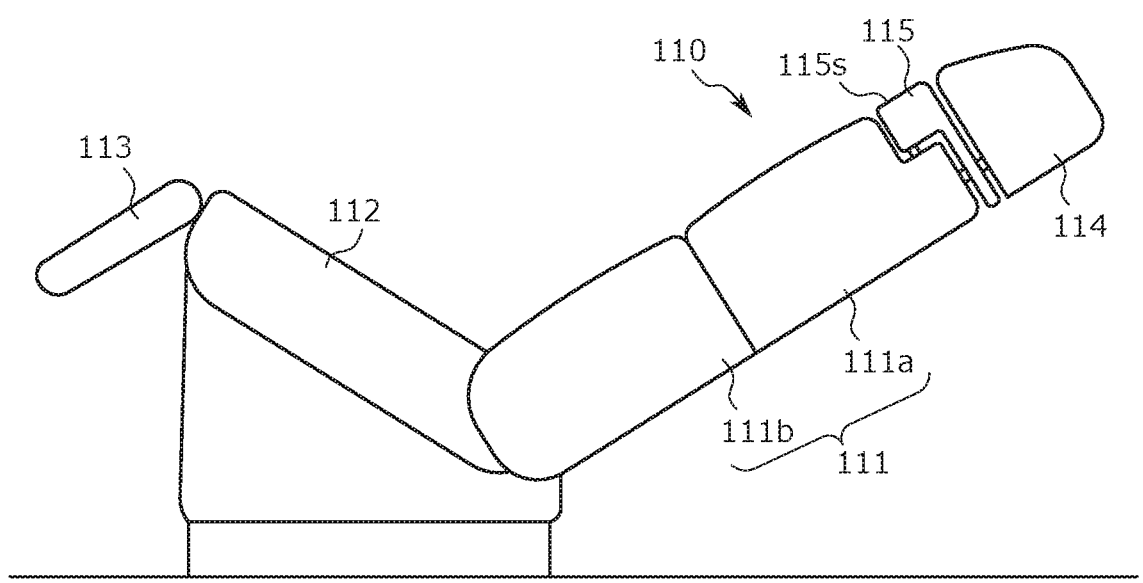
FIG. 29 is a schematic side view of the conveyance seat in a tilt posture.
Figure 30:
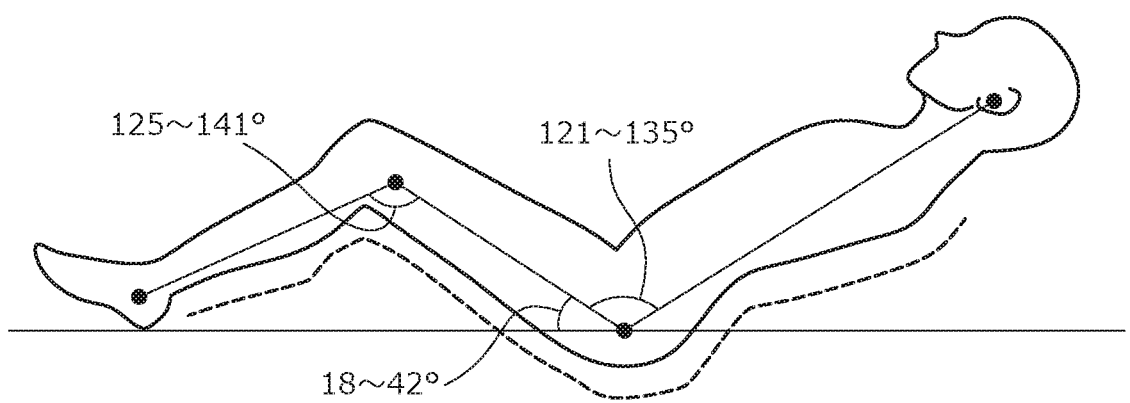
FIG. 30 is a diagram illustrating the state of an occupant seated in the conveyance seat in the tilt posture.

A schematic configuration of the seat unit according to the present embodiment (hereinafter, the seat unit 101) will be described with reference to FIGS. 27 to 30. FIG. 27 is an explanatory diagram of the configuration of the seat unit 101. It should be noted that the thick solid line in FIG. 27 indicates a signal line. FIG. 28 is a schematic side view of the conveyance seat in the standing posture. FIG. 29 is a schematic side view of the conveyance seat in a tilt posture. FIG. 30 is a diagram illustrating the state (body position) of an occupant seated in the conveyance seat in the tilt posture.

The seat unit 101 is used in an occupant-entering conveyance and the seat unit 101 is mounted in an automobile in the present embodiment. However, the seat unit 101 is not limited thereto and the seat unit 101 can be used in other occupant-entering conveyances (for example, vehicles such as railway vehicles, aircraft, and ships).

As illustrated in FIG. 27, a seat 110, a controller 130, and various sensors constitute the seat unit 101. The seat 110 is a seat in which a conveyance (automobile) occupant can sit. It should be noted that the seat 110 of the present embodiment forms a seat (middle seat) disposed in the front-to-back-direction middle of a car with three rows of seats. However, the seat 110 is not limited thereto and the seat 110 according to the present embodiment may be used as a seat in the front (front seat) or a seat in the rear (rear seat).

The seat 110 has a seat back 111, a seat cushion 112, and an ottoman 113. The seat back 111 supports the occupant's back from behind and is configured by a cushion material being supported on a frame (not illustrated) and the cushion material being covered with a skin. In addition, the seat back 111 is capable of moving (strictly speaking, pivoting) so as to tilt backward with respect to the seat cushion 112.

It should be noted that the seat back 111 according to the present embodiment is divided into one upper portion and one lower portion and has a back upper portion 111a and a back lower portion 111b. The back upper portion 111a supports the part of the occupant's back that is positioned at the same height as the occupant's chest. The back lower portion 111b supports the part of the occupant's back that is from the occupant's abdomen to the occupant's lumbar region.

The seat cushion 112 supports the occupant's buttocks from below and is configured by a cushion material being placed on a frame (not illustrated) and the cushion material being covered with a skin. The rear end portion of the seat cushion 112 is connected to the lower end portion of the seat back 111 (strictly speaking, the lower end portion of the back lower portion 111b) via a shaft extending along the seat width direction. In addition, in the present embodiment, the seat cushion 112 is configured to be capable of pivoting about the fulcrum that is indicated by Symbol N in FIG. 27. In other words, the seat cushion 112 according to the present embodiment is capable of pivoting about the fulcrum N such that the front end portion of the seat cushion 112 ascends and descends in the up to down direction.

The ottoman 113 supports the occupant's lower leg from below and is configured by a cushion material being placed on a frame board (not illustrated) and the cushion material being covered with a skin. The ottoman 113 is supported by the front end portion of the seat cushion 112 via a pivot shaft extending along the seat width direction. In other words, the ottoman 113 is capable of pivoting around the pivot shaft.

Further, the ottoman 113 moves between a deployment position and a storage position by pivoting. The storage position is a position at a time when the ottoman 113 is not used and is a position at a time when the ottoman 113 hangs down and the distal end portion (free end portion) of the ottoman 113 is closest to the seat cushion 112. The deployment position is a position where the ottoman 113 is used (for easier understanding, a position where the occupant's lower leg can be supported) and is a position at a time when the ottoman 113 protrudes somewhat ahead of the front end of the seat cushion 112.

It should be noted that the length of the ottoman 113 from the proximal end portion of the ottoman 113 supported by the seat cushion 112 to the distal end portion of the ottoman 113 as a free end portion (hereinafter, the full length) may be extendable. In other words, the ottoman 113 may be configured such that the full length is shortest when the ottoman 113 is at the storage position and the full length gradually increases as the ottoman 113 approaches the deployment position.

Each of the seat back 111, the seat cushion 112, and the ottoman 113 described above is capable of pivoting about the shaft along the seat width direction as described above. Further, in the present embodiment, the posture of the seat 110 can be switched through the pivot operation of each of the seat back 111, the seat cushion 112, and the ottoman 113.

Specifically, the posture of the seat 110 can be switched between the standing posture illustrated in FIG. 28 and the tilt posture illustrated in FIG. 29. The standing posture, which is the normal posture of the seat 110, is a posture at a time when the seat back 111 stands, the seating surface of the seat cushion 112 is substantially horizontal, and the ottoman 113 is at the storage position.

The tilt posture is a posture at a time when the seat back 111 tilts backward, the front end of the seat cushion 112 slightly rises, and the ottoman 113 is at the deployment position. Further, an occupant's posture is the so-called neutral posture illustrated in FIG. 30 when the occupant is seated in the seat 110 that is in the tilt posture. The neutral posture is a posture that is least burdensome for the seated occupant in the seat and the occupant is unlikely to become tired in the neutral posture. Specifically, as illustrated in FIG. 30, the neutral posture is a posture in which the angle between the trunk and the upper thigh of the leg is 121 degrees to 135 degrees, the lifting angle of the upper thigh is 18 degrees to 42 degrees, and the angle between the upper thigh and the lower leg is 125 degrees to 141 degrees.

It should be noted that the seat 110 is provided with a mechanism (posture switching mechanism 120) for switching the posture of the seat 110 in the present embodiment so that the switching of the posture described above is realized. The posture switching mechanism 120 will be described in detail later.

To be more specific on the configuration of the seat 110, the seat 110 has a headrest 114 and a neck rest 115 as illustrated in FIG. 27.

The headrest 114 supports the occupant's head from behind and is configured by a foaming material or a cushion material being disposed around a frame (not illustrated) and the periphery of the material being covered with a skin material. A pillar 114a as a prop extends downward from the lower end of the headrest 114. This pillar 114a is inserted in the upper end portion of the seat back 111. Accordingly, the headrest 114 is positioned above the seat back 111 when the posture of the seat 110 is the standing posture.

In addition, in the present embodiment, the headrest 114 is movable with respect to the seat back 111 along the direction of extension. In other words, in the present embodiment, it is possible to adjust the position where the occupant's head is supported in the direction of extension through the movement operation of the headrest 114.

The neck rest 115 supports the occupant's neck from behind and is configured by a cushion material (not illustrated) being molded into a predetermined shape and the periphery of the cushion material being covered with a skin material. The neck rest 115 according to the present embodiment has a substantially rectangular parallelepiped part in the front end portion of the neck rest 115. The surface of the substantially rectangular parallelepiped part that faces an occupant (that is, the front end surface) forms a support surface 115s supporting the occupant's neck.

In addition, the neck rest 115 is provided with a through hole (not illustrated). The neck rest 115 is supported by the pillar 114a by the pillar 114a of the headrest 114 being inserted through the through hole. Accordingly, the neck rest 115 is positioned below the headrest 114 and above the seat back 111 when the seat 110 is in the standing posture.

In addition, the neck rest 115 according to the present embodiment is supported by the upper end portion of the seat back 111 as well as the pillar 114a of the headrest 114. Specifically, the front end portion (substantially rectangular parallelepiped part) of the neck rest 115 is provided with a supporting protruding portion 115a extending backward. The distal end portion of the supporting protruding portion 115a is in the seat back 111 through the skin of the upper end portion of the seat back 111. In addition, a columnar stay 111c extending along the direction of extension is embedded in the upper end portion of the seat back 111. The stay 111c is engaged with the distal end portion of the supporting protruding portion 115a. As a result, the neck rest 115 is supported on the upper end portion of the seat back 111.

In addition, in the present embodiment, the neck rest 115 is capable of moving with respect to the headrest 114 along the direction of extension. Strictly speaking, the neck rest 115 is capable of sliding (performing a slide movement) on the respective outer peripheral surfaces of the pillar 114a of the headrest 114 and the stay 111c in the seat back 111. In other words, in the present embodiment, it is possible to adjust the position where the occupant's neck is supported in the direction of extension through the movement operation of the headrest 114. Specifically, in a case where the head support position has been adjusted by the headrest 114 being moved, the neck support position is adjusted by the neck rest 115 being moved in conjunction with the adjustment.

<<Various Drive Mechanisms Provided in Conveyance Seat>>

Figure 31:
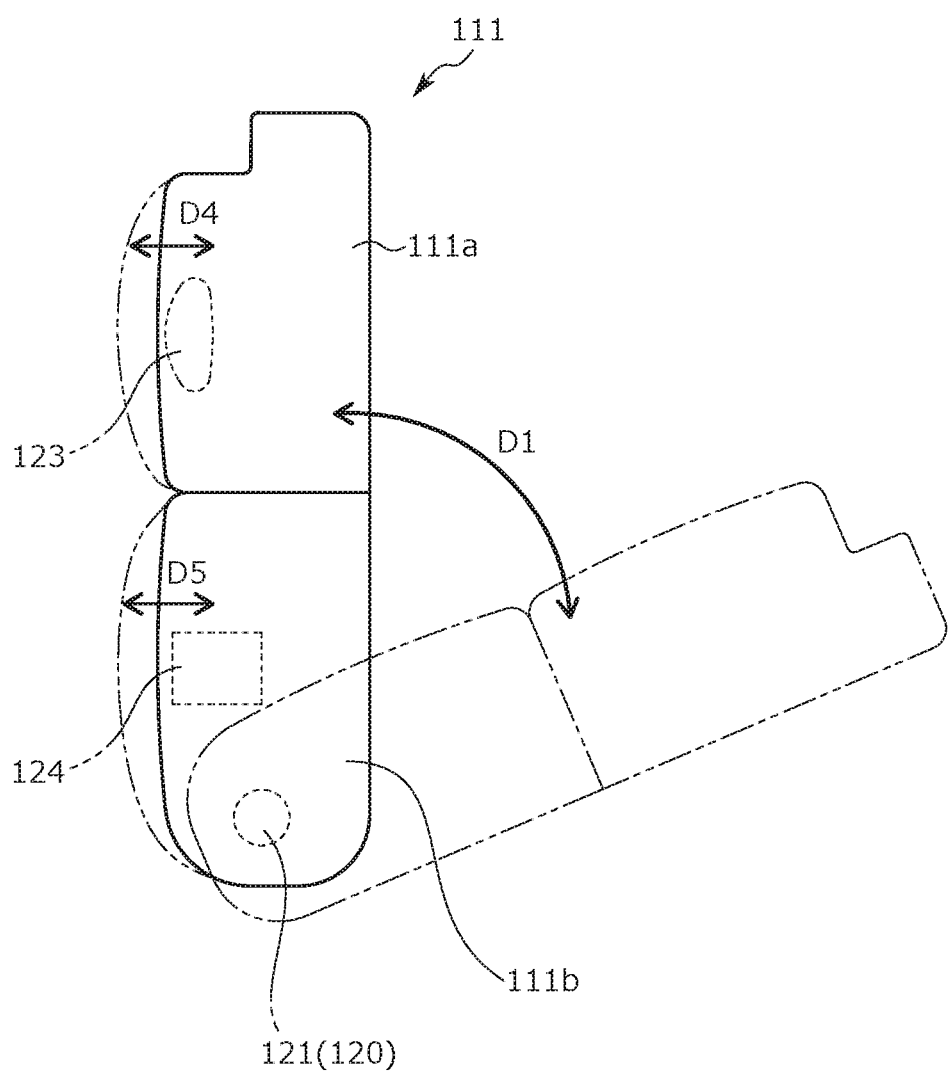
FIG. 31 is an explanatory diagram of a seat back-moving drive mechanism.
Figure 32:
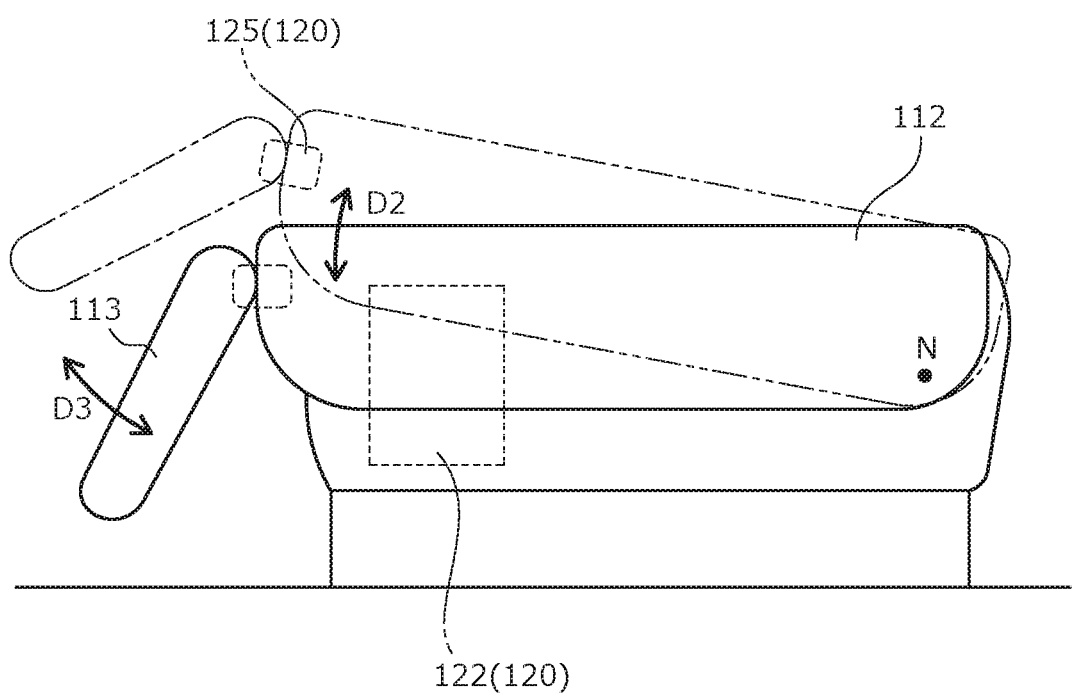
FIG. 32 is an explanatory diagram of a seat cushion-moving drive mechanism and an ottoman-moving drive mechanism.
Figure 34A:
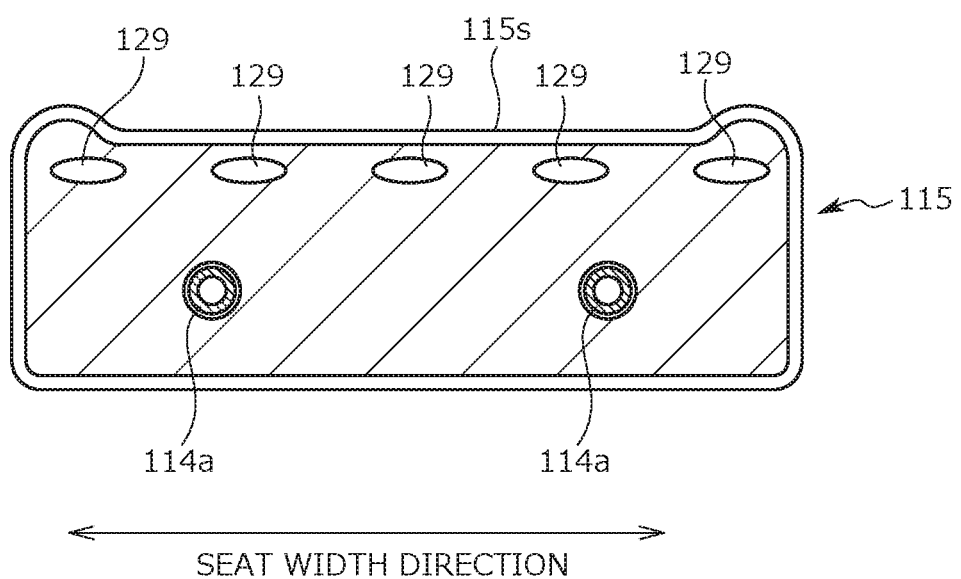
FIG. 34A is a diagram illustrating a cross section of a neck rest at a time when a bag body in the neck rest is deflated.
Figure 34B:
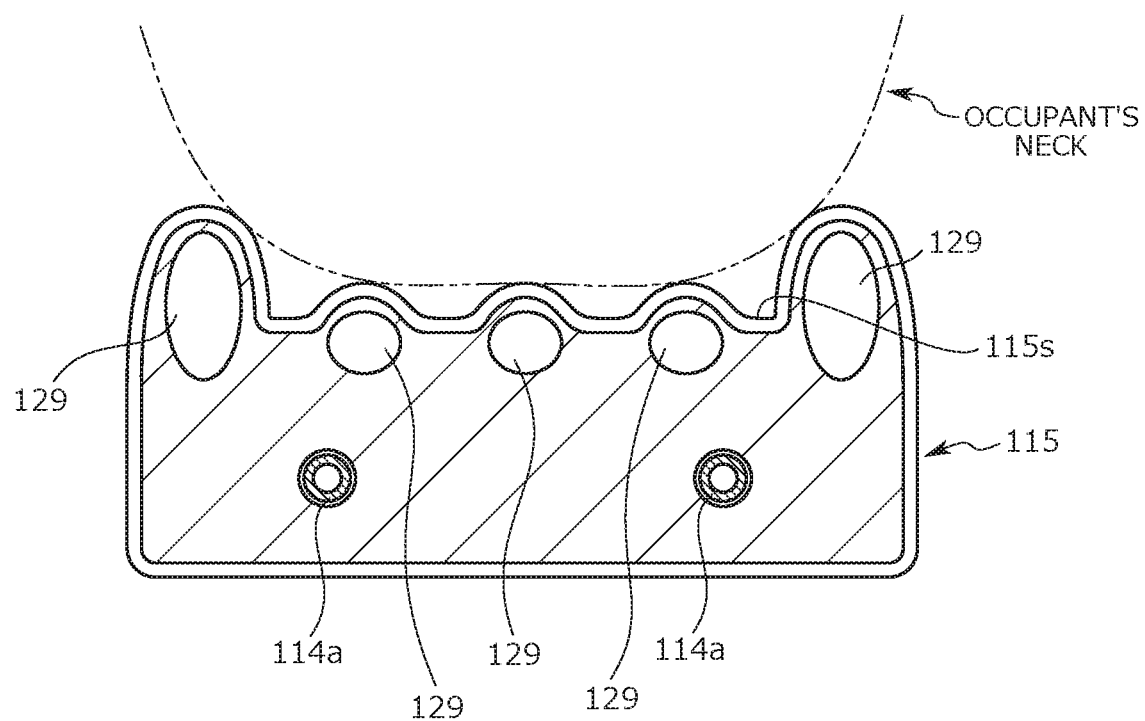
FIG. 34B is a diagram illustrating a cross section of the neck rest at a time when the bag body in the neck rest bulges.

Next, various drive mechanisms operating in order to change the posture of the seat 110 and the state of each portion of the seat will be described with reference to FIGS. 31 to 34B. FIG. 31 is an explanatory diagram of a drive mechanism that moves the seat back 111. FIG. 32 is an explanatory diagram of a drive mechanism that moves the seat cushion 112 and a drive mechanism that moves the ottoman 113. FIG. 33 is an explanatory diagram of a drive mechanism that moves the headrest 114 and a drive mechanism that moves the neck rest 115. FIGS. 34A and 34B are diagrams illustrating a cross section of the neck rest 115 (strictly speaking, a cross section in which the direction of extension is a normal direction). FIG. 34A illustrates a state where a bag body 129 in the neck rest 115 is deflated and FIG. 34B illustrates a state where the bag body 129 in the neck rest 115 bulges.

It should be noted that a known mechanism can be used without limitation as each drive mechanism insofar as the function to be described later is exhibited and the configuration of the mechanism is not particularly limited. Accordingly, the drive mechanism is schematically illustrated in each of FIGS. 31 to 34B.

The posture switching mechanism 120 for switching the posture of the seat 110 is provided in the seat 110. The posture switching mechanism 120 operates in order to move each of the seat back 111, the seat cushion 112, and the ottoman 113. More specifically, the posture switching mechanism 120 has a tilt angle adjustment mechanism 121 as a drive mechanism for the seat back 111, a lifting mechanism 122 as a drive mechanism for the seat cushion 112, and a deployment mechanism 125 as a drive mechanism for the ottoman 113 as illustrated in FIGS. 31 and 32.

The tilt angle adjustment mechanism 121 is a mechanism that moves (pivots) the seat back 111 such that the tilt angle of the seat back 111 changes and, for example, a motor-driven electric reclining mechanism constitutes the tilt angle adjustment mechanism 121. The seat back 111 moves in the direction that is indicated by Arrow D1 in FIG. 31 by the tilt angle adjustment mechanism 121 operating and moves between the position indicated by the solid line in FIG. 31 and the position indicated by the two-dot chain line in FIG. 31 to be specific.

The lifting mechanism 122 is a mechanism that moves (pivots) the seat cushion 112 about the fulcrum N such that the front end portion of the seat cushion 112 ascends and descends and, for example, a jack-type electric lift mechanism constitutes the lifting mechanism 122. The seat cushion 112 moves in the direction that is indicated by Arrow D2 in FIG. 32 by the lifting mechanism 122 operating and moves between the position indicated by the solid line in FIG. 32 and the position indicated by the two-dot chain line in FIG. 32 to be specific.

The deployment mechanism 125 is a mechanism that moves (pivots) the ottoman 113 such that the ottoman 113 moves from the storage position to the deployment position or from the deployment position to the storage position and, for example, a swing arm-type electric actuator constitutes the deployment mechanism 125. The ottoman 113 moves in the direction indicated by Arrow D3 in FIG. 32 by an upper side extrusion mechanism 123 operating and moves between the storage position indicated by the solid line in FIG. 32 and the deployment position indicated by the two-dot chain line in FIG. 32 to be specific.

In addition, a drive mechanism that operates in order to change the state of each portion of the seat back 111 is provided in the seat back 111. More specifically, as illustrated in FIG. 31, the back upper portion 111a is provided with the upper side extrusion mechanism 123 that operates in order to change the state of the upper side part of the backrest surface (front surface) of the seat back 111. In addition, as illustrated in FIG. 31, the back lower portion 111b is provided with a lower side extrusion mechanism 124 that operates in order to change the state of the lower side part of the backrest surface (front surface) of the seat back 111.

An inflatable and deflatable bag body (so-called air lumbar) disposed directly behind the backrest surface in the seat back 111 constitutes the upper side extrusion mechanism 123. Further, the backrest surface is displaced in the direction indicated by Arrow D4 in FIG. 31 in the back upper portion 111a and reciprocates between the position indicated by the solid line in FIG. 31 and the position indicated by the two-dot chain line in FIG. 31 to be specific once the upper side extrusion mechanism 123 operates (inflates and deflates).

A piston-type electric actuator disposed directly behind the backrest surface in the seat back 111 constitutes the lower side extrusion mechanism 124. Further, the backrest surface is displaced in the direction indicated by Arrow D5 in FIG. 31 in the back lower portion 111b and reciprocates between the position indicated by the solid line in FIG. 31 and the position indicated by the two-dot chain line in FIG. 31 to be specific once the lower side extrusion mechanism 124 operates.

A drive mechanism for the headrest 114 and a drive mechanism for the neck rest 115 as well as the drive mechanisms described above are provided in the seat 110. More specifically, a headrest drive mechanism 126 and a neck rest drive mechanism 127 illustrated in FIG. 33 are disposed in the upper end portion of the seat back 111. In addition, as illustrated in FIG. 33, a displacement mechanism 128 is disposed in the front end portion (substantially rectangular parallelepiped part) of the neck rest 115.

The headrest drive mechanism 126 is a mechanism that moves (moves upward and downward) the headrest 114 with respect to the seat back 111 along the direction of extension. The headrest drive mechanism 126 is fixed to a seat back frame (not illustrated) in the seat back 111 and is engaged with the pillar 114a of the headrest 114. Specifically, in an example, the headrest drive mechanism 126 is provided with a pinion (not illustrated) connected to a motor. The pinion is engaged with the rack (not illustrated) that is provided on the pillar 114a of the headrest 114. Once the headrest drive mechanism 126 configured as described above operates, the position of engagement between the pinion and the rack changes and the headrest 114 including the pillar 114a moves in the direction indicated by Arrow D6 in FIG. 33 as a result.

The neck rest drive mechanism 127 is a mechanism that moves (moves upward and downward) the neck rest 115 with respect to the headrest 114 along the direction of extension. The neck rest drive mechanism 127 is fixed to the supporting protruding portion 115a of the neck rest 115 and is engaged with the stay 111c provided in the seat back 111. Specifically, in an example, the neck rest drive mechanism 127 is provided with a pinion (not illustrated) connected to a motor. The pinion is engaged with the rack (not illustrated) that is provided on the stay 111c. Once the neck rest drive mechanism 127 configured as described above operates, the position of engagement between the pinion and the rack changes and the neck rest 115 moves in the direction indicated by Arrow D7 in FIG. 33 as a result.

It should be noted that the neck rest 115 moves alone when the neck rest 115 moves along the direction of extension. In other words, the neck rest 115 according to the present embodiment is capable of moving in a state where the neck rest 115 is separated from the headrest 114. In other words, in the present embodiment, each of the headrest 114 and the neck rest 115 can be moved individually.

The displacement mechanism 128 is a mechanism that moves a portion of the support surface 115s of the neck rest 115 toward an occupant's neck in a state where the occupant is seated in the seat 110. As illustrated in FIGS. 34A and 34B, the displacement mechanism 128 has a plurality of the bag bodies 129 provided in the neck rest 115. As illustrated in FIGS. 34A and 34B, each of the plurality of bag bodies 129 is disposed behind the support surface 115s in the front end portion (substantially rectangular parallelepiped part) of the neck rest 115 and, more specifically, directly behind the skin material that constitutes the support surface 115s. In addition, the plurality of bag bodies 129 are disposed in bilateral symmetry with the middle portion of the neck rest 115 in the seat width direction as a boundary.

Each bag body 129 is capable of inflating and deflating, bulges by the air that is supplied from an air pump (not illustrated) being sealed, and deflates by the air in the bag body 129 being discharged. It should be noted that an air flow path is laid from the air pump toward the air lumbar forming the upper side extrusion mechanism 123 in the present embodiment and a portion of the air flow path branches and extends toward each bag body 129 of the displacement mechanism 128.

Further, the part of the support surface 115s of the neck rest 115 that is positioned in front of the bag body 129 bulges toward the occupant's neck as illustrated in FIG. 33 by the bag body 129 bulging. In other words, a portion of the support surface 115s of the neck rest 115 is displaced up to the position that is indicated by the two-dot chain line in FIG. 33. As a result, the bulging part of the support surface 115s comes into contact with the occupant's neck as illustrated in FIG. 34B.

In addition, in the present embodiment, the amount of bulging of each of the plurality of bag bodies 129 disposed in bilateral symmetry is changed in accordance with the position of disposition of each bag body 129. Specifically, as illustrated in FIG. 34B, the amount of bulging of each bag body 129 is set such that the amount of bulging is larger in the bag body 129 positioned on the outer side in the seat width direction. Accordingly, on the support surface 115s of the neck rest 115, the amount of forward bulging increases on the outer side in the seat width direction. As a result, the shape of the support surface 115s can be changed in accordance with the shape (curved shape) of the occupant's neck such that the support surface 115s fits well with (abuts well against) the occupant's neck.

It should be noted that bulging of the two bag bodies 129 that are positioned on the outermost side in the seat width direction (hereinafter, the two outermost bag bodies 129) among the plurality of bag bodies 129 and bulging of the part positioned in front of the bag body 129 in the support surface 115s result in sandwiching of the occupant's neck between the two bulging parts formed on the support surface 115s. In addition, the interval between the two neck-sandwiching bulging parts varies with the amount of bulging of each of the two outermost bag bodies 129. Here, a periodic change in the amount of bulging of each of the two outermost bag bodies 129 results in a periodic change in the interval between the two bulging parts. As a result, the magnitude of the contact pressure of each bulging part applied to the neck sandwiched between the two bulging parts periodically changes. The neck can be massaged by means of the bulging part of the support surface 115s by the operation described above being used.

<<Regarding Control of Drive Mechanism>>

The above-described drive mechanisms (posture switching mechanism 120, upper side extrusion mechanism 123, lower side extrusion mechanism 124, headrest drive mechanism 126, neck rest drive mechanism 127, and displacement mechanism 128) for moving each portion of the seat 110 are controlled by the controller 130. Hereinafter, the control of each drive mechanism by the controller 130 will be described.

An electric control unit (ECU) constitutes the controller 130 and the controller 130 is installed in the seat 110, on the back side of the seat back 111 or the seat cushion 112, or in the vicinity of the seat 110. The controller 130 receives signals from various sensors attached in the seat 110 and controls the drive mechanisms based on the signals.

Here, the sensors in the seat 110 will be described with reference to FIG. 27. The seat 110 has an occupant detection sensor 141, a neck detection sensor 142, and a head detection sensor 143. The occupant detection sensor 141 is a sensor detecting that an occupant is seated in the seat 110 and, for example, a sensor (pressure sensor) for a seat belt reminder constitutes the occupant detection sensor 141.

It should be noted that the occupant detection sensor 141 may be provided in the seat back 111 although the occupant detection sensor 141 is provided in the seat cushion 112 in the configuration illustrated in FIG. 27. In addition, the occupant detection sensor 141 is not limited to a sensor for a seat belt reminder insofar as the occupant detection sensor 141 has the function of detecting that an occupant is seated in the seat 110 and the occupant detection sensor 141 may be, for example, a sensor that measures the weight of a seat or a human detection sensor that irradiates a seated occupant in a seat with infrared rays and receives reflected light. Alternatively, an occupant seated in the seat 110 may be detected by the inside of a car being videoed with a camera and the video being analyzed.

The neck detection sensor 142 is a sensor detecting that an occupant's neck is in contact with the support surface 115s of the neck rest 115 and, for example, a pressure sensor disposed directly behind the support surface 115s in the neck rest 115 constitutes the neck detection sensor 142. However, the neck detection sensor 142 is not limited to a pressure sensor. In other words, another sensor (specifically, a sensor specifying the position of the neck and detecting that the neck is in contact with the neck rest 115) may be used insofar as the sensor detects that the occupant's neck is in contact with the support surface 115s of the neck rest 115.

The head detection sensor 143 is a sensor detecting that an occupant's head is in contact with the front surface of the headrest 114 (that is, a surface facing the head) and, for example, a pressure sensor disposed on the back side of the front side skin in the headrest 114 constitutes the head detection sensor 143. However, the head detection sensor 143 is not limited to a pressure sensor. In other words, another sensor (specifically, a sensor specifying the position of the head and detecting that the head is in contact with the headrest 114) may be used insofar as the sensor detects that the occupant's head is in contact with the front surface of the headrest 114.

It should be noted that not only the sensors described above but also sensors for specifying the respective current positions of the seat back 111, the seat cushion 112, and the ottoman 113 (hereinafter, the locating sensors) are provided in the seat 110 although the locating sensors are not illustrated in FIG. 27. The locating sensors may directly measure the respective current positions of the seat back 111, the seat cushion 112, and the ottoman 113. Alternatively, a sensor for specifying the amount of operation of each drive mechanism (specifically, the tilt angle adjustment mechanism 121, the lifting mechanism 122, and the deployment mechanism 125), such as a Hall element attached to the drive motor of each drive mechanism, may be used as the locating sensor. In such a case, the amounts of operation of the drive mechanisms are respectively calculated from the output signals of the locating sensors and the respective current positions of the seat back 111, the seat cushion 112, and the ottoman 113 are specified based on the amounts of operation.

Further, the controller 130 receives an output signal from each sensor described above and controls each drive mechanism based on the received signal. For example, the controller 130 controls the headrest drive mechanism 126 and the neck rest drive mechanism 127 based on an output signal from the head detection sensor 143. As a result, the headrest 114 and the neck rest 115 move along the direction of extension. In addition, the controller 130 controls the displacement mechanism 128 based on an output signal from the neck detection sensor 142. As a result, the portion of the support surface 115s of the neck rest 115 is displaced (bulges) toward the occupant's neck.

In addition, the seat 110 is provided with an operating switch 131 for posture switching as illustrated in FIG. 27. The operating switch 131 is a push button-type switch provided on a vehicle door or an armrest and is operated when an occupant seated in the seat 110 switches the posture of the seat 110.

Once the operating switch 131 is operated, a signal corresponding to the content of the operation is output from the operating switch 131 and the controller 130 controls each drive mechanism based on the output signal from the operating switch 131. Specifically, the controller 130 controls the tilt angle adjustment mechanism 121, the lifting mechanism 122, and the deployment mechanism 125 such that each of the seat back 111, the seat cushion 112, and the ottoman 113 moves to the position at a time of the tilt posture once the operating switch 131 is operated so as to switch the posture of the seat 110 in the standing posture to the tilt posture.

<<Control Flow Executed by Controller>>

The controller 130 executes a predetermined control flow (hereinafter, the flow at sitting) immediately after an occupant sits in the seat 110. In addition, the controller 130 executes a control flow for switching the posture of the seat 110 in the standing posture to the tilt posture (hereinafter, the tilt posture transition flow). Hereinafter, the flow and the control content of each control flow will be described.

(Regarding Flow at Sitting)

Figure 35:
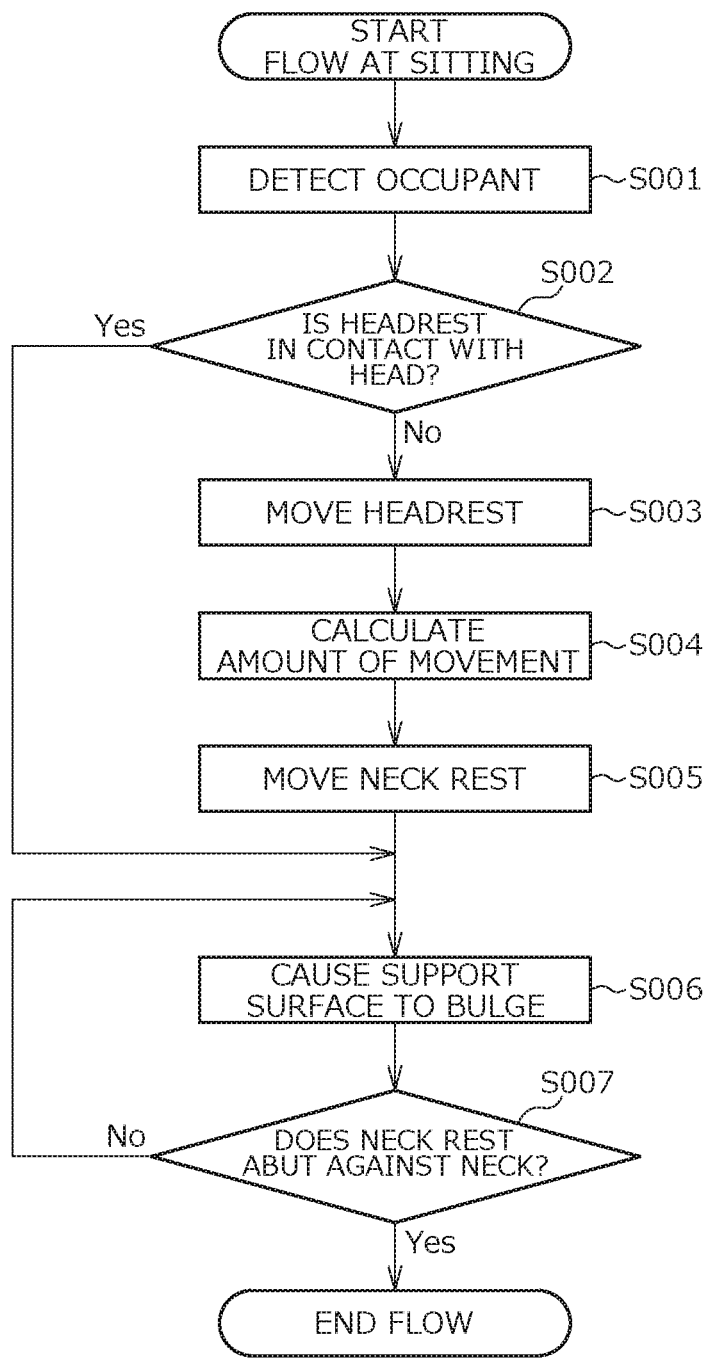
FIG. 35 is a diagram illustrating the flow of a control flow performed immediately after an occupant sits in the conveyance seat.
Figure 36A:
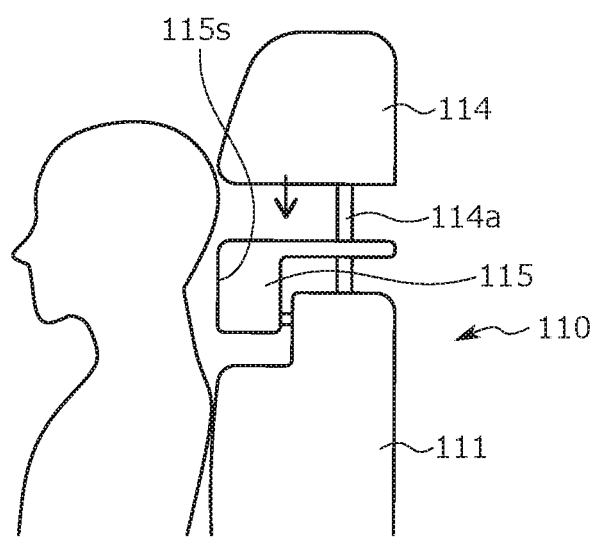
FIG. 36A is a diagram illustrating a state during headrest position adjustment.
Figure 36B:
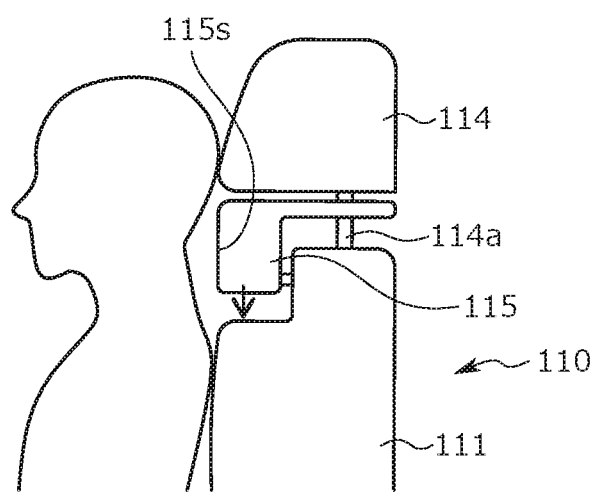
FIG. 36B is a diagram illustrating a state during neck rest position adjustment.
Figure 36C:
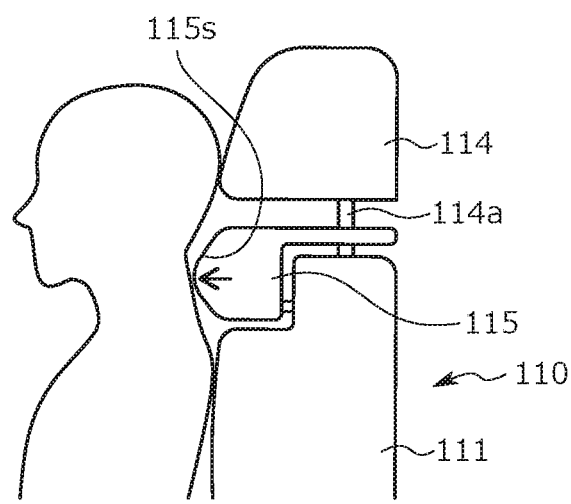
FIG. 36C is a diagram illustrating a state where the support surface of the neck rest bulges.

First, the flow at sitting will be described with reference to FIGS. 35 and 36A to 36C. FIG. 35 is a diagram illustrating the flow of the flow at sitting. FIGS. 36A to 36C are diagrams illustrating the state of each process in the flow at sitting. Specifically, FIG. 36A is a diagram illustrating a state where the position of the headrest 114 is under adjustment, FIG. 36B is a diagram illustrating a state where the position of the neck rest 115 is under adjustment, and FIG. 36C is a diagram illustrating a state where a portion of the support surface 115s of the neck rest 115 bulges toward an occupant's neck.

The flow at sitting is executed so that the positions of the headrest 114 and the neck rest 115 and so on are adjusted in accordance with the physique (specifically, the sitting height) of the occupant seated in the seat 110. As illustrated in FIG. 35, the flow at sitting starts once the occupant detection sensor 141 detects the occupant seated in the seat 110 (S001). In other words, once the controller 130 receives the output signal from the occupant detection sensor 141, the controller 130 sequentially executes the steps starting from Step S002 of the flow at sitting by using the received output signal as a trigger.

Specifically, after receiving the output signal from the occupant detection sensor 141, the controller 130 determines, based on the output signal from the head detection sensor 143, whether or not the occupant's head is in contact with the headrest 114 (S002).

More specifically, the posture of the seat 110 is the standing posture immediately after the occupant sits in the seat 110. In addition, immediately after the occupant sits in the seat 110, the headrest 114 and the neck rest 115 are positioned at normal positions in the direction of extension. The normal positions are positions set on the assumption that a general adult male is seated in the seat 110. In other words, the normal position of the headrest 114 is the position (height) at which the headrest 114 comes into contact with the head of a general adult male seated in the seat 110 and the normal position of the neck rest 115 is the position at which the neck rest 115 comes into contact with the neck of a general adult male seated in the seat 110.

Immediately after an occupant with a relatively large physique sits in the seat 110 under the situation described above, the occupant's head is in contact with the headrest 114 and the head detection sensor 143 detects the contact. In this case, the controller 130 determines in Step S002 that the occupant's head is in contact with the headrest 114 and proceeds to Step S006 as illustrated in FIG. 35.

In contrast, immediately after an occupant with a relatively small physique sits in the seat 110, the occupant's head is not in contact with the headrest 114 and no signal is output from the head detection sensor 143. In this case, the controller 130 determines in Step S002 that the occupant's head is not in contact with the headrest 114 and proceeds to Step S003 as illustrated in FIG. 35.

Specifically, the controller 130 moves the headrest 114 downward by controlling the headrest drive mechanism 126 (S003). As a result, the headrest 114 is lowered from the normal position as illustrated in FIG. 36A. In Step S003, the controller 130 continues to move the headrest 114 by controlling the headrest drive mechanism 126 until the occupant's head comes into contact with the headrest 114 and the head detection sensor 143 detects the contact.

Once the occupant's head comes into contact with the headrest 114 as a result of the movement of the headrest 114 and the head detection sensor 143 detects the contact, the controller 130 calculates the amount of movement of the headrest 114 in Step S003 (S004). Specifically, the seat 110 is provided with a sensor that outputs a signal corresponding to the amount of operation of the headrest drive mechanism 126. The controller 130 specifies the amount of operation of the headrest drive mechanism 126 in Step S003 based on the output signal from the sensor and calculates the amount of movement of the headrest 114 in the step from the result of the specification.

After the result of the calculation of the amount of movement of the headrest 114 is obtained, the controller 130 controls the neck rest drive mechanism 127 and moves the neck rest 115 by an amount corresponding to the amount of movement of the headrest 114 calculated in Step S004 (S005). As a result, the neck rest 115 is lowered from the normal position as illustrated in FIG. 36B. More specifically, the neck rest 115 is lowered by the same distance as the distance by which the headrest 114 has moved in Step S003. Then, the processing proceeds to Step S006 after the neck rest 115 moves by a predetermined amount (specifically, the same amount of movement as the amount of movement of the headrest 114).

In Step S006, the controller 130 displaces a portion of the support surface 115s of the neck rest 115 toward the occupant's neck by controlling the displacement mechanism 128 (S006). Specifically, each of the plurality of bag bodies 129 disposed in the front end portion of the neck rest 115 is caused to bulge. As a result, the part of the support surface 115s that is positioned in front of each bag body 129 bulges toward the neck as illustrated in FIG. 36C.

During the control of the displacement mechanism 128, the controller 130 determines, based on the output signal from the neck detection sensor 142, whether or not the occupant's neck is in contact with the support surface 115s of the neck rest 115 (S007). Specifically, the controller 130 determines that the neck is not in contact with the support surface 115s in a case where the controller 130 receives no output signal from the neck detection sensor 142. In such a case, the controller 130 controls the displacement mechanism 128 such that the portion of the support surface 115s continues to be displaced (bulge) until the neck detection sensor 142 detects that the neck is in contact with the support surface 115s.

In contrast, when the neck is in contact with the support surface 115s and the neck detection sensor 142 detects the contact and outputs a signal, the controller 130 determines that the neck is in contact with the support surface 115s and stops the displacement mechanism 128. Then, the controller 130 terminates the flow at sitting at the point in time when the displacement mechanism 128 is stopped.

As described above, in the flow at sitting, the positions of the headrest 114 and the neck rest 115 are adjusted in accordance with the physique of the occupant seated in the seat 110. At this time, the neck rest 115 is moved in conjunction with the movement of the headrest 114.

It should be noted that the headrest 114 and the neck rest 115 may be moved at the same time without limitation to the present embodiment although the neck rest 115 is moved after the headrest 114 is moved in the present embodiment.

In addition, once the neck rest 115 moves in the flow at sitting, the portion of the support surface 115s is displaced (allowed to bulge) by the displacement mechanism 128 such that the portion of the support surface 115s of the neck rest 115 comes into contact with the occupant's neck. As a result, the position of the neck support by the neck rest 115 can be individually adjusted in each of the direction of extension of the seat back 111 and the front to back direction (that is, the thickness direction of the seat back 111).

It should be noted that the portion of the support surface 115s may be displaced by the displacement mechanism 128 being controlled while the neck rest 115 is moved along the direction of extension without limitation to the present embodiment although the portion of the support surface 115s is displaced by the displacement mechanism 128 being controlled after the neck rest 115 finishes moving along the direction of extension in the present embodiment.

(Regarding Tilt Posture Transition Flow)

Figure 37:
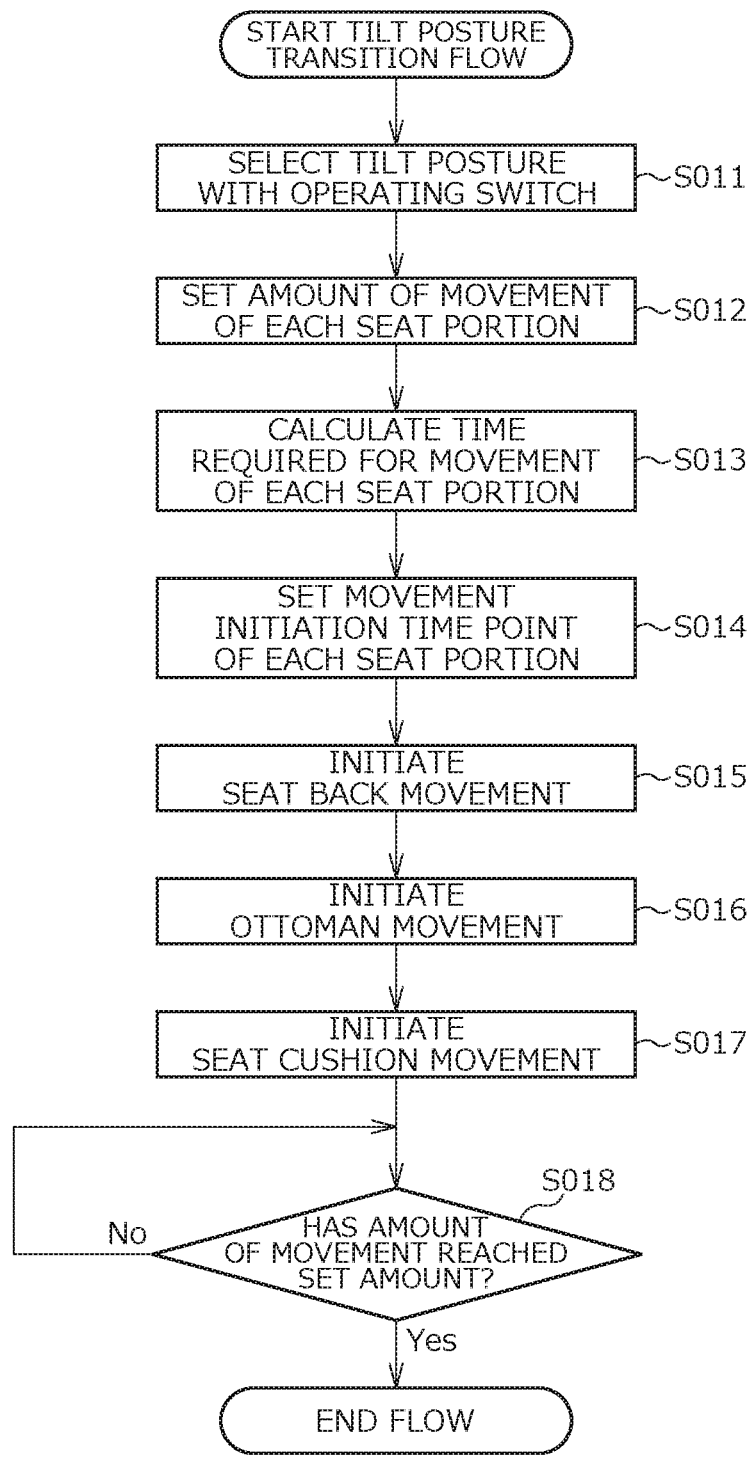
FIG. 37 is a diagram illustrating the flow of a control flow for switching the posture of the conveyance seat to the tilt posture.
Figure 38:
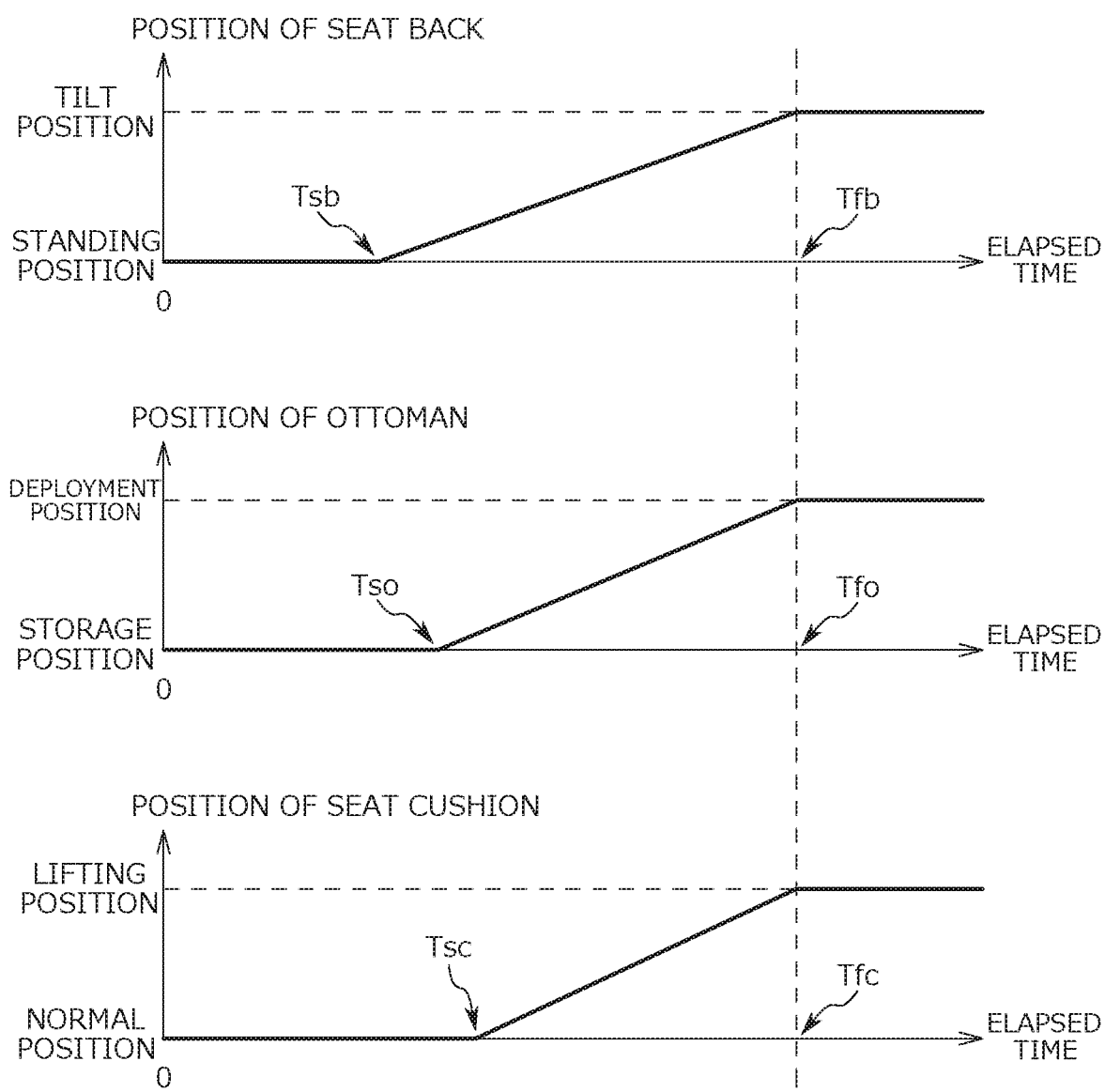
FIG. 38 is a timing chart illustrating a period in which each seat portion is moved so that the posture of the conveyance seat is switched to the tilt posture.

Next, the tilt posture transition flow will be described with reference to FIGS. 37 and 38. FIG. 37 is a diagram illustrating the flow of the tilt posture transition flow. FIG. 38 is a timing chart illustrating a period in which each portion of the seat is moved so that the posture of the seat 110 is switched to the tilt posture. The horizontal axis in FIG. 38 indicates the elapsed time from an operation time point of the operating switch 131 and the vertical axis in FIG. 38 indicates the positions of the seat back 111, the seat cushion 112, and the ottoman 113.

It should be noted that the position of the seat back 111 at a time when the seat 110 is in the standing posture is "standing position" and the position of the seat back 111 at a time when the seat 110 is in the tilt posture is "tilt position" in the following description. In addition, the position of the seat cushion 112 at a time when the seat 110 is in the standing posture is "normal position" and the position of the seat cushion 112 at a time when the seat 110 is in the tilt posture is "lifting position".

As illustrated in FIG. 37, the tilt posture transition flow is initiated when an occupant seated in the seat 110 selects the posture switching to the tilt posture by operating the operating switch 131 and by the selection being used as a trigger (S011). In other words, once an occupant performs an operation for switching the posture of the seat 110 to the tilt posture, the operating switch 131 outputs a signal corresponding to the content of the operation in response to the operation. Once the controller 130 receives the output signal from the operating switch 131, the controller 130 sequentially executes the steps starting from Step S012 of the tilt posture transition flow by using the received output signal as a trigger.

Specifically, once the controller 130 receives the output signal from the operating switch 131, the controller 130 sets the amounts of movement of the seat back 111, the seat cushion 112, and the ottoman 113 necessary for the transition to the tilt posture (S012).

More specifically, in Step S012, the controller 130 first specifies the current position of each of the seat back 111, the seat cushion 112, and the ottoman 113 based on the output signals from the locating sensors. Subsequently, the controller 130 calculates the distance from the specified current position to the position of disposition in the tilt posture and sets the result of the calculation as the amount of movement. Here, "tilt position", "lifting position", and "deployment position" correspond to the position of disposition in the tilt posture with regard to the seat back 111, the seat cushion 112, and the ottoman 113, respectively.

It should be noted that the following description is on the assumption that the positions (current positions) of the seat back 111, the seat cushion 112, and the ottoman 113 at a point in time when the operating switch 131 is operated are positions of disposition in the standing posture, that is, "standing position", "normal position", and "storage position".

After setting the amount of movement of each portion of the seat, the controller 130 calculates the required time for each portion of the seat to be moved by the amount of movement set in Step S012 (S013). Specifically, the controller 130 calculates the time that is required for the tilt angle adjustment mechanism 121 to move the seat back 111 from the standing position to the tilt position. Likewise, the controller 130 calculates the time that is required for the lifting mechanism 122 to move the seat cushion 112 from the normal position to the lifting position and the time that is required for the deployment mechanism 125 to move the ottoman 113 from the storage position to the deployment position.

It should be noted that the time required to move the seat back 111 to the tilt position is the longest, the time required to move the ottoman 113 to the deployment position is the second-longest, and the time required to move the seat cushion 112 to the lifting position is the shortest in a case where the posture of the seat 110 is switched from the standing posture to the tilt posture. This reflects that the amount of movement of the seat back 111 is the largest, the amount of movement of the ottoman 113 is the second-largest, and the amount of movement of the seat cushion 112 is the smallest when the posture of the seat 110 is switched from the standing posture to the tilt posture.

Next, the controller 130 sets the respective movement initiation time points of the seat back 111, the seat cushion 112, and the ottoman 113 based on the result of the calculation in Step S013 (S014). In Step S014, the controller 130 sets the respective movement initiation time points such that the timings at which the seat back 111 finishes moving, the seat cushion 112 finishes moving, and the ottoman 113 finishes moving are aligned.

A procedure for setting the movement initiation time points will be described with reference to FIG. 38. First, the controller 130 sets a movement termination time point with respect to each of the seat back 111, the seat cushion 112, and the ottoman 113. Here, the movement termination time point of the seat back 111 is Tfb, the movement termination time point of the seat cushion 112 is Tfc, and the movement termination time point of the ottoman 113 is Tfo.

Subsequently, the controller 130 sets the respective movement termination time points Tfb, Tfc, and Tfo of the seat portions so as to become the same timing and then sets the time point that goes back by the movement time calculated in Step S013 from the respective movement termination time points as the movement initiation time points. Here, the movement initiation time point of the seat back 111 is Tsb, the movement initiation time point of the seat cushion 112 is Tsc, and the movement initiation time point of the ottoman 113 is Tso.

Then, the movement initiation time point Tsb of the seat back 111 is the earliest point in time, the movement initiation time point Tso of the ottoman 113 is the second-earliest point in time, and the movement initiation time point Tsc of the seat cushion 112 is the latest point in time as illustrated in FIG. 38. Such lags among the movement initiation time points reflects that the required movement times calculated in Step S013 are different among the seat back 111, the seat cushion 112, and the ottoman 113.

Further, the controller 130 controls the tilt angle adjustment mechanism 121, the lifting mechanism 122, and the deployment mechanism 125 such that each portion of the seat starts to move at the movement initiation time point set in Step S014.

More specifically, the controller 130 first moves the seat back 111 toward the tilt position by controlling the tilt angle adjustment mechanism 121 at the point in time when an elapsed time since the operation time point of the operating switch 131 reaches Tsb (S015). Next, the controller 130 moves the ottoman 113 toward the deployment position by controlling the deployment mechanism 125 at the point in time when the elapsed time since the operation time point of the operating switch 131 reaches Tso (S016). Lastly, the controller 130 moves the seat cushion 112 toward the lifting position by controlling the lifting mechanism 122 at the point in time when the elapsed time since the operation time point of the operating switch 131 reaches Tsc (S017).

The controller 130 continues to move each seat portion until the amount of movement of each of the seat back 111, the seat cushion 112, and the ottoman 113 reaches the amount of movement set in Step S012 (S018).

Then, the controller 130 stops the tilt angle adjustment mechanism 121, the lifting mechanism 122, and the deployment mechanism 125 once the amount of movement of each of the seat back 111, the seat cushion 112, and the ottoman 113 reaches the amount of movement set in Step S012. As a result, each of the seat back 111, the seat cushion 112, and the ottoman 113 finishes moving. Then, the tilt posture transition flow is terminated at the point in time when each seat portion finishes moving and the posture of the seat 110 becomes the tilt posture.

It should be noted that the respective movement termination time points Tfb, Tfc, and Tfo of the seat back 111, the seat cushion 112, and the ottoman 113 are aligned in the present embodiment. In other words, in the present embodiment, the seat back 111 reaches the tilt position, the seat cushion 112 reaches the lifting position, and the ottoman 113 reaches the deployment position at the same timing. An occupant seated in the seat 110 feels comfortable by the movement of each portion of the seat ending at the same timing in this manner. More specifically, since the occupant is seated in the seat 110 even during posture switching, the occupant feels more comfortable in a case where the movement of each portion of the seat ends at the same time than in a case where any of the seat portions continues to move.

Another Embodiment

Although an example of the configurations of the conveyance seat and the seat unit of the present invention has been described above, the above embodiments are merely examples and other embodiments are also conceivable. For example, although the headrest 114 and the neck rest 115 are separate bodies separated from each other in the above embodiments, the present invention is not limited thereto and the headrest and the neck rest may be integrated as the same member.

In addition, in the above embodiments, the movement of the headrest 114 continues until the head detection sensor 143 detects that the occupant's head is in contact with the headrest 114 when the headrest 114 is moved along the direction of extension by the headrest drive mechanism 126 being controlled. However, the present invention is not limited thereto and, for example, an occupant's sitting height or head position may be specified in advance before the headrest drive mechanism 126 is controlled and the amount of movement of the headrest 114 may be subsequently set based on the result of the sitting height or head position specification and the headrest drive mechanism 126 may be subsequently controlled such that the headrest 114 is moved by the amount of movement.

In addition, in the above embodiments, the displacement mechanism 128 has the bag body 129 disposed in the front end portion of the neck rest 115 and the portion of the support surface 115s is displaced by the bag body 129 being caused to bulge. However, a device other than the bag body 129 may be used insofar as the device displaces the portion of the support surface 115s. For example, an actuator having a retractable and movable part, a rolling element changeable in disposition position, examples of which include a massage ball used in a general massage chair, or the like may be disposed behind the support surface 115s and a portion of the support surface 115s may be displaced by the portion being pressed from behind by such a device.

Summary of Second Embodiment

A conveyance seat of the present invention in which a conveyance occupant can sit includes a seat back, a posture switching mechanism for switching a posture of the conveyance seat between a standing posture in which the seat back stands and a tilt posture in which the seat back is tilted backward, a headrest positioned above the seat back when the posture is the standing posture, a neck rest having a support surface supporting the occupant's neck and positioned below the headrest when the posture is the standing posture, and a displacement mechanism provided in the neck rest and displacing a portion of the support surface toward the occupant's neck, in which the neck rest is movable along a direction of extension of the seat back and the displacement mechanism displaces the portion of the support surface such that the portion of the support surface comes into contact with the occupant's neck when the neck rest moves.

In the conveyance seat of the present invention configured as described above, the neck rest is movable along the direction of extension of the seat back. In addition, when the neck rest moves, the displacement mechanism provided in the neck rest displaces the portion of the neck support surface in the neck rest toward the neck. In other words, in the conveyance seat of the present invention, the position of the neck support by the neck rest can be adjusted in each of the direction of extension of the seat back and the direction from the support surface of the neck rest to an occupant's neck. As a result, improvement in terms of the degree of freedom is achieved regarding the adjustment of the position of the neck support by the neck rest.

In addition, as for a preferable configuration related to the conveyance seat described above, the conveyance seat may further include a headrest drive mechanism moving the headrest with respect to the seat back along the direction of extension and a neck rest drive mechanism moving the neck rest with respect to the headrest along the direction of extension. The neck rest drive mechanism may move the neck rest along the direction of extension and in accordance with the amount of movement of the headrest once the headrest drive mechanism moves the headrest.

Once the headrest drive mechanism moves the headrest along the direction of extension of the seat back in the configuration described above, the neck rest drive mechanism moves the neck rest in conjunction with the movement, in accordance with the amount of movement of the headrest, and along the direction of extension of the seat back. As a result, when the position of head support by the headrest is adjusted, the position of neck support by the neck rest can be adjusted in conjunction with the adjustment.

In addition, as for a more preferable configuration related to the conveyance seat described above, the displacement mechanism may have an inflatable and deflatable bag body disposed behind the support surface in the neck rest and the part of the support surface that is positioned in front of the bag body may bulge toward an occupant's neck by the bag body bulging.

In the configuration described above, the portion of the support surface is displaced (allowed to bulge) toward the neck by the bag body disposed behind the support surface in the neck rest being caused to bulge. With such a configuration, the portion of the support surface of the neck rest can be displaced toward the neck by means of a relatively simple configuration.

In addition, as for an even more preferable configuration related to the conveyance seat described above, a plurality of the bag bodies may be disposed along the width direction of the conveyance seat in the neck rest.

In the configuration described above, the plurality of bag bodies are disposed along the width direction of the conveyance seat in the neck rest. With such a configuration, the part of the support surface of the neck rest that is positioned in front of each bag body can be displaced (allowed to bulge) toward an occupant's neck. As a result, the shape of the support surface can be easily changed so as to fit with the shape (curved shape) of the neck.

In addition, the objects described above are solved by means of a seat unit of the present invention including any one of the conveyance seats configured as described above and a controller controlling the displacement mechanism, in which the controller causes the portion of the support surface to be displaced by controlling the displacement mechanism after the neck rest finishes moving along the direction of extension.

In the seat unit configured as described above, the controller causes the portion of the support surface of the neck rest to be displaced toward an occupant's neck by controlling the displacement mechanism after the neck rest finishes moving along the direction of extension of the seat back. As a result, it is possible to change the shape of the support surface so as to come into contact with the occupant's neck after adjusting the position of the neck rest in the direction of extension of the seat back.

In addition, as for a preferable configuration related to the seat unit described above, the seat unit may further include a sensor detecting that an occupant's neck is in contact with the support surface and the controller may control the displacement mechanism such that the portion of the support surface continues to be displaced until the sensor detects that the occupant's neck is in contact with the support surface.

In the configuration described above, the displacement mechanism continues to displace the portion of the support surface until the sensor detects that the occupant's neck is in contact with the support surface of the neck rest. As a result, it is possible to reliably displace the portion of the support surface of the neck rest to the position of contact with the neck.

In addition, as for a more preferable configuration related to the seat unit described above, the conveyance seat may further include a seat cushion and an ottoman, the posture switching mechanism may be controlled by the controller, each of the seat back, the seat cushion, and the ottoman may be moved so that the posture is switched, and the controller may control the posture switching mechanism such that the respective movement end timings of the seat back, the seat cushion, and the ottoman are aligned.

In the configuration described above, the respective movement termination timings of the seat back, the seat cushion, and the ottoman are aligned when each of the seat back, the seat cushion, and the ottoman is moved so that the posture of the conveyance seat is switched. A seated occupant feels comfortable as a result of the alignment of the movement termination timings of the seat portions.

With the conveyance seat of the present invention, improvement in terms of the degree of freedom is achieved regarding the adjustment of the position of the neck support by the neck rest.

In addition, with the conveyance seat of the present invention, the position of neck support by the headrest can be adjusted in conjunction with and during the adjustment of the position of head support by the headrest.

In addition, with the conveyance seat of the present invention, the portion of the support surface of the neck rest can be displaced toward the neck by means of a relatively simple configuration.

In addition, with the conveyance seat of the present invention, the shape of the support surface can be easily changed so as to fit with the curved shape of the neck.

In addition, with the seat unit of the present invention, it is possible to change the shape of the support surface so as to come into contact with an occupant's neck after adjusting the position of the neck rest in the direction of extension of the seat back.

In addition, with the seat unit of the present invention, it is possible to reliably displace a portion of the support surface of the neck rest to the position of contact with a neck.

In addition, with the seat unit of the present invention, each portion can be moved such that a seated occupant feels comfortable when each of the seat back, the seat cushion, and the ottoman is moved so that the posture of the conveyance seat is switched.

REFERENCE SIGNS LIST 1, 1A, 1B, 1L, 1R: SEAT UNIT
2: THIRD ROW SEAT
  2A: SEAT CUSHION
  2B: SEAT BACK
  2C: LINK MECHANISM
3: INSTRUMENT PANEL
10: SEAT BACK
  10a: SEAT BACK UPPER PORTION
  10as: SIDE SUPPORT PORTION
  10b: SEAT BACK LOWER PORTION
  10bs: SIDE SUPPORT PORTION
11: SEAT CUSHION
  11S: SIDE SUPPORT PORTION
12: OTTOMAN
  12S: SIDE SUPPORT PORTION
13: HEADREST
  13A: MOVABLE PORTION
  13B: MIDDLE PORTION
14: NECK REST
15: BACK MOVABLE MECHANISM
16: CUSHION MOVABLE MECHANISM
17: OTTOMAN MOVABLE MECHANISM
18: HEADREST MOVABLE MECHANISM
19: NECK REST MOVABLE MECHANISM
20: SLIDE MECHANISM
21: UPPER RAIL
22: LOWER RAIL
23: OCCUPANT DETECTION SENSOR
24: TEMPERATURE ADJUSTMENT UNIT
25: LUMBAR SUPPORT MECHANISM
26: PRESSURE SENSOR
27: VIBRATION MOTOR
28: FIRST DISTANCE SENSOR
29: SECOND DISTANCE SENSOR
30: ILLUMINANCE SENSOR
31: OPERATING SWITCH
32: SUPPORT MEMBER
33: ARMREST
  33a: SHAFT PORTION
40: ECU (CONTROL UNIT)
41: PROCESSOR
42: MEMORY
43: INPUT-OUTPUT INTERFACE
50: LIGHTING SYSTEM
51: MOVABLE LIGHTING UNIT
  51A: LIGHTING UNIT
  51B: MOVABLE PORTION
52: MOVABLE ROTARY LIGHTING UNIT
  52A: LIGHTING UNIT
53: SPEAKER
60: SEAT BELT
61: RAIL
62: ANCHOR
63: BUCKLE
70A: FRONT TO BACK SLIDE RAIL
70B: FRONT TO BACK SLIDE RAIL
71: RIGHT TO LEFT SLIDE RAIL
80A: MICROPHONE (VOICE INPUT UNIT)
80B: MICROPHONE (VOICE INPUT UNIT)
AB: AIRBAG
C: VEHICLE CEILING
D: VEHICLE DOOR
F: VEHICLE BODY FLOOR
M: MONITOR DEVICE
  M1: ROTARY SHAFT PORTION
S: SEAT MAIN BODY
  S1: OCCUPANT SUPPORT PORTION
U: OCCUPANT
V: VEHICLE
101: SEAT UNIT
110: SEAT
111: SEAT BACK
  111a: BACK UPPER PORTION
  111b: BACK LOWER PORTION
  111c: STAY
112: SEAT CUSHION
113: OTTOMAN
114: HEADREST
  114a: PILLAR
115: NECK REST
  115a: SUPPORTING PROTRUDING PORTION
  115s: SUPPORT SURFACE
120: POSTURE SWITCHING MECHANISM
121: TILT ANGLE ADJUSTMENT MECHANISM
122: LIFTING MECHANISM
123: UPPER SIDE EXTRUSION MECHANISM
124: LOWER SIDE EXTRUSION MECHANISM
125: DEPLOYMENT MECHANISM
126: HEADREST DRIVE MECHANISM
127: NECK REST DRIVE MECHANISM
128: DISPLACEMENT MECHANISM
129: BAG BODY
130: CONTROLLER
131: OPERATING SWITCH
141: OCCUPANT DETECTION SENSOR
142: NECK DETECTION SENSOR (SENSOR)
143: HEAD DETECTION SENSOR

The invention claimed is:

1. A seat unit comprising:
an occupant support portion supporting an occupant;
a plurality of movable mechanisms respectively moving a plurality of parts constituting the occupant support portion; and
a control unit controlling respective operations of the plurality of movable mechanisms, wherein
the control unit causes each of the plurality of movable mechanisms to undergo a transition from a current state to a target state,
the plurality of movable mechanisms have a first movable mechanism requiring a longest time for the transition,
the control unit causes timings of the completion of the respective current-to-target state transitions of the plurality of movable mechanisms including the first movable mechanism to be substantially the same, and the control unit determines a transition initiation timing of each of the plurality of movable mechanisms based on a time required for the current-to-target state transition of each of the plurality of movable mechanisms such that the control unit set the transition initiation timing of the movable mechanism other than the first movable mechanism after the transition initiation timing of the first movable mechanism, and therefore the control unit causes the transitions of the plurality of movable mechanisms other than the first movable mechanism to be completed by completion of the transition of the first movable mechanism from the current state to the target state.

2. The seat unit according to claim 1, wherein the plurality of movable mechanisms have a slide mechanism causing a slide movement of the occupant support portion.

3. The seat unit according to claim 1, wherein
the occupant support portion further includes a seat back and an ottoman, and
the plurality of movable mechanisms have a back movable mechanism moving the seat back and an ottoman movable mechanism moving the ottoman.

4. The seat unit according to claim 3, further comprising a distance sensor detecting a distance between the ottoman and another member,
wherein the control unit controls the ottoman movable mechanism based on a result of the detection by the distance sensor such that the ottoman does not interfere with another member.

5. The seat unit according to claim 4, wherein
the occupant support portion further includes a seat cushion capable of performing a rotational movement, and
the control unit controls the ottoman movable mechanism based on a result of the detection by the distance sensor and such that the ottoman does not interfere with another member during the rotational movement of the seat cushion.

6. The seat unit according to claim 5, wherein the control unit controls a tilt angle of the seat cushion, such that a front end of the seat cushion becomes higher than a rear end of the seat cushion, during the rotational movement of the seat cushion.

7. A vehicle comprising the seat unit according to claim 3, further comprising a distance sensor detecting a distance between the ottoman and another member,
wherein the control unit controls the ottoman movable mechanism based on a result of the detection by the distance sensor such that the ottoman does not interfere with another member.

8. The seat unit according to claim 3, wherein
the occupant support portion further includes a movable side support, and
the side support protrudes so as to support an occupant's body during a pivot operation of the seat back.

9. The seat unit according to claim 1, wherein the occupant support portion further includes a movable side support.

10. The seat unit according to claim 1, further comprising a voice input unit receiving voice input from an occupant,
wherein the control unit operates the movable mechanism in response to the voice input received by the voice input unit.

11. A vehicle comprising the seat unit according to claim 1, further comprising a voice input unit receiving voice input from an occupant,
wherein the control unit operates the movable mechanism in response to the voice input received by the voice input unit.

12. A vehicle comprising the seat unit according to claim 1, wherein the control unit controls the movable mechanism in accordance with a road situation.

13. A conveyance seat in which a conveyance occupant can sit, comprising the seat unit according to claim 1, the conveyance seat comprising:
a seat back;
a posture switching mechanism for switching a posture of the conveyance seat between a standing posture in which the seat back stands and a tilt posture in which the seat back is tilted backward;
a headrest positioned above the seat back when the posture is the standing posture;
a neck rest having a support surface supporting the occupant's neck and positioned below the headrest when the posture is the standing posture; and
a displacement mechanism provided in the neck rest and displacing a portion of the support surface toward the occupant's neck, wherein
the neck rest is movable along a direction of extension of the seat back, and
the displacement mechanism displaces the portion of the support surface such that the portion of the support surface comes into contact with the occupant's neck when the neck rest moves.

* * * * *